US012812364B2

(12) United States Patent
Eldar et al.

(10) Patent No.: US 12,812,364 B2
(45) Date of Patent: Nov. 24, 2026

(54) NETWORK SWITCHING INCLUDING NEW ACCOUNT IDENTIFIER GENERATION AND DATABASE MANAGEMENT

(71) Applicant: Boost SubscriberCo L.L.C., Englewood, CO (US)

(72) Inventors: Eran Eldar, Littleton, CO (US); Robert Bennett, Castle Rock, CO (US); Yaolin Daniel Wu, Arvada, CO (US); Kara Rector, Denver, CO (US); Haoyang Li, Highlands Ranch, CO (US)

(73) Assignee: Boost SubscriberCo L.L.C., Englewood, CO (US)

( * ) Notice: Subject to any disclaimer, the term of this patent is extended or adjusted under 35 U.S.C. 154(b) by 197 days.

(21) Appl. No.: 18/587,470

(22) Filed: Feb. 26, 2024

(65) Prior Publication Data

US 2025/0274749 A1 Aug. 28, 2025

(51) Int. Cl.
*H04W 8/28* (2009.01)
*H04W 8/20* (2009.01)

(52) U.S. Cl.
CPC ............... *H04W 8/28* (2013.01); *H04W 8/20* (2013.01)

(58) Field of Classification Search
CPC .................................. H04W 8/28; H04W 8/20
See application file for complete search history.

(56) References Cited

U.S. PATENT DOCUMENTS

| | | | |
|---|---|---|---|
| 4,423,287 | A | 12/1983 | Zeidler |
| 6,073,139 | A | 6/2000 | Jain et al. |
| 6,832,089 | B2 | 12/2004 | Jean Henry-Labordere |

(Continued)

FOREIGN PATENT DOCUMENTS

| | | | |
|---|---|---|---|
| CN | 102143474 | A | 8/2011 |
| CN | 111970686 | A | 11/2020 |

(Continued)

OTHER PUBLICATIONS

Bei et al., "Network Switch Systems and Methods," U.S. Appl. No. 18/812,899, filed Aug. 22, 2024.

(Continued)

*Primary Examiner* — Opiribo Georgewill
(74) *Attorney, Agent, or Firm* — Kipman T. Werking; Frontier IP Law PLLC

(57) ABSTRACT

A disclosed method may include (i) receiving, at a mobile virtual network operator, a request for the mobile virtual network operator to perform a network switch by porting a phone number of a client of the mobile virtual network operator from a source network infrastructure of a source mobile network operator that is serving the client for the mobile virtual network operator to a target network infrastructure of a target mobile network operator that is serving clients for the mobile virtual network operator, (ii) generating, by the mobile virtual network operator in response to receiving the request to perform the network switch, a new account identifier for the client after the network switch, and (iii) invoking a port in application programming interface to port the phone number of the client onto the target network infrastructure of the target mobile network operator using the new account identifier.

20 Claims, 49 Drawing Sheets

(56) References Cited

U.S. PATENT DOCUMENTS 7,631,331 B2 12/2009 Sie et al.
7,877,511 B1 1/2011 Berger et al.
7,958,029 B1 6/2011 Bobich et al.
8,516,119 B2 8/2013 Banger et al.
8,855,107 B1 10/2014 Kirchhoff et al.
9,106,606 B1 8/2015 Hasson et al.
9,369,544 B1 6/2016 Morgan et al.
9,661,380 B2 5/2017 Major et al.
9,763,093 B2 9/2017 Richards et al.
9,848,249 B2 12/2017 Freed et al.
10,171,514 B2 1/2019 Ramachandran et al.
10,334,428 B1 6/2019 Chen et al.
10,638,310 B2 4/2020 Subramaniam
10,645,196 B1 5/2020 Sharipov et al.
10,708,759 B1 7/2020 Roy et al.
10,716,021 B1 7/2020 Peden et al.
10,945,048 B2 3/2021 Major et al.
11,082,839 B2 8/2021 Jacobson et al.
11,172,269 B2 11/2021 Major
11,178,215 B1 11/2021 Kaukl et al.
11,178,469 B2 11/2021 Major
11,533,611 B2 12/2022 Berard et al.
11,632,714 B2 4/2023 Opsenica et al.
11,641,579 B1 5/2023 Mukherjee et al.
12,602,354 B1 4/2026 Camp et al.
2002/0177438 A1 11/2002 Sakai et al.
2003/0093709 A1 5/2003 Ogawa et al.
2005/0079855 A1 4/2005 Jethi et al.
2005/0192035 A1 9/2005 Jiang
2007/0155382 A1 7/2007 Jiang
2007/0174491 A1 7/2007 Still et al.
2007/0191011 A1 8/2007 Jiang
2007/0192772 A1 8/2007 De Bonet
2007/0201361 A1 8/2007 Kumar et al.
2007/0203880 A1* 8/2007 Kumar .................. H04L 12/145
2008/0085707 A1 4/2008 Fadell
2008/0092150 A1 4/2008 Jethi et al.
2008/0132226 A1 6/2008 Carnall
2008/0167853 A1 7/2008 Fernsler et al.
2008/0176535 A1 7/2008 Cai
2008/0216157 A1 9/2008 Huuhtanen et al.
2008/0260161 A1 10/2008 Yokota et al.
2009/0017809 A1 1/2009 Jethi et al.
2009/0077201 A1 3/2009 Nakamura et al.
2009/0077580 A1 3/2009 Konig et al.
2009/0086726 A1 4/2009 Savage et al.
2009/0191857 A1 7/2009 Horn et al.
2009/0193129 A1 7/2009 Agarwal et al.
2009/0304358 A1 12/2009 Rashkovskiy et al.
2010/0017861 A1 1/2010 Krishnaswamy et al.
2010/0131659 A1 5/2010 Narayana et al.
2011/0026501 A1 2/2011 Sharaga et al.
2011/0099467 A1 4/2011 Kapur et al.
2011/0194838 A1 8/2011 Meijer
2011/0197224 A1 8/2011 Meijer
2011/0276323 A1 11/2011 Seyfetdinov
2012/0147824 A1 6/2012 Van et al.
2012/0185561 A1 7/2012 Klein et al.
2012/0275442 A1 11/2012 Malets et al.
2012/0287781 A1 11/2012 Maria
2012/0317261 A1 12/2012 Ahmavaara
2013/0072257 A1 3/2013 Evans et al.
2013/0139235 A1 5/2013 Counterman
2013/0262404 A1 10/2013 Daga et al.
2013/0311546 A1 11/2013 Fischer et al.
2013/0336210 A1 12/2013 Connor et al.
2013/0336337 A1 12/2013 Gopinath et al.
2014/0051417 A1* 2/2014 Wuerch ................... H04W 8/28
455/418
2014/0249937 A1 9/2014 Mcnally
2014/0273944 A1 9/2014 Ramprasad
2014/0274034 A1 9/2014 Trapp
2014/0298037 A1 10/2014 Xiao et al.
2014/0342776 A1 11/2014 Viswanadham et al.
2015/0019199 A1 1/2015 Andrews et al.
2015/0189615 A1 7/2015 Rembarz et al.
2015/0334646 A1 11/2015 Buckley et al.
2015/0349824 A1 12/2015 Cho et al.
2015/0381593 A1 12/2015 Low et al.
2016/0149605 A1 5/2016 Vecera et al.
2016/0183081 A1 6/2016 Flores Cuadrado et al.
2016/0192240 A1 6/2016 Duan
2016/0285822 A1 9/2016 Adams
2016/0306965 A1 10/2016 Iyer et al.
2016/0316070 A1 10/2016 Bobich et al.
2016/0323193 A1 11/2016 Zhou et al.
2017/0031574 A1 2/2017 Dhawal
2017/0048566 A1 2/2017 Srinivasan
2017/0048773 A1 2/2017 Miao et al.
2017/0201876 A1 7/2017 Tamagawa
2017/0208369 A1 7/2017 Major et al.
2017/0223598 A1 8/2017 Ho et al.
2017/0264592 A1 9/2017 Yoda et al.
2017/0264951 A1 9/2017 Mitra et al.
2017/0310411 A1 10/2017 Dillon et al.
2018/0040011 A1 2/2018 Milton
2018/0084504 A1 3/2018 Lindoff et al.
2018/0167853 A1 6/2018 Wang
2018/0189276 A1 7/2018 Fonseca, Jr. et al.
2018/0255132 A1 9/2018 Yasukawa et al.
2018/0285372 A1 10/2018 Dosovitsky et al.
2018/0310238 A1 10/2018 Opsenica et al.
2018/0331974 A1 11/2018 He et al.
2018/0359540 A1 12/2018 Major
2019/0007082 A1 1/2019 Dumoulin et al.
2019/0075344 A1 3/2019 Brown
2019/0115950 A1 4/2019 Kakinada et al.
2019/0191282 A1 6/2019 Sanyal et al.
2019/0200065 A1 6/2019 Haberman et al.
2019/0230501 A1 7/2019 He et al.
2019/0253836 A1 8/2019 Sinha et al.
2019/0261165 A1 8/2019 Kumar
2019/0313135 A1 10/2019 Pathak et al.
2020/0051161 A1 2/2020 Dylla
2020/0084614 A1 3/2020 Xu
2020/0100097 A1 3/2020 Zheng et al.
2020/0213673 A1 7/2020 Major et al.
2020/0311096 A1 10/2020 Murthy
2021/0006656 A1 1/2021 Gramacho et al.
2021/0021704 A1 1/2021 Arutyunyan et al.
2021/0092568 A1* 3/2021 Namiranian ............ H04W 4/24
2021/0096825 A1 4/2021 Gray et al.
2021/0112382 A1 4/2021 Oswal et al.
2021/0152598 A1 5/2021 Kapelevich et al.
2021/0176820 A1 6/2021 Zhang et al.
2021/0195392 A1 6/2021 Kojima et al.
2021/0203719 A1 7/2021 Miyagi
2021/0250430 A1 8/2021 Moon
2021/0282127 A1 9/2021 Chaudhary et al.
2021/0297941 A1 9/2021 Brown et al.
2022/0022014 A1 1/2022 Li et al.
2022/0053607 A1 2/2022 Rice et al.
2022/0086532 A1 3/2022 Major
2022/0150686 A1 5/2022 Nitsch
2022/0171983 A1 6/2022 Chen et al.
2022/0263825 A1 8/2022 Gregus et al.
2022/0286839 A1 9/2022 Zhao et al.
2022/0291851 A1 9/2022 Tylik et al.
2022/0295343 A1 9/2022 Pefkianakis et al.
2022/0368441 A1 11/2022 Lee
2022/0369094 A1 11/2022 Rajwar et al.
2023/0030905 A1 2/2023 Mao et al.
2023/0084923 A1 3/2023 Hieb et al.
2023/0107904 A1 4/2023 Wang et al.
2023/0359760 A1 11/2023 Karia et al.
2023/0362583 A1 11/2023 Tawhidur
2023/0385561 A1 11/2023 Kennedy, Jr.
2023/0396979 A1 12/2023 Kanchiraju et al.
2023/0421469 A1 12/2023 Bhattacharjee
2024/0015806 A1 1/2024 Kahn
2024/0031356 A1 1/2024 Jiang
2024/0040497 A1 2/2024 Ohno
2024/0073674 A1 2/2024 Chughtai et al.
2024/0098504 A1 3/2024 Demonget et al.

(56) References Cited

U.S. PATENT DOCUMENTS

| | | | |
|---|---|---|---|
| 2024/0121835 | A1 | 4/2024 | Kawakami et al. |
| 2024/0129713 | A1 | 4/2024 | Mikuni et al. |
| 2024/0147215 | A1 | 5/2024 | Kim et al. |
| 2024/0147216 | A1 | 5/2024 | Kim et al. |
| 2024/0155327 | A1 | 5/2024 | Liu |
| 2024/0188067 | A1 | 6/2024 | Zhang et al. |
| 2024/0204978 | A1 | 6/2024 | Eldar et al. |
| 2024/0224020 | A1 | 7/2024 | Haswarey et al. |
| 2024/0224024 | A1 | 7/2024 | Mukherjee et al. |
| 2024/0244417 | A1 | 7/2024 | Wendeborn et al. |
| 2024/0251230 | A1 | 7/2024 | Gupta |
| 2024/0256797 | A1 | 8/2024 | Chollampatt Muhammed Ashraf et al. |
| 2024/0259783 | A1 | 8/2024 | Hegde et al. |
| 2024/0273570 | A1 | 8/2024 | Bender et al. |
| 2024/0284165 | A1 | 8/2024 | Li |
| 2024/0305598 | A1 | 9/2024 | Narayan et al. |
| 2024/0305961 | A1 | 9/2024 | Simon et al. |
| 2025/0028525 | A1 | 1/2025 | Allen |
| 2025/0142318 | A1 | 5/2025 | Eldar |
| 2025/0209396 | A1 | 6/2025 | Thakur et al. |
| 2025/0238372 | A1 | 7/2025 | Shveidel et al. |
| 2025/0267461 | A1 | 8/2025 | Eriksson |
| 2025/0274750 | A1 | 8/2025 | Eldar et al. |
| 2025/0274825 | A1 | 8/2025 | Eldar et al. |
| 2025/0279942 | A1 | 9/2025 | Eldar et al. |
| 2025/0280284 | A1 | 9/2025 | Eldar et al. |
| 2025/0280327 | A1 | 9/2025 | Eldar et al. |
| 2025/0284985 | A1 | 9/2025 | Shirrell et al. |
| 2025/0362665 | A1 | 11/2025 | Koziolek et al. |
| 2026/0059297 | A1 | 2/2026 | Bei et al. |
| 2026/0059485 | A1 | 2/2026 | Bei et al. |
| 2026/0095755 | A1 | 4/2026 | Wendeborn |
| 2026/0119332 | A1 | 4/2026 | Venkatanarayanan et al. |
| 2026/0133790 | A1 | 5/2026 | Hadian et al. |

FOREIGN PATENT DOCUMENTS

| | | | | |
|---|---|---|---|---|
| CN | 113391972 | A | 9/2021 | |
| EP | 3282358 | A1 | 2/2018 | |
| EP | 3742771 | A1 | 11/2020 | |
| EP | 3840439 | A2 | 6/2021 | |
| JP | 2005-267014 | A | 9/2005 | |
| KR | 10-2011-0056058 | A | 5/2011 | |
| WO | 99/01975 | A1 | 1/1999 | |
| WO | WO-2009137882 | A1 * | 11/2009 | ............. H04L 67/02 |
| WO | 2011/036484 | A2 | 3/2011 | |
| WO | 2012/079380 | A1 | 6/2012 | |
| WO | 2015/036816 | A1 | 3/2015 | |
| WO | 2015/080639 | A1 | 6/2015 | |
| WO | 2021/051219 | A1 | 3/2021 | |
| WO | 2022/092805 | A1 | 5/2022 | |
| WO | 2022/124679 | A1 | 6/2022 | |

OTHER PUBLICATIONS

Bei et al., "Network Switch Systems and Methods," U.S. Appl. No. 18/812,900, filed Aug. 22, 2024.
Bei et al., "Network Switch Systems and Methods," U.S. Appl. No. 18/812,902, filed Aug. 22, 2024.
Bei et al., "Network Switch Systems and Methods," U.S. Appl. No. 18/812,903, filed Aug. 22, 2024.
Dynamically Updating Sim Cards Over the Air—Filed: Nov. 14, 2023—U.S. Appl. No. 18/508,931—First Named Inventor: Prayash Mukherjee.
Dyoniziak et al., "Detecting Content of Interest in Streaming Media, "U.S. Appl. No. 17/827,211, filed May 27, 2022. (36 Pages).
Eldar et al., "Interface for Digital Operator Platform Including Asynchronous Connection Compatibility," U.S. Appl. No. 18/595,212, filed Mar. 4, 2024.
Eldar et al., "Interface for Digital Operator Platform Including Mobile Virtual Network Enabler Selector," U.S. Appl. No. 18/595,203, filed Mar. 4, 2024.
Eldar et al., "Interface for Digital Operator Platform Including Task Disaggregation," U.S. Appl. No. 18/595,233, filed Mar. 4, 2024.
Eldar et al., "Interface for Digital Operator Platform," U.S. Appl. No. 18/595,194, filed Mar. 4, 2024.
Eldar et al., "Network Switching Including Client Identifier Query," U.S. Appl. No. 18/587,513, filed Feb. 26, 2024.
Eldar et al., "Network Switching Including Proactive Network Switch Initiation," U.S. Appl. No. 18/587,528, filed Feb. 26, 2024.
Eldar et al., "Network Switching Including User Profile Field Cloning," U.S. Appl. No. 18/587,500, filed Feb. 26, 2024.
Eldar et al., Network Switching Including Network Switch Availability Verification, U.S. Appl. No. 18/587,460, filed Feb. 26, 2024.
Eldar et al., Network Switching Including Porting in a Phone Number to a Target Network, U.S. Appl. No. 18/587,440, filed Feb. 26, 2024.
GSM Association, "Embedded SIM Remote Provisioning Architecture Version 1.1," Official Document SGP.01, Jan. 30, 2014, 85 pages.
GSM Association, "Internet of Things—How It Works," 2021, retrieved from https://www.gsma.com/iot/embedded-sim/how-it-works/, retrieved on Sep. 15, 2021, 4 pages.
GSM Association, "Remote Provisioning Architecture for Embedded UICC Test Specification Version 4.0," Official Document SGP.11, May 20, 2019, 782 pages.
GSM Association, "Requirements for Multi SIM Devices," Version 8.0, Jul. 1, 2021, 26 pages.
GSM Association, "RSP Technical Specification Version 2.3," Official Document SGP.22, Jun. 30, 2021, 274 pages.
GSMA Association et al: "Remote Provisioning Architecture for Embedded UICC Technical Specification (Version 3.2)", Official Document, Jun. 27, 2017, pp. 1-309.
Hieb et al., "Carrier Controlled Cellular Telephone Network Migration," U.S. Appl. No. 19/191,910, filed Apr. 28, 2025.
International Search Report and Written Opinion of the International Searching Authority (EPO) issued in PCT Application No. PCT/US2023/074581 on Nov. 29, 2023.
International Search Report and Written Opinion received for PCT Patent Application No. PCT/US2022/043348, mailed on Dec. 23, 2022, 14 pages.
International Search Report and Written Opinion received for PCT Patent Application No. PCT/US23/74585, mailed on Mar. 12, 2024, 18 pages.
International Search Report and Written Opinion received for PCT Patent Application No. PCT/US24/46589, mailed on Oct. 24, 2024, 14 pages.
Localization of Wireless Equipment Based on Network Usage Data—Filed: Dec. 28, 2023—U.S. Appl. No. 18/399,201—First Named Inventor: Dmitry Dimov.
Nemalipuri et al., "Advertisement Caching for Targeted Delivery," U.S. Appl. No. 18/488,726, filed Oct. 17, 2023. (23 pages).
Nemalipuri, "Prefetching Advertisements for Streaming Delivery," U.S. Appl. No. 18/449,976, filed Aug. 15, 2023. (22 pages).
Partial International Search Results Communication issued by the European Patent Office as the International Searching Authority in PCT Application No. PCT/US2023/074585 on Jan. 17, 2024.
Pre-Download Customization of Electronic Subscriber Identity Module (ESIM)—Filed: Feb. 16, 2023—U.S. Appl. No. 18/110,690—First Named Inventor: Yongjia Li.
Providing Wireless Services Based on Using Subscriber Geospatial Activity —Filed: Dec. 11, 2023—U.S. Appl. No. 18/535,633—First Named Inventor: Mikhail Arbuzov.
Suzuki et al., "Standardization of Embedded UICC Remote Provisioning," NTT Docomo Technical Journal 16 (2):36-41, 2014.
The 3G4G Blog, "M2M embedded UICC (eSIM) Architecture and Use Cases," Dec. 23, 2014, retrieved from https://blog.3g4g.co.uk/2014/12/m2m-embedded-uicc-esim-architecture- and.html, retrieved on Sep. 15, 2021, 3 pages.
Wendeborn et al., "Network Move Systems and Methods," U.S. Appl. No. 18/902,230, filed Sep. 30, 2024.
Wendeborn et al., "Network Move Systems and Methods," U.S. Appl. No. 18/902,236, filed Sep. 30, 2024.
Wendeborn et al., "Network Move Systems and Methods," U.S. Appl. No. 18/902,241, filed Sep. 30, 2024.

(56) References Cited

OTHER PUBLICATIONS

Wendeborn et al., "Network Move Systems and Methods," U.S. Appl. No. 18/902,244, filed Sep. 30, 2024.
Analysis on the Awareness and Effect of Mobile Number Portability in Aizawl, Mizoram. Francis Lalmuansanga. (Year: 2022).
Techno-Economic and Regulation Impact Analysis of Mobile Number Portability Implementation. Rizal. IEEE. (Year: 2013).

* cited by examiner

500

513 www sattv com

Sat TV

SatTV CUSTOMER
1234 TELEPHONE. IN
STERIN, CX 78748.1234

Page: 1 of 4
Bill Cycle Date: 12/12/23-1/11/24
Account: 456456456456 visit us online at: www sattv com

Monthly Statement

Bill-At-A-Glance

| | |
|---|---|
| Previous Balance | $210.35 |
| Payment - Thank You! | $178.21CR |
| Adjustments | $32.14CR |
| Balance | $00 |
| New Charges | $55.51 |
| **Total Amount Due** | $55.51 |
| Amount Due in Full by | Jan 3,2023 |

Service Summary

| Service | | Page | Total |
|---|---|---|---|
| **Wireless** | | | $55.51 |
| 123 123-1134 | $14.83 | 2 | |
| 234 234-2345 | $27.03 | 3 | |
| 345 345-3456 | $203.35 | 3 | |
| Total New Charges | | | $55.51 |

Due By: Jan 3, 2023 $55.51

*FIG. 5F*

2109

Portfolio Inventory Database

| | Account Identifier | Status | |
|---|---|---|---|
| 2162 | | | 2174 |
| 2164 | [...] | [...] | 2176 |
| 2166 | 123123123123 | Active | 2178 |
| 2168 | [...] | [...] | 2181 |
| 2170 | 456456456456 | Active | 2182 |
| 2172 | [...] | [...] | 2184 |

*FIG: 21F*

2111

| Portfolio Inventory Database | |
|---|---|
| **Account Identifier** | **Status** |
| [...] | [...] |
| 123123123123 | Terminated |
| [...] | [...] |
| 456456456456 | Active |
| [...] | [...] |

2162, 2164, 2166, 2168, 2170, 2172

2174, 2176, 2190, 2181, 2182, 2184

*FIG: 21G*

NETWORK SWITCHING INCLUDING NEW ACCOUNT IDENTIFIER GENERATION AND DATABASE MANAGEMENT

BRIEF SUMMARY

This disclosure is generally directed to an inventive technique for performing a network switch, as discussed in more detail below. In some systems, a user of a telecommunication network may desire to switch from one telecommunication network to another telecommunication network. In such systems, the user of the previous telecommunication network may desire to completely end or abandon any connection or relationship with the previous telecommunication network. Similarly, the new telecommunication network may lack one or more items of relevant information that are needed to onboard the user to the new telecommunication network. Such items of information may include an account number, an address, or a pin number, for example. The new telecommunication network may request these items of information and the user may fail to appropriately provide one or more of these items of information due to human error, forgetfulness, distraction, etc. Accordingly, a relatively high number of such attempts to switch between telecommunication networks in this manner by requesting such items of information from the user may fail. Moreover, one reason why the user may seek to switch to a new telecommunication network may be that the user has detected a degradation of service or a poor customer experience as part of the previous telecommunication network. The user may seek to obtain a better level of service at least in part by switching telecommunication networks, and yet this process of switching may be associated with a number of inconveniences and inefficiencies, including one or more of the drawbacks that are outlined above and discussed in more detail below. Accordingly, this disclosure reveals technology and various embodiments that may address these deficiencies, as well as a multitude of other deficiencies, and provide a potentially streamlined network switching procedure, as discussed in detail below.

In one example, a method may include (i) receiving, at a mobile virtual network operator, a request for the mobile virtual network operator to perform a network switch by porting a phone number of a client of the mobile virtual network operator from a source network infrastructure of a source mobile network operator to a target network infrastructure of a target mobile network operator that is serving clients for the mobile virtual network operator, (ii) porting out, by the mobile virtual network operator in response to the request, the phone number from the source network infrastructure of the source mobile network operator, and (iii) porting in, by the mobile virtual network operator in response to the same request, the phone number into the target network infrastructure of the target mobile network operator such that the mobile virtual network operator provides telecommunication service to the client through the target network infrastructure.

In some examples, the method is performed in a manner that bypasses a request to the client for client-specific information due to the mobile virtual network operator already possessing the client-specific information and the client-specific information includes at least two of the following: an account number, an address, or a pin number.

In some examples, the request is issued in response to the mobile virtual network operator detecting a deficiency in service provided by the mobile virtual network operator to the client.

In some examples, the mobile virtual network operator detects the deficiency in service by receiving a report from the client.

In some examples, the network switch is performed after the client has already been onboarded with the mobile virtual network operator through the source network infrastructure of the source mobile network operator rather than performing the network switch as part of onboarding the client with the mobile virtual network operator.

In some examples, the method further includes performing, by the mobile virtual network operator in response to the same request, a network switch validation to ascertain whether the network switch is permitted.

In some examples, the network switch validation tests whether the target mobile network operator has a target configuration available that satisfies a consistency policy with a source configuration of the client on the source mobile network operator.

In some examples, the network switch to the target mobile network operator uses a physical subscriber identity module card for the target mobile network operator, and the mobile virtual network operator facilitates provisioning the physical subscriber identity module card to a device of the client as part of completing the network switch.

In some examples, the network switch to the target mobile network operator uses a machine to machine electronic subscriber identity module for the target mobile network operator, and the mobile virtual network operator performs the network switch in a manner that is invisible to the client.

In some examples, the method further comprises maintaining continuity of client-specific account information across the network switch, and the client-specific account information includes at least two items of information from the following: a mobile value added service, an account difference, historical data, personal identifiable information, resource exchange settings, an activation or migration date, a device security, or a device active status.

In some examples, a system includes at least one physical computing processor of a computing device a non-transitory computer-readable medium that has instructions stored thereon that, when executed by the at least one physical computing processor, cause the computing device to perform operations comprising (i) receiving, at a mobile virtual network operator, a request for the mobile virtual network operator to perform a network switch by porting a phone number of a client of the mobile virtual network operator from a source network infrastructure of a source mobile network operator to a target network infrastructure of a target mobile network operator that is serving clients for the mobile virtual network operator, (ii) porting out, by the mobile virtual network operator in response to the request, the phone number from the source network infrastructure of the source mobile network operator, and (iii) porting in, by the mobile virtual network operator in response to the same request, the phone number into the target network infrastructure of the target mobile network operator such that the mobile virtual network operator provides telecommunication service to the client through the target network infrastructure.

In some examples, a non-transitory computer-readable medium has instructions stored thereon that, when executed by at least one physical computing processor, cause a computing device to perform operations comprising: (i) receiving, at a mobile virtual network operator, a request for the mobile virtual network operator to perform a network switch by porting a phone number of a client of the mobile virtual network operator from a source network infrastructure of a source mobile network operator to a target network infrastructure of a target mobile network operator that is serving clients for the mobile virtual network operator, (ii) porting out, by the mobile virtual network operator in response to the request, the phone number from the source network infrastructure of the source mobile network operator, and (iii) porting in, by the mobile virtual network operator in response to the same request, the phone number into the target network infrastructure of the target mobile network operator such that the mobile virtual network operator provides telecommunication service to the client through the target network infrastructure.

In some examples, a method comprises (i) receiving, by a graphical user interface at a mobile virtual network operator, a request to verify whether a network switch is available for the mobile virtual network operator to switch a client from a source mobile network operator that is serving the client for the mobile virtual network operator to a target mobile network operator that is serving clients for the mobile virtual network operator and (ii) outputting automatically, by the graphical user interface at the mobile virtual network operator based on an analysis of attributes of at least the client and the target mobile network operator, a positive answer indicating that the network switch is available for the mobile virtual network operator to switch the client from the source mobile network operator that is serving the client for the mobile virtual network operator to the target mobile network operator that is serving clients for the mobile virtual network operator.

In some examples, the analysis comprises (i) a first check of checking automatically, by the graphical user interface at the mobile virtual network operator in response to receiving the request, whether an international mobile equipment identity of a device of the client is covered by the target mobile network operator to return a first value, (i) a second check of checking automatically, by the graphical user interface at the mobile virtual network operator in response to receiving the request, whether a geographic location of the client is covered by the target mobile network operator to return a second value, or (iii) a third check of checking automatically, by the graphical user interface at the mobile virtual network operator in response to receiving the request, whether the target mobile network operator provides a target configuration that satisfies a consistency policy with a source configuration on which the source mobile network operator is providing telecommunication service to the client to return a third value.

In some examples, the third check checks automatically whether the target configuration and the source configuration are identical.

In some examples, the positive answer is output automatically based on at least two of the first check, the second check, and the third check being true.

In some examples, the positive answer is output automatically based on each of the first check, the second check, and the third check being true.

In some examples, the first check comprises invoking, by the mobile virtual network operator, an international mobile equipment identity application programming interface that returns a list of mobile network operators that are serving the mobile virtual network operator and that support an international mobile equipment identity of a device of the client, and checking whether the target mobile network operator is included within the list of mobile network operators.

In some examples, the second check comprises invoking, by the mobile virtual network operator, a network coverage application programming interface that returns a list of mobile network operators that are serving the mobile virtual network operator and that cover a geographic location of the client, and checking whether the target mobile network operator is included within the list of mobile network operators.

In some examples, the geographic location is specified as a zip code.

In some examples, a request to the client for client-specific information is bypassed due to the mobile virtual network operator already possessing the client-specific information, and the client-specific information includes an address of the client.

In some examples, the analysis is performed after the client has already been onboarded with the mobile virtual network operator through the source mobile network operator rather than performing the analysis as part of onboarding the client with the mobile virtual network operator.

In some examples, a system comprises at least one physical computing processor of a computing device and a non-transitory computer-readable medium that has instructions stored thereon that, when executed by the at least one physical computing processor, cause the computing device to perform operations comprising (i) receiving, by a graphical user interface at a mobile virtual network operator, a request to verify whether a network switch is available for the mobile virtual network operator to switch a client from a source mobile network operator that is serving the client for the mobile virtual network operator to a target mobile network operator that is serving clients for the mobile virtual network operator and (ii) outputting automatically, by the graphical user interface at the mobile virtual network operator based on an analysis of attributes of at least the client and the target mobile network operator, a positive answer indicating that the network switch is available for the mobile virtual network operator to switch the client from the source mobile network operator that is serving the client for the mobile virtual network operator to the target mobile network operator that is serving clients for the mobile virtual network operator.

In some examples, a non-transitory computer-readable medium that has instructions stored thereon that, when executed by at least one physical computing processor, cause a computing device to perform operations comprising (i) receiving, by a graphical user interface at a mobile virtual network operator, a request to verify whether a network switch is available for the mobile virtual network operator to switch a client from a source mobile network operator that is serving the client for the mobile virtual network operator to a target mobile network operator that is serving clients for the mobile virtual network operator and (ii) outputting automatically, by the graphical user interface at the mobile virtual network operator based on an analysis of attributes of at least the client and the target mobile network operator, a positive answer indicating that the network switch is available for the mobile virtual network operator to switch the client from the source mobile network operator that is serving the client for the mobile virtual network operator to the target mobile network operator that is serving clients for the mobile virtual network operator.

In some examples, a method includes (i) receiving, at a mobile virtual network operator, a request for the mobile virtual network operator to perform a network switch by porting a phone number of a client of the mobile virtual network operator from a source network infrastructure of a source mobile network operator that is serving the client for the mobile virtual network operator to a target network infrastructure of a target mobile network operator that is serving clients for the mobile virtual network operator, (ii) generating, by the mobile virtual network operator in response to receiving the request to perform the network switch, a new account identifier for the client after the network switch, (iii) invoking, by the mobile virtual network operator, a port in application programming interface to port the phone number of the client onto the target network infrastructure of the target mobile network operator using the new account identifier, (iv) updating, within a portfolio database of the mobile virtual network operator in response to the request to perform the network switch, a status of the new account identifier for the client as active, and (v) updating, within the portfolio database of the mobile virtual network operator in response to the request to perform the network switch, a status of a previous account identifier for the client as terminated.

In some examples, the port in application programming interface is provided by a mobile virtual network enabler, and the mobile virtual network enabler ports in the phone number of the client onto the target network infrastructure of the target mobile network operator using the new account identifier on behalf of the mobile virtual network operator.

In some examples, the method further comprises the mobile virtual network operator porting out the phone number from the source network infrastructure of the source mobile network operator.

In some examples, the method further comprises the mobile virtual network operator cloning at least one mobile value added service from the previous account identifier for the client to the new account identifier for the client.

In some examples, the method further comprises the mobile virtual network operator cloning every mobile value added service from the previous account identifier for the client to the new account identifier for the client.

In some examples, the method further comprises the mobile virtual network operator creating an offer that includes every mobile value added service from the previous account identifier for the client.

In some examples, a mobile virtual network enabler creates the offer that includes every mobile value added service from the previous account identifier for the client on behalf of the mobile virtual network operator.

In some examples, the mobile virtual network operator sets a status for the new account identifier within a portfolio database to pending after the new account identifier is generated and prior to porting in the phone number of the client onto the target network infrastructure of the target mobile network operator.

In some examples, the mobile virtual network operator switches the status for the new account identifier within the portfolio database from pending to active after the phone number of the client is ported into the target network infrastructure of the target mobile network operator.

In some examples, the method further includes updating a cross-reference within an order orchestrator database of the mobile virtual network operator based on the network switch.

In some examples, a system comprises at least one physical computing processor of a computing device and a non-transitory computer-readable medium that has instructions stored thereon that, when executed by the at least one physical computing processor, cause the computing device to perform operations comprising: (i) receiving, at a mobile virtual network operator, a request for the mobile virtual network operator to perform a network switch by porting a phone number of a client of the mobile virtual network operator from a source network infrastructure of a source mobile network operator that is serving the client for the mobile virtual network operator to a target network infrastructure of a target mobile network operator that is serving clients for the mobile virtual network operator, (ii) generating, by the mobile virtual network operator in response to receiving the request to perform the network switch, a new account identifier for the client after the network switch, (iii) invoking, by the mobile virtual network operator, a port in application programming interface to port the phone number of the client onto the target network infrastructure of the target mobile network operator using the new account identifier, (iv) updating, within a portfolio database of the mobile virtual network operator in response to the request to perform the network switch, a status of the new account identifier for the client as active, and (v) updating, within the portfolio database of the mobile virtual network operator in response to the request to perform the network switch, a status of a previous account identifier for the client as terminated.

In some examples, a non-transitory computer-readable medium has instructions stored thereon that, when executed by at least one physical computing processor, cause a computing device to perform operations comprising: (i) receiving, at a mobile virtual network operator, a request for the mobile virtual network operator to perform a network switch by porting a phone number of a client of the mobile virtual network operator from a source network infrastructure of a source mobile network operator that is serving the client for the mobile virtual network operator to a target network infrastructure of a target mobile network operator that is serving clients for the mobile virtual network operator, (ii) generating, by the mobile virtual network operator in response to receiving the request to perform the network switch, a new account identifier for the client after the network switch, (iii) invoking, by the mobile virtual network operator, a port in application programming interface to port the phone number of the client onto the target network infrastructure of the target mobile network operator using the new account identifier, (iv) updating, within a portfolio database of the mobile virtual network operator in response to the request to perform the network switch, a status of the new account identifier for the client as active, and (v) updating, within the portfolio database of the mobile virtual network operator in response to the request to perform the network switch, a status of a previous account identifier for the client as terminated.

In some examples, a method comprises (i) receiving, at a mobile virtual network operator, a request for the mobile virtual network operator to perform a network switch by porting a phone number of a client of the mobile virtual network operator from a source network infrastructure of a source mobile network operator that is serving the client for the mobile virtual network operator to a target network infrastructure of a target mobile network operator that is serving clients for the mobile virtual network operator, (ii) cloning, by the mobile virtual network operator in response to receiving the request to perform the network switch, a plurality of values for respective fields of a user profile of the client, and (iii) performing, by the mobile virtual network operator, the network switch at least in part by referencing the cloned plurality of values for respective fields of the user profile such that a continuity of user experience for the client with the mobile virtual network operator is facilitated. In some examples, the cloned plurality of values for respective fields of the user profile specifies each of at least two items within a set that comprises a mobile value added service, an account difference, historical data, personal identifiable information, resource exchange settings, an activation or migration date, a device security, or a device active status.

In some examples, the cloned plurality of values for respective fields of the user profile specifies each of at least three items within the set.

In some examples, the cloned plurality of values for respective fields of the user profile specifies each of at least five items within the set.

In some examples, the cloned plurality of values for respective fields of the user profile specifies each item within the set.

In some examples, the method comprises updating a cross reference within a retail wireless database for the mobile virtual network operator based on a result of performing the network switch.

In some examples, the request is received from an agent of the mobile virtual network operator through a frontend graphical user interface.

In some examples, the network switch is performed without disturbing a monthly recurring charge from the client to the mobile virtual network operator.

In some examples, the method comprises maintaining, by the mobile virtual network operator, a historical archive that links a previous account identifier for the client on the source mobile network operator with a new account identifier for the client on the target mobile network operator.

In some examples, the request is issued in response to the mobile virtual network operator detecting a deficiency in service provided by the mobile virtual network operator to the client.

In some examples, the mobile virtual network operator detects the deficiency in service by receiving a report from the client.

In some examples, a system comprises at least one physical computing processor of a computing device and a non-transitory computer-readable medium that has instructions stored thereon that, when executed by the at least one physical computing processor, cause the computing device to perform operations comprising: (i) receiving, at a mobile virtual network operator, a request for the mobile virtual network operator to perform a network switch by porting a phone number of a client of the mobile virtual network operator from a source network infrastructure of a source mobile network operator that is serving the client for the mobile virtual network operator to a target network infrastructure of a target mobile network operator that is serving clients for the mobile virtual network operator, (ii) cloning, by the mobile virtual network operator in response to receiving the request to perform the network switch, a plurality of values for respective fields of a user profile of the client, and (iii) performing, by the mobile virtual network operator, the network switch at least in part by referencing the cloned plurality of values for respective fields of the user profile such that a continuity of user experience for the client with the mobile virtual network operator is facilitated. In some examples, the cloned plurality of values for respective fields of the user profile specifies each of at least two items within a set that comprises a mobile value added service, an account difference, historical data, personal identifiable information, resource exchange settings, an activation or migration date, a device security, or a device active status.

In some examples, a non-transitory computer-readable medium has instructions stored thereon that, when executed by at least one physical computing processor, cause a computing device to perform operations comprising: (i) receiving, at a mobile virtual network operator, a request for the mobile virtual network operator to perform a network switch by porting a phone number of a client of the mobile virtual network operator from a source network infrastructure of a source mobile network operator that is serving the client for the mobile virtual network operator to a target network infrastructure of a target mobile network operator that is serving clients for the mobile virtual network operator, (ii) cloning, by the mobile virtual network operator in response to receiving the request to perform the network switch, a plurality of values for respective fields of a user profile of the client, and (iii) performing, by the mobile virtual network operator, the network switch at least in part by referencing the cloned plurality of values for respective fields of the user profile such that a continuity of user experience for the client with the mobile virtual network operator is facilitated. In these examples, the cloned plurality of values for respective fields of the user profile specifies each of at least two items within a set that comprises a mobile value added service, an account difference, historical data, personal identifiable information, resource exchange settings, an activation or migration date, a device security, or a device active status.

In some examples, a method comprises (i) receiving, by a graphical user interface at a mobile virtual network operator, a client identifier as a request and (ii) outputting automatically, by the graphical user interface at the mobile virtual network operator in response to the request, a plurality of values that are specific to a client assigned to the client identifier. In some examples, the plurality of values that are specific to the client assigned to the client identifier comprises a designation of which mobile network operator is currently serving the client for the mobile virtual network operator from among a plurality of mobile network operators that are serving clients for the mobile virtual network operator.

In some examples, the plurality of values further comprises at least one from a set comprising a client account identifier, an international mobile equipment identity of a device of the client, an integrated circuit card identification number for a subscription identity module of a device of the client, or a zip code of the client.

In some examples, the plurality of values further comprises at least two from the set comprising the client account identifier, the international mobile equipment identity of the device of the client, the integrated circuit card identification number for the subscription identity module of a device of the client, or the zip code of the client.

In some examples, the plurality of values further comprises each one from the set comprising the client account identifier, the international mobile equipment identity of the device of the client, the integrated circuit card identification number for the subscription identity module of a device of the client, or the zip code of the client.

In some examples, the request is received from an agent of the mobile virtual network operator through a frontend graphical user interface.

In some examples, outputting automatically, by the graphical user interface at the mobile virtual network operator in response to the request, the plurality of values that are specific to the client assigned to the client identifier facilitates the agent administering a network switch of the client from a source mobile network operator that is serving the client to a target mobile network operator that is serving clients for the mobile virtual network operator.

In some examples, the method comprises the mobile virtual network operator performing the network switch in response to outputting automatically the plurality of values.

In some examples, the network switch is performed at least in part by the mobile virtual network operator invoking a port in application programming interface at a mobile virtual network enabler to port in a phone number of the client to a target network infrastructure of the target mobile network operator.

In some examples, the request is issued in response to the mobile virtual network operator detecting a deficiency in service provided by the mobile virtual network operator to the client.

In some examples, the mobile virtual network operator detects the deficiency in service by receiving a report from the client.

In some examples, a system comprises at least one physical computing processor of a computing device and a non-transitory computer-readable medium that has instructions stored thereon that, when executed by the at least one physical computing processor, cause the computing device to perform operations comprising: (i) receiving, by a graphical user interface at a mobile virtual network operator, a client identifier as a request and (ii) outputting automatically, by the graphical user interface at the mobile virtual network operator in response to the request, a plurality of values that are specific to a client assigned to the client identifier. In some examples, the plurality of values that are specific to the client assigned to the client identifier comprises a designation of which mobile network operator is currently serving the client for the mobile virtual network operator from among a plurality of mobile network operators that are serving clients for the mobile virtual network operator.

In some examples, a non-transitory computer-readable medium has instructions stored thereon that, when executed by at least one physical computing processor, cause a computing device to perform operations comprising: (i) receiving, by a graphical user interface at a mobile virtual network operator, a client identifier as a request and (ii) outputting automatically, by the graphical user interface at the mobile virtual network operator in response to the request, a plurality of values that are specific to a client assigned to the client identifier. In some examples, the plurality of values that are specific to the client assigned to the client identifier comprises a designation of which mobile network operator is currently serving the client for the mobile virtual network operator from among a plurality of mobile network operators that are serving clients for the mobile virtual network operator.

In some examples, a method comprises (i) detecting, by a mobile virtual network operator, that an improvement in mobile telecommunication service would result from the mobile virtual network operator performing a network switch by porting a phone number of a client of the mobile virtual network operator from a source network infrastructure of a source mobile network operator that is serving the client for the mobile virtual network operator to a target network infrastructure of a target mobile network operator that is serving clients for the mobile virtual network operator and (ii) initiating proactively, by the mobile virtual network operator in response to detecting that the improvement in mobile telecommunication service would result from the mobile virtual network operator performing the network switch, the network switch from the source network infrastructure of the source mobile network operator that is serving the client for the mobile virtual network operator to the target network infrastructure of the target mobile network operator that is serving clients for the mobile virtual network operator.

In some examples, detecting, by the mobile virtual network operator, that the improvement in mobile telecommunication service would result from the mobile virtual network operator performing the network switch comprises the mobile virtual network operator detecting a deficiency in service provided by the mobile virtual network operator to the client through the source network infrastructure of the source mobile network operator.

In some examples, detecting, by a mobile virtual network operator, that the improvement in mobile telecommunication service would result from the mobile virtual network operator performing the network switch comprises detecting that the target mobile network operator would provide a higher score in terms of resource performance than a lower score provided by the source mobile network operator.

In some examples, detecting that the target mobile network operator would provide the higher score comprises determining that the target mobile network operator would satisfy a service-level agreement at a lower cost to the mobile virtual network operator than the source mobile network operator would.

In some examples, detecting that the target mobile network operator would provide the higher score comprises determining that the target mobile network operator would satisfy a service-level agreement at a lower cost to the client than the source mobile network operator would.

In some examples, detecting that the target mobile network operator would provide the higher score comprises determining that the target mobile network operator would improve mobile telecommunication speed, connectivity, coverage, or bandwidth in comparison to the source mobile network operator.

In some examples, the network switch to the target mobile network operator uses a consumer electronic subscriber identity module and initiating proactively, by the mobile virtual network operator in response to detecting that the improvement in mobile telecommunication service would result from the mobile virtual network operator performing the network switch, the network switch comprises the mobile virtual network operator prompting the client to accept the consumer electronic subscriber identity module.

In some examples, the network switch to the target mobile network operator uses a physical subscriber identity module card for the target mobile network operator and the mobile virtual network operator facilitates provisioning the physical subscriber identity module card to a device of the client as part of completing the network switch.

In some examples, the network switch to the target mobile network operator uses a machine to machine electronic subscriber identity module for the target mobile network operator and initiating proactively, by the mobile virtual network operator in response to detecting that the improvement in mobile telecommunication service would result from the mobile virtual network operator performing the network switch, the network switch comprises the mobile virtual network operator performing the network switch in a manner that is invisible to the client.

In some examples, the network switch to the target mobile network operator uses a physical subscriber identity module card for the target mobile network operator and initiating proactively, by the mobile virtual network operator in response to detecting that the improvement in mobile telecommunication service would result from the mobile virtual network operator performing the network switch, the network switch comprises the mobile virtual network operator facilitating provisioning the physical subscriber identity module card to a device of the client as part of completing the network switch.

In some examples, a system comprises at least one physical computing processor of a computing device and a non-transitory computer-readable medium that has instructions stored thereon that, when executed by the at least one physical computing processor, cause the computing device to perform operations comprising (i) detecting, by a mobile virtual network operator, that an improvement in mobile telecommunication service would result from the mobile virtual network operator performing a network switch by porting a phone number of a client of the mobile virtual network operator from a source network infrastructure of a source mobile network operator that is serving the client for the mobile virtual network operator to a target network infrastructure of a target mobile network operator that is serving clients for the mobile virtual network operator and (ii) initiating proactively, by the mobile virtual network operator in response to detecting that the improvement in mobile telecommunication service would result from the mobile virtual network operator performing the network switch, the network switch from the source network infrastructure of the source mobile network operator that is serving the client for the mobile virtual network operator to the target network infrastructure of the target mobile network operator that is serving clients for the mobile virtual network operator.

In some examples, a non-transitory computer-readable medium that has instructions stored thereon that, when executed by at least one physical computing processor, cause a computing device to perform operations comprising (i) detecting, by a mobile virtual network operator, that an improvement in mobile telecommunication service would result from the mobile virtual network operator performing a network switch by porting a phone number of a client of the mobile virtual network operator from a source network infrastructure of a source mobile network operator that is serving the client for the mobile virtual network operator to a target network infrastructure of a target mobile network operator that is serving clients for the mobile virtual network operator and (ii) initiating proactively, by the mobile virtual network operator in response to detecting that the improvement in mobile telecommunication service would result from the mobile virtual network operator performing the network switch, the network switch from the source network infrastructure of the source mobile network operator that is serving the client for the mobile virtual network operator to the target network infrastructure of the target mobile network operator that is serving clients for the mobile virtual network operator.

BRIEF DESCRIPTION OF THE DRAWINGS

For a better understanding of the present invention, reference will be made to the following Detailed Description, which is to be read in association with the accompanying drawings:

FIG. 5F shows an example invoice from the mobile virtual network operator after the performance of the network switch procedure.

FIG. 21F shows a diagram of an example excerpt from the portfolio database during the network switch procedure.

FIG. 21G shows a diagram of an example excerpt from the portfolio database after finalizing the network switch procedure.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
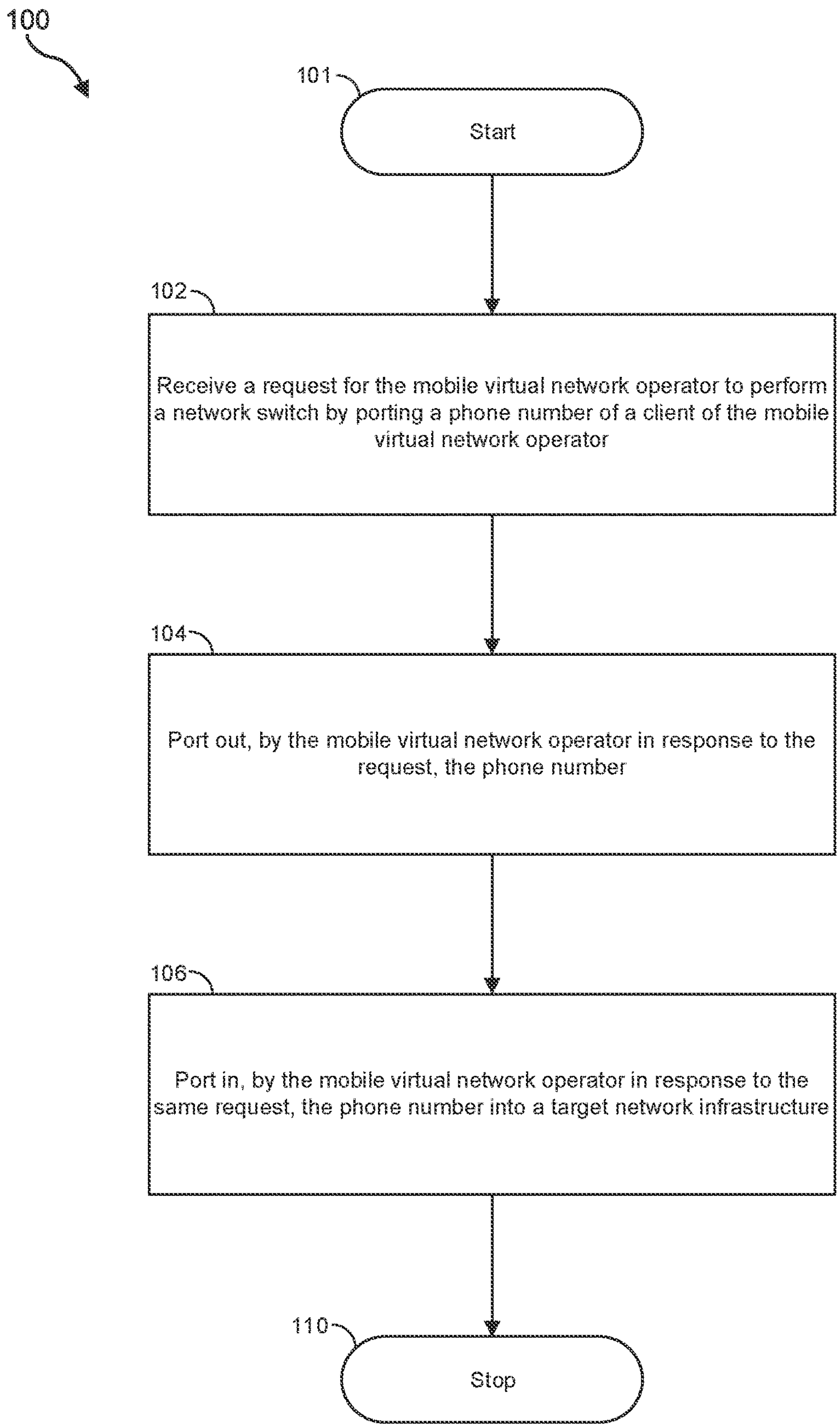
FIG. 1 shows a flow diagram for a method relating to a network switch procedure.

FIG. 1 shows a flow diagram for a method 100 relating to a network switch procedure. At step 101, method 100 may start or begin. At step 102, method 100 may include receiving, at a mobile virtual network operator, a request for the mobile virtual network operator to perform a network switch by porting a phone number of a client of the mobile virtual network operator from a source network infrastructure of a source mobile network operator to a target network infrastructure of a target mobile network operator that is serving clients for the mobile virtual network operator. At step 104, method 100 may include porting out, by the mobile virtual network operator in response to the request, the phone number from the source network infrastructure of the source mobile network operator. Subsequently, at step 106, method 100 may include porting in, by the mobile virtual network operator in response to the same request, the phone number into the target network infrastructure of the target mobile network operator such that the mobile virtual network operator provides telecommunication service to the client through the target network infrastructure. At step 110, method 100 may stop or conclude.

As used herein, the term "mobile network operator" can refer to a mobile or cellular service carrier for telephone communication. In some examples, one or more mobile network operators may have networks for telephone communications that are entirely or substantially nationwide in terms of coverage. Illustrative examples of such mobile network operators may include DISH NETWORK, AT&T, and/or T-MOBILE, etc. As used herein, the term "mobile virtual network operator" can refer to a provider of wireless telecommunication services that provides such services through the infrastructure of a distinct mobile network operator, consistent with method 100 and consistent with the usage in the art. As used herein, the term "source mobile network operator" can refer to a mobile network operator to which a client or customer is currently associated or onboarded for the provisioning of telephone or telecommunications services prior to the network switch of method 100. Similarly, the term "target mobile network operator" can refer to a mobile network operator to which a client or customer is becoming associated or onboarded for the provisioning of telephone or telecommunication services due to the completion of the network solution of method 100. Moreover, as used herein, the phrase "port in" or "port out" may refer to either directly performing such a procedure or commanding such a procedure such that it is performed. Accordingly, in a scenario where a mobile virtual network operator interfaces with a mobile virtual network enabler to perform the network switch between the source mobile network operator and the target mobile network operator, the virtual mobile network operator and the mobile virtual network enabler are both performing the network switch. Additionally, or alternatively, in these scenarios, the source mobile network operator may perform the port out procedure and the target mobile network operator may perform the port in procedure. As used herein, the term "client" can generally refer to a user, subscriber, and/or customer of a mobile virtual network operator or a mobile network operator, consistent with the discussion below.

In some examples, the mobile virtual network operator may have formed a master network services agreement with the source mobile network operator and/or the target mobile network operator such that the mobile virtual network operator is enabled or permitted to perform one or more of the coordinating steps of method 100. In some examples, the source mobile network operator may include, or may correspond to, the mobile virtual network operator (i.e., in scenarios where the mobile virtual network operator also functions as a mobile network operator by maintaining and operating its own network infrastructure in addition to utilizing the network infrastructure of one or more other distinct mobile network operators). Similarly, in some examples, the target mobile network operator includes, or may correspond to, the mobile virtual network operator. In other examples, the mobile virtual network operator, the source mobile network operator, and the target mobile network operator may be distinct.

Figure 2:
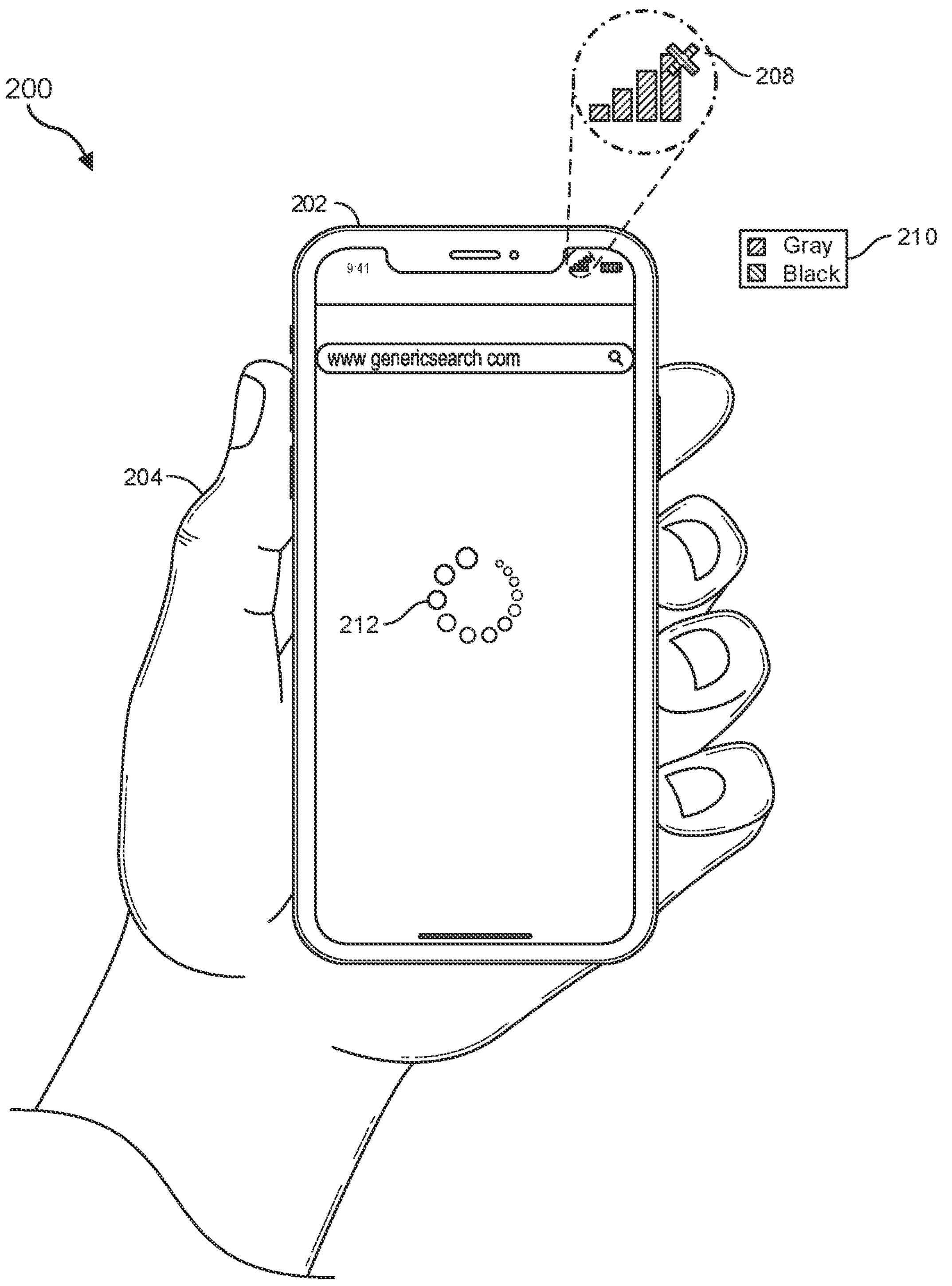
FIG. 2 shows a diagram of an example of a user experiencing lower quality network coverage on a smartphone device.

FIG. 2 shows a diagram 200 of an example of a user whose hand 204 is holding a smartphone 202, which is experiencing lower quality network coverage. The lower quality of the network coverage may be indicated by a loading icon 212, as shown. Additionally, or alternatively, the lower quality of the network coverage may be indicated by a zero number, or lower number, of cellular service bars according to cellular service bar icon 208 and a legend 210. As discussed further below, the lower quality of the network coverage may motivate the customer to contact an agent with the corresponding cellular service carrier, such as a mobile virtual network operator.

The user of diagram 200 may be experiencing lower quality network coverage due to any one or more of a variety of different factors. In some scenarios, the user may be experiencing lower quality network coverage due simply to the fact that the user is currently onboarded and associated with a particular network infrastructure of a mobile network operator that has limited or poor quality coverage at the specific location where the user is currently located, even if that particular mobile network operator has a higher level or more reliable network coverage in one or more other areas around the country. Generally speaking, in related systems a user who was limited to the particular location experiencing the lower quality network coverage may be, in parallel, limited to either staying with that particular mobile network operator and corresponding low-quality network coverage or, instead, abandoning that mobile network operator and completely starting again with a new and distinct mobile network operator. In such scenarios, the new mobile network operator would generally not interact with the previous mobile network operator or would not benefit from any of the account or historical information that the previous mobile network operator had stored or archived regarding this particular user. In various embodiments, the technology of this application may help to address one or more deficiencies associated with this scenario, as discussed in more detail below.

Figure 3:
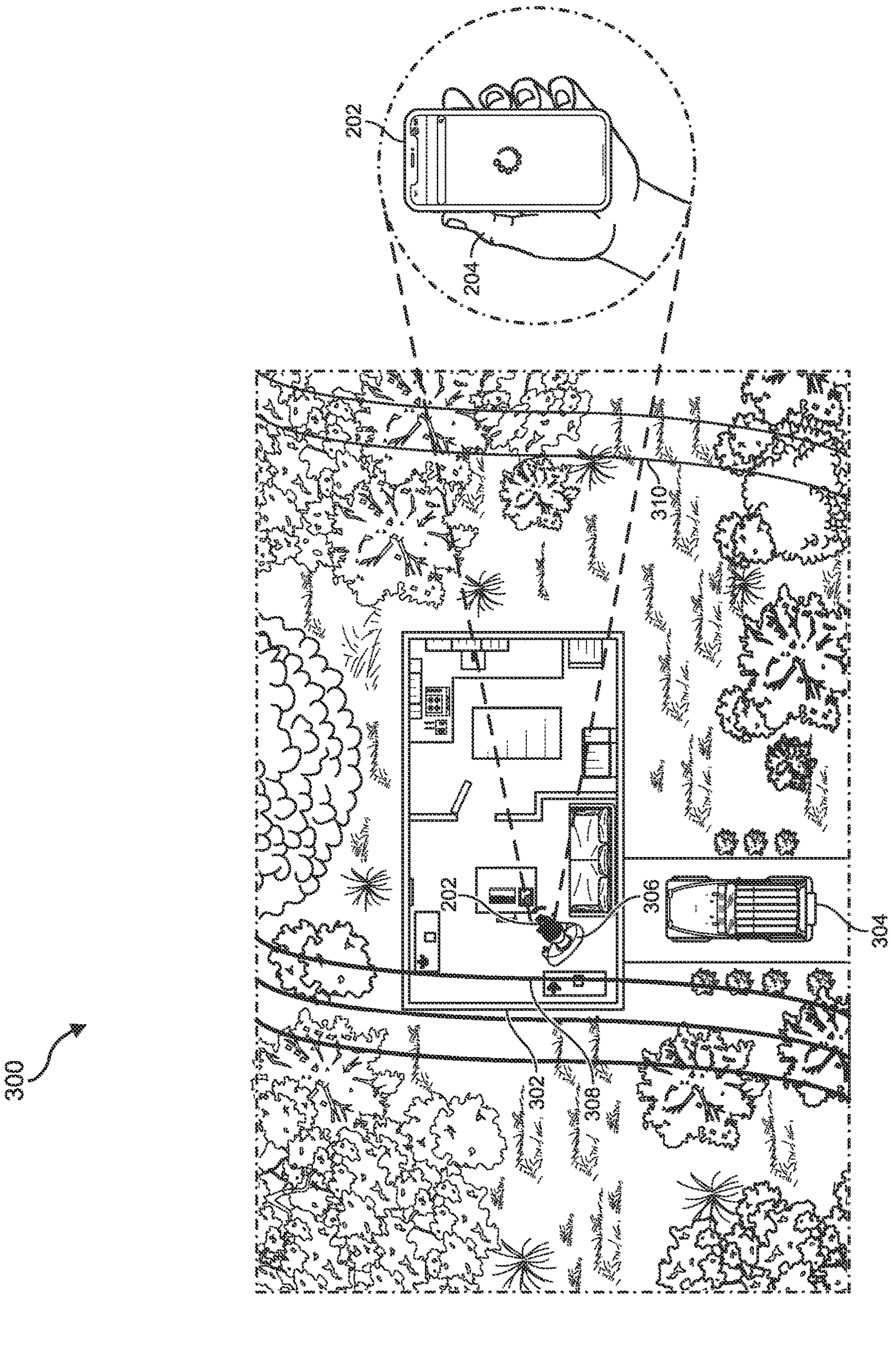
FIG. 3 shows a diagram indicating how the user may be experiencing lower quality network coverage with respect to one cellular base station but may experience better network coverage with respect to another cellular base station.

FIG. 3 shows a diagram 300 indicating how the user may be experiencing lower quality network coverage with respect to one cellular base station but may experience better network coverage with respect to another cellular base station. In particular, diagram 300 shows specifically how a client 306 may be located within a remote cabin 302. Remote cabin 302 may be in the range of one cellular base station associated with radiating connection lines 308 such that remote cabin 302 can experience high-quality network coverage when an item of user equipment, such as smartphone 202, connects to that particular cellular base station. Nevertheless, as discussed above in connection with FIG. 2, client 306 may instead be connecting smartphone 202 to a different and distinct cellular base station, on the right-hand side of diagram 300 (not shown), and associated with radiating connection lines 310. As shown, radiating connection lines 310 do not extend far enough, and/or do not indicate great enough amounts of power or intensity, to enable high-quality network coverage inside of remote cabin 302.

In one or more systems, the mobile network operator associated with the base station of radiating connection lines 308 and the mobile network operator associated with the base station of radiating connection lines 310 may have a level of independence from each other. Accordingly, as further discussed above, the mobile network operator associated with the base station of radiating connection lines 310 may have zero visibility, or limited visibility, into one or more preexisting account or historical records that the other mobile network operator may maintain regarding client 306 as part of providing ongoing services to client 306. Consequently, in some examples of related systems, for client 306 to transition from the previous mobile network operator to the new mobile network operator associated with radiating connection lines 308, client 306 may need to effectively abandon the previous mobile network operator while also supplying one or more items of information that are previously stored by the previous mobile network operator, but which are effectively hidden from the new mobile network operator. These items of information may include an account number, an address, and/or a pin number. As part of the onboarding process to transition to the new mobile network operator and abandon the previous mobile network operator, the new mobile network operator may request for the user to supply one or more of these items of information. Moreover, these attempts to provide the requisite items of information in order to successfully transition between the previous mobile network operator and the new mobile network operator may experience a relatively high failure rate due to the inability of the user to successfully provide all requested items of information, which can be caused by human error, forgetfulness, distractions, etc.

Figure 4:
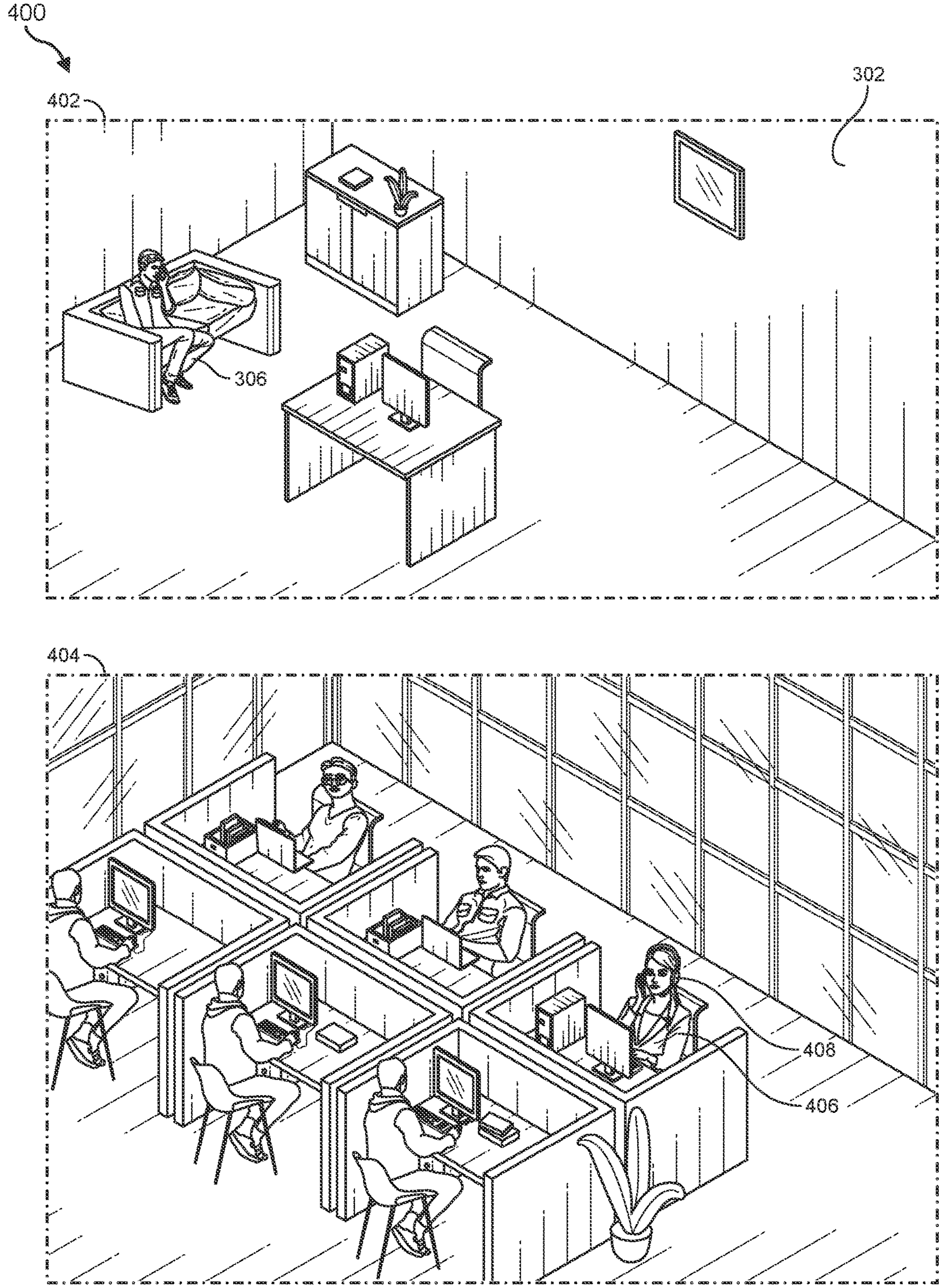
FIG. 4 shows a diagram indicating how the user may contact an agent with the mobile virtual network operator to inquire about one or more options to address the lower quality network coverage.

FIG. 4 shows a series 400 of a diagram 402 and a diagram 404 indicating how the user may contact an agent with the mobile virtual network operator to inquire about one or more options to address the lower quality network coverage. In particular, diagram 402 shows how client 306 may be located within remote cabin 302. Diagram 402 further shows how client 306 may be calling an agent of the mobile virtual network operator. To help illustrate the other side of the telephone call, diagram 404 shows how an agent 406 may be operating a headset 408 to assist client 306 in addressing the low-quality network coverage that the user is currently experiencing, and which is associated with radiating connection lines 310 of diagram 300, as discussed above.

The examples of FIGS. 2-4 help to illustrate how the network switch of method 100 may be performed after the client has already been onboarded with the mobile virtual network operator through the source network infrastructure of the source mobile network operator rather than performing the network switch as part of onboarding the client with the mobile virtual network operator. In other words, in the example of diagram 402 and diagram 404, the user or client may be calling an agent of the mobile network operator onto which the user or client has already been onboarding or subscribed, and which has been providing lower quality network coverage through the cellular base station associated with radiating connection lines 310.

By way of illustrative example, the mobile virtual network operator may have entered into a master network services agreement with one or more additional mobile network operators. According to the master network services agreement, the mobile virtual network operator may serve as a single, streamlined, and unified interface with a client or customer that nevertheless provides access into, or services associated with, one or more underlying mobile network operators and their corresponding network infrastructures. Returning to the example of diagram 300, diagram 402, and diagram 404, the cellular base station of radiating connection lines 308 may be associated with a first mobile network operator, the cellular base station of radiating connection lines 310 may be associated with a second mobile network operator, and the agent 406 may be associated with a third mobile network operator as the mobile virtual network operator, in which case all three of these separate mobile network operators may be distinct while nevertheless operating in coordination with each other according to the master network services agreement. According to the master network services agreement, the mobile virtual network operator may operate as the client-facing organization with which the client or customer is interacting while nevertheless, the mobile virtual network operator may provide to the customer access into one or more network infrastructures associated with one or more of the first mobile network operator and/or the second mobile network operator.

In view of the above, the scenario of diagram 300, diagram 402, and/or diagram 404 has several differences from another scenario in which a client or customer transitions from one mobile network operator to another mobile network operator by effectively abandoning the previous mobile network operator outside of a master network services agreement, and without any facilitation by a mobile virtual network operator. In those related methodologies, the client, customer, or subscriber would necessarily interact and provide information to two separate mobile network operators. One or more of these items of information may be redundant and, therefore, providing such redundant information repeatedly may be inefficient or inconvenient from the perspective of the user and/or from the perspective of the target mobile network operator. Moreover, these two separate mobile network operators would not necessarily or obviously share any items of information with each other, even if it might be more convenient to do so. In contrast to such inefficient arrangements, the scenario of diagram 300, diagram 402, and/or diagram 404 involve a client or customer participating in a network switch between a source mobile network operator and a target mobile network operator while seamlessly interacting with only a single mobile network operator, as the mobile virtual network operator, the entire time, consistent with the master network services agreement. Such a scenario provides multiple efficiencies and improvements in terms of the user experience from the perspective of the client or customer.

Figure 5A:
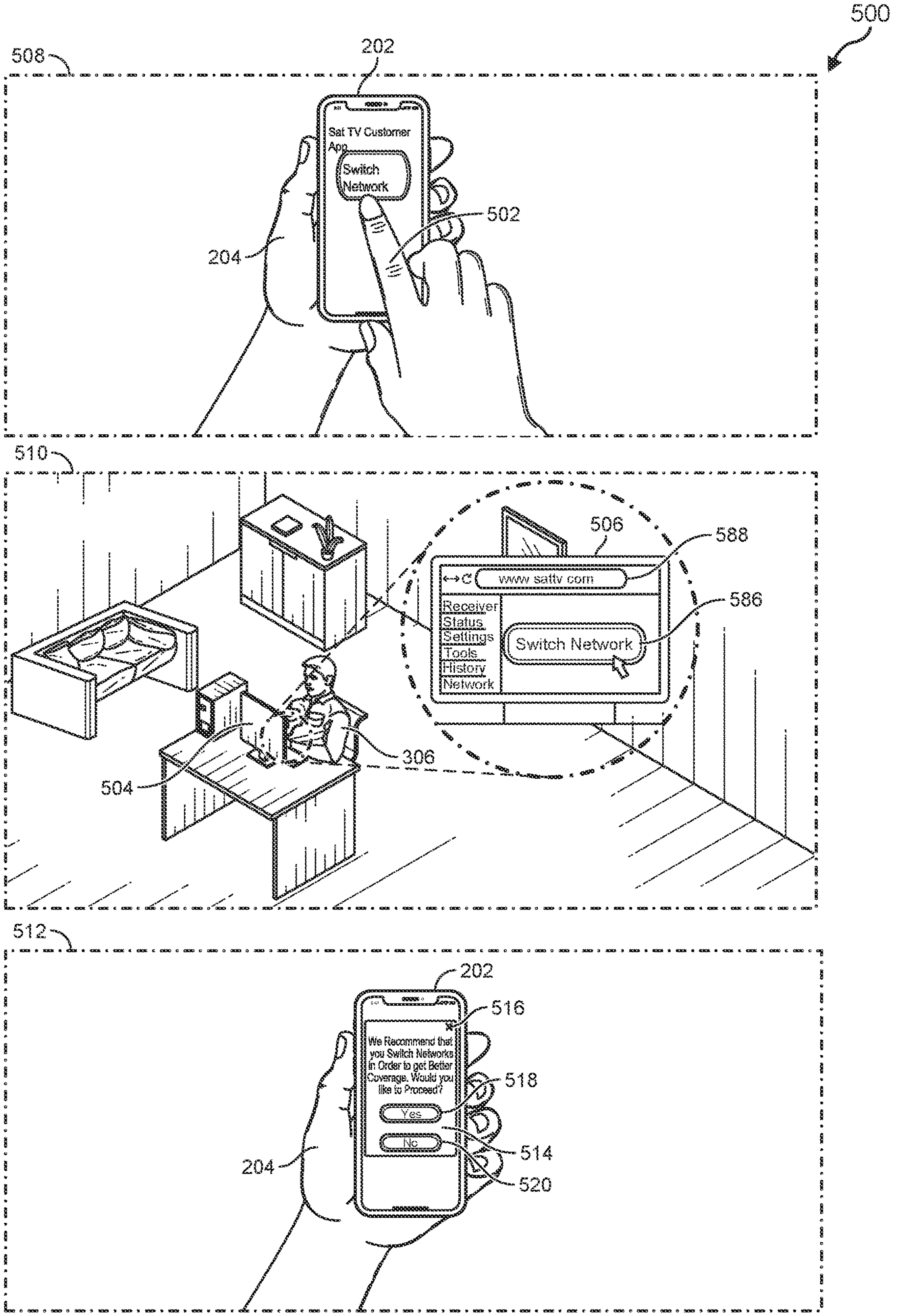
FIG. 5A shows a series of diagrams indicating how the user or the agent of the mobile virtual network operator may initiate or proactively recommend the network switch in a variety of different scenarios.

FIG. 5A shows a series 500 of diagrams indicating how the user or the agent of the mobile virtual network operator may initiate or proactively recommend the network switch in a variety of different scenarios, which can correspond to a diagram 508, a diagram 510, and a diagram 512. First, diagram 508 helps to illustrate a scenario in which the user can proactively initiate the network switch. In the example of diagram 508, a finger 502 of the user may operate or manipulate a touchscreen of smartphone 202 to toggle or select a particular graphical user interface element, such as a button. Diagram 508 shows that the button may display a prompt text to the user, which in this example indicates “switch network.” Additionally, or alternatively, in other examples the prompt text may enable the user to report a condition that would justify or motivate the network switch without necessarily or conspicuously indicating to the user that the solution to the condition would involve a network switch. The condition may involve poor network coverage, as discussed above in connection with diagram 200, for example. Accordingly, in the example of diagram 200, the user may detect lower quality network coverage within a particular geographic location, such as the remote cabin, and may thereby desire to report this condition to the mobile virtual network operator. In such scenarios, the relevant graphical user interface may indicate a prompt text of “report poor network coverage,” or substantially similar or equivalent text, to the user rather than the prompt text of “switch network,” as shown within diagram 508. In either scenario, the user may nevertheless press a graphical user interface button or otherwise provide input to an item of user equipment to indicate to the mobile virtual network operator a reason or indication to initiate or consider the network switch, as further discussed above.

Diagram 510 helps to illustrate a scenario that is substantially parallel or analogous to the scenario outlined in diagram 508, with the exception that, in the scenario of diagram 510, the user is operating a desktop computing device 504 rather than smartphone 202. Accordingly, diagram 510 illustrates how the user may interact with a web browser 506, including an address bar 588, and the web browser may further display a text prompt 586 to initiate or evaluate the network switch operation. As with diagram 508, in the example of diagram 510, the text prompt associated with the network switch operation might not necessarily or conspicuously indicate to the user that the solution to a corresponding condition or problem, such as network congestion or low-quality network coverage, would be to switch networks consistent with method 100. Rather, in some examples, the text prompt or other information provided to the user may simply help the user to identify a problem such as network congestion and select, or agree to, a solution to that problem, which may involve the network switch being performed in the background.

Diagram 512 may contrast with diagram 508 and diagram 510 due to the fact that, within diagram 512, a scenario is outlined where the mobile virtual network operator proactively initiates, recommends, or suggests the network switch procedure consistent with method 100 to the user, without the user first reporting a problem or requesting or initiating a solution to such problem, as in the example of diagram 508 and diagram 510. As shown, within diagram 512, a prompt 514 has been displayed within the corresponding graphical user interface with a message notifying the user about the potential option to perform the network switch consistent with method 100. In the example of this diagram, the prompt text may specify "We recommend that you switch networks in order to get better coverage. Would you like to proceed?" The corresponding graphical user interface also includes a button 518 that enables the user to select or toggle yes, and the graphical user interface further includes a button 520 that enables the user to select or toggle no. The graphical user interface also includes an indicator 516 that enables the user to cancel the corresponding pop-up message and/or interaction, as shown.

In view of the above, series 500 of diagram 508, diagram 510, and diagram 512 helps to illustrate a scenario in which the request of method 100 to perform the network switch is issued in response the mobile virtual network operator detecting a deficiency in service provided by the mobile virtual network operator to the client. In the example of diagram 508 and diagram 510, the mobile virtual network operator may detect the deficiency at least in part by receiving reports from the client. In the example of diagram 512, the mobile virtual network operator may detect the deficiency proactively such as by monitoring one or more items of telemetry data indicating a level of quality that is associated with the network coverage provided to the user in the field, as discussed above. The mobile virtual network operator may detect, through such monitoring, when a level of a key performance indicator, such as price performance and/or network coverage, may drop below one or more thresholds and/or may deviate from an optimum configuration that is, or has become, available to the client. By way of illustrative example, one or more changes in the environment, such as the passage of time or the relocation of the client from one geographic area to another geographic area, may have resulted in a different network infrastructure being associated with a more affordable cellular service plan and/or may have resulted in a different network infrastructure being associated with a higher level of network coverage or quality. The quality of the corresponding network connection can be evaluated along any one of a multitude of different performance metrics, including latency, bandwidth, geographic coverage, reliability or errors, etc. In such examples, the mobile virtual network operator may detect that the client or customer would benefit from the network switch prior to the client himself or herself first detecting or suspecting this fact, even in a scenario where the client would never have suspected this fact. Accordingly, the technology of this application may enable the mobile virtual network operator to proactively and helpfully suggest to the client that the network switch improves price-performance, improves network coverage, improves one or more other attributes of network quality, and/or otherwise improves the user experience for the client.

Figure 5B:
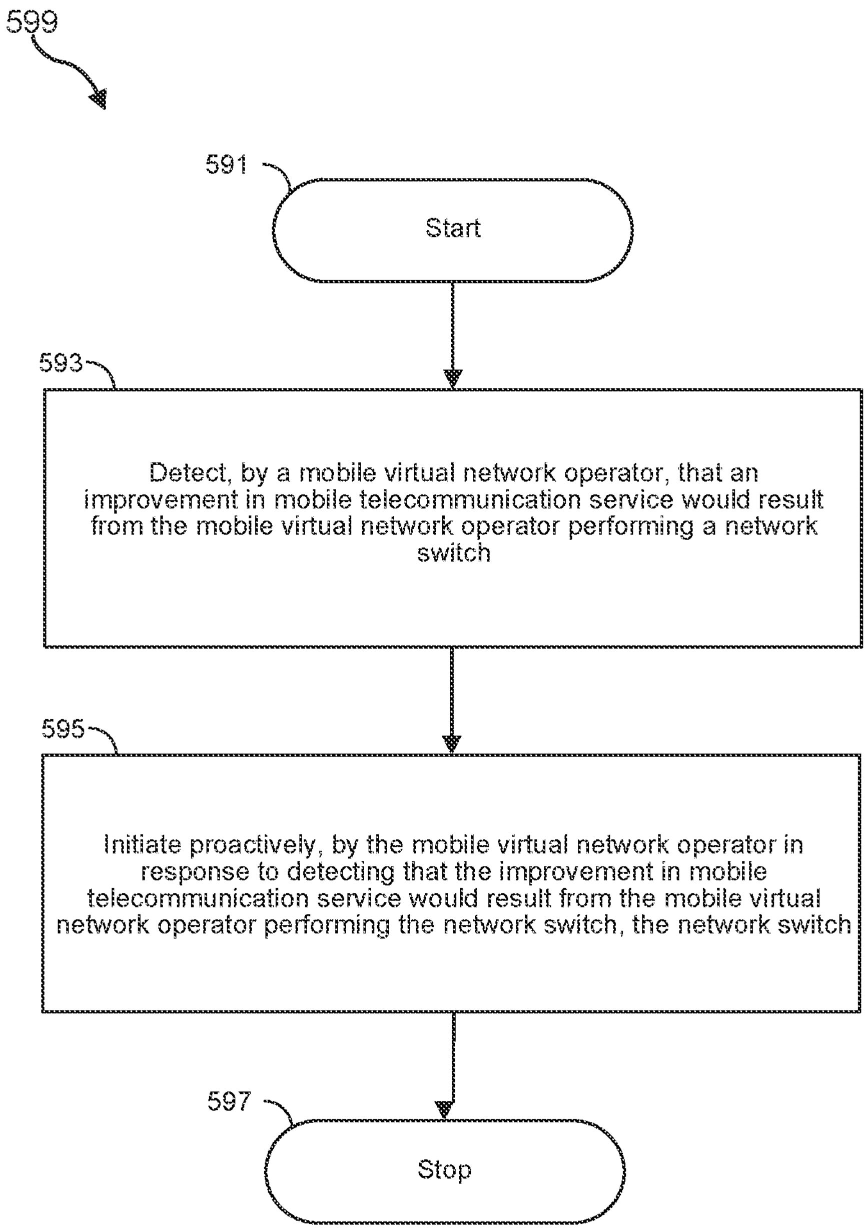
FIG. 5B shows a flow diagram for a method relating to proactively initiating the network switch procedure.

FIG. 5B shows a flow diagram for a method 599 relating to proactively initiating the network switch procedure. At step 591, method 599 may start or begin. At step 593, method 599 may include detecting, by a mobile virtual network operator, that an improvement in mobile telecommunication service would result from the mobile virtual network operator performing a network switch by porting a phone number of a client of the mobile virtual network operator from a source network infrastructure of a source mobile network operator that is serving the client for the mobile virtual network operator to a target network infrastructure of a target mobile network operator that is serving clients for the mobile virtual network operator. At step 595, method 599 may include initiating proactively, by the mobile virtual network operator in response to detecting that the improvement in mobile telecommunication service would result from the mobile virtual network operator performing the network switch, the network switch from the source network infrastructure of the source mobile network operator that is serving the client for the mobile virtual network operator to the target network infrastructure of the target mobile network operator that is serving clients for the mobile virtual network operator. At step 597, method 599 may stop or conclude.

As used herein, the phrase "initiating proactively" may generally refer to the mobile virtual network operator initiating or recommending the network switch for a particular client where the motivating force or suggestion originates with the mobile virtual network operator rather than the client on that particular occasion, and consistent with the discussion further below. The mobile virtual network operator may detect that the improvement in mobile telecommunication service would result from performing the network switch in a variety of ways. The mobile virtual network operator may proactively initiate, recommend, or perform the network switch based on any one or more of a variety of different factors. Generally speaking, the mobile virtual network operator may use business logic and/or other heuristics to ascertain or estimate whether performing the network switch will result in an improvement. The improvement may be realized from the perspective of the client and/or the improvement may be realized from the perspective of the mobile virtual network operator, for example. Moreover, these improvements or adjustments may exist along multiple different dimensions (e.g., price, speed, connectivity, reliability, bandwidth, convenience, preference, etc.) and may be weighed against each other (e.g., greater speed but at greater price) or may complement each other (e.g., greater speed at a lower price). Additionally, or alternatively, the mobile virtual network operator has the option of specifying one or more weights for each one of these different factors to thereby reflect how important that particular factor will be within the business logic and/or other heuristics.

In some examples, the mobile virtual network operator may detect that the improvement in mobile telecommunication service would be obtainable at least in part by detecting a deficiency in mobile telecommunication service by the mobile virtual network operator to the client through the source network infrastructure of the source mobile network operator. Returning to the example of client 306 in FIG. 3, the mobile virtual network operator may detect that the client is receiving sub-par mobile telecommunication service, in terms of one or more factors such as speed, bandwidth, coverage, reliability, etc., prior to the client discovering this fact himself or herself and/or prior to the client reporting or otherwise discussing this discovery with the mobile virtual network operator. In response to detecting this deficiency in service, the mobile virtual network operator may proactively initiate the network switch, such as by suggesting or recommending the network switch to the client.

Figure 5C:
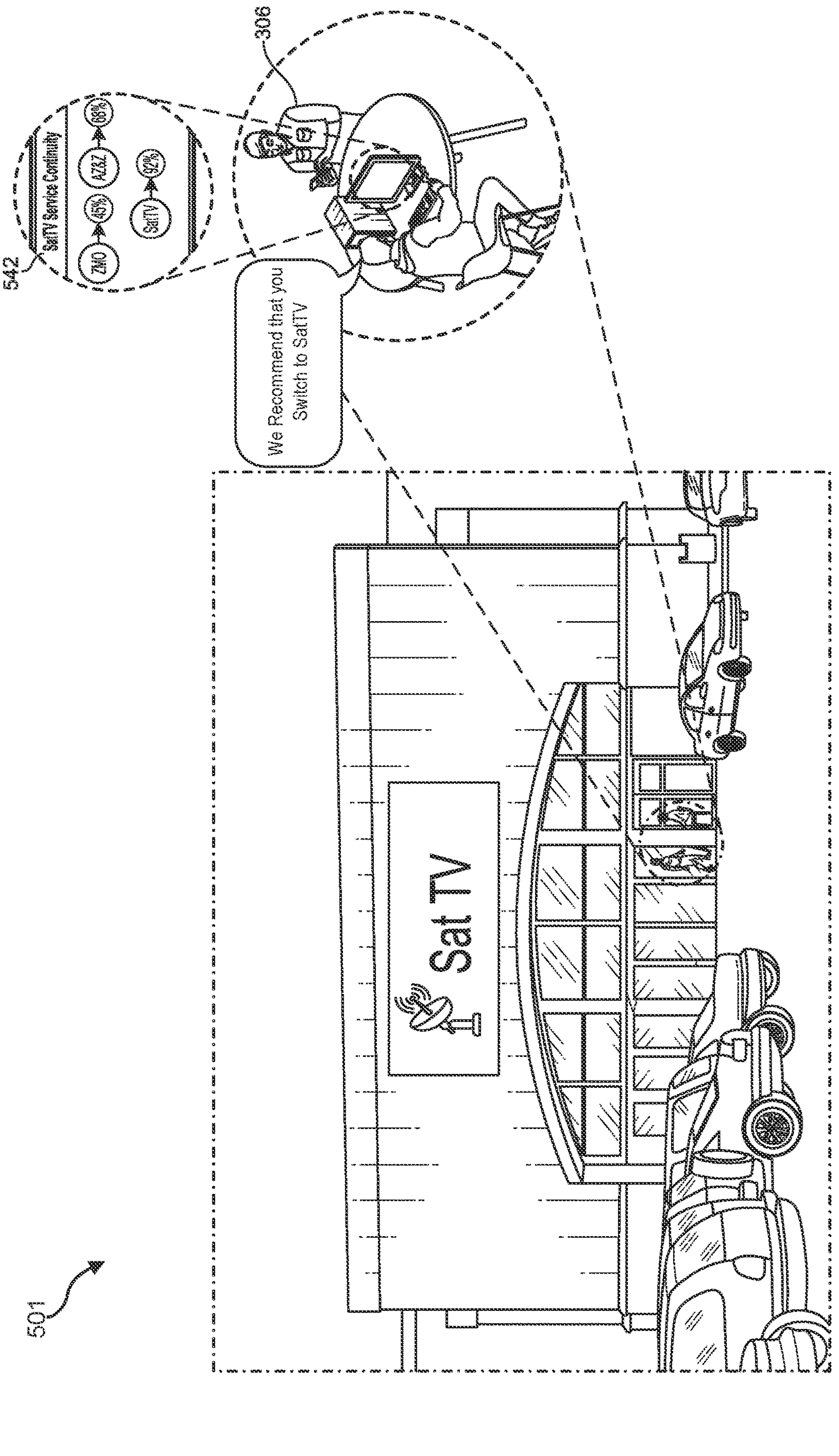
FIG. 5C shows a diagram illustrating how a cost-benefit analysis may be performed when selecting a particular mobile network operator as the target for performing the network switch operation.

Additionally, or alternatively, in some examples, the mobile virtual network operator can detect that the improvement in mobile telecommunication service would be obtainable at least in part by detecting that the target mobile network operator would provide a higher score in terms of resource performance than a lower score provided by the source mobile network operator. FIG. 5C shows a diagram 501 illustrating how a cost-benefit analysis may be performed when selecting a particular mobile network operator as the target for performing the network switch operation.

Client 306 may be consulting with an agent of the mobile virtual network operator. In some examples, the client may be consulting with the mobile virtual network operator at a retail location that is directly or indirectly associated with the mobile virtual network operator (see FIG. 5C). Alternatively, the client may be consulting with the agent of the mobile virtual network operator by telephone (see FIG. 4). In the example of FIG. 5C, the agent of the mobile virtual network operator may interface with the front end or graphical user interface that provides a dashboard or other metric facilitating the decision of whether to perform the network switch. In the simplified example of this figure, an excerpt 542 of the graphical user interface may indicate a single score associated with each mobile network operator. In other words, the mobile virtual network operator may have agreements or configurations formed with multiple different mobile network operators, including a configuration with its own infrastructure as a mobile network operator, such that the agent of the mobile virtual network operator may check which one of these multiple mobile network operators will provide the improvement associated with performing the network switch procedure.

In the particular example of FIG. 5C, one mobile network operator has a score of 45%, another mobile network operator has a score of 60%, and a third mobile network operator has a score of 92%. Note that, in this example, the mobile virtual network operator ("SatTV") may also function as a mobile network operator due to having its own infrastructure, such as a fifth-generation or beyond cellular telecommunication network infrastructure. Moreover, in this example each mobile network operator receives a single score reflecting the desirability of performing the network switch to that particular mobile network operator as the target mobile network operator. Nevertheless, in additional or alternative examples, the agent using the front-end of the graphical user interface may be presented with multiple distinct values for each one of multiple different mobile network operators, where each one of these different values corresponds to a different factor or consideration associated with the desirability of performing the network switch. For example, such distinct values may correspond to any one or more of the different factors listed above, including price, convenience, user or network preference, speed, bandwidth, coverage, reliability, etc.

Figure 5D:
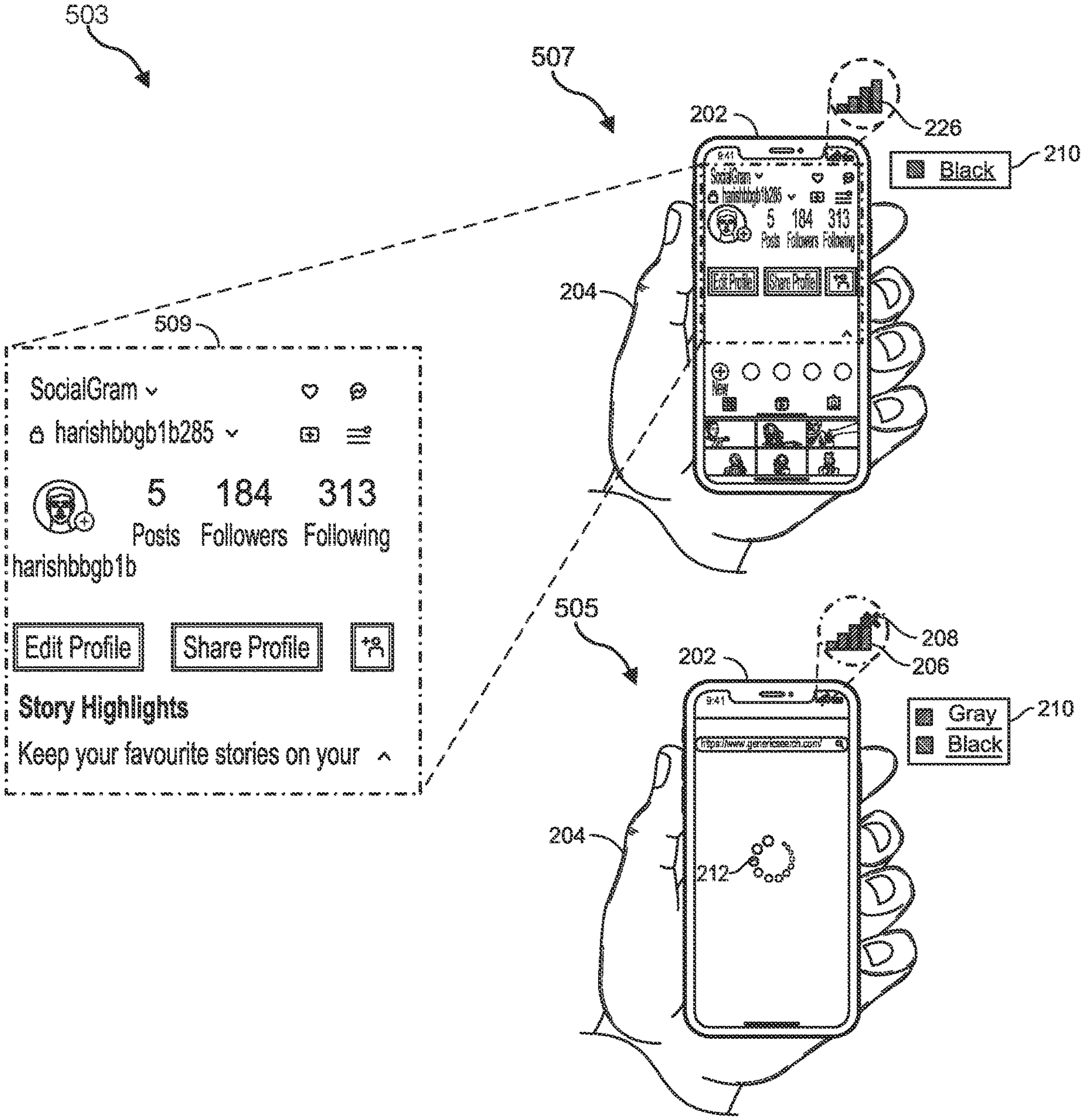
FIG. 5D shows a diagram illustrating how performing the network switch procedure may result in an improvement in network connectivity.
Figure 5E:
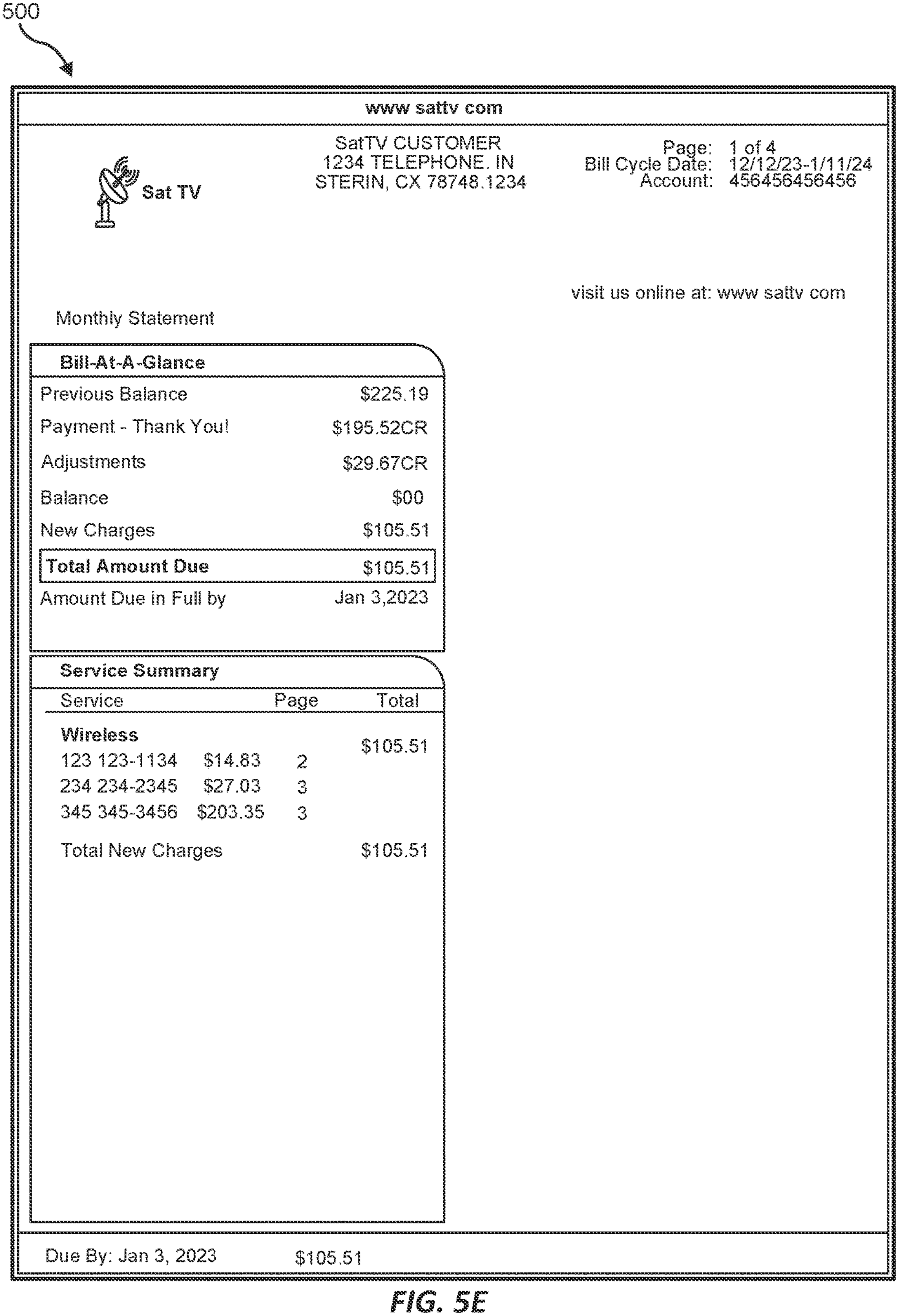
FIG. 5E shows an example invoice from the mobile virtual network operator prior to performance of the network switch procedure.

FIGS. 5D-5F show diagrams that help to illustrate how the improvement in performance may be detected as a reason to proactively initiate the network switch. FIG. 5D shows a diagram 503 illustrating how performing the network switch procedure may result in an improvement in network connectivity. In particular, this figure illustrates how, within sub-diagram 505, the graphical user interface showing on the display of smartphone 202 may indicate that cellular or data connectivity has been lost, which may be associated with gray color bars rather than black color bars, as shown. In contrast, sub-diagram 507 shows how, as a result of performing the network switch, the cellular or data connectivity has been restored which may be associated with black color bars, as discussed above, thereby providing visibility into a social networking user profile excerpt 509.

Similarly, FIG. 5E shows an example invoice 511 from the mobile virtual network operator prior to performance of the network switch procedure, whereas FIG. 5F shows an example invoice 513 from the mobile virtual network operator after the performance of the network switch procedure. As shown, the performance of the network switch can result in significant cost savings from the perspective of the client. Additionally, or alternatively, in other examples the network switch may result in cost savings from the perspective of the mobile virtual network operator. In these scenarios, the mobile virtual network operator may attempt to minimize the disruption or inconvenience from the perspective of the client that is associated with performing the network switch such that the mobile virtual network operator can benefit from the cost savings, and/or other improvements, without significantly affecting or disturbing the client. Accordingly, in some scenarios performing the network switch using an electronic subscriber identity module that is linked to the target mobile network operator may be appropriate or desirable to minimize the disruption from the perspective of the client. These embodiments may include consumer electronic subscriber identity module embodiments that involve minimal interaction with the client (see the discussion of FIG. 18B below) and/or machine-to-machine electronic subscriber identity module embodiments they can be performed invisibly (i.e., in the background) from the perspective of the client.

In some examples, the mobile virtual network operator detects that the improvement in mobile telecommunication service would be obtainable at least in part by detecting that the target mobile network operator would provide the higher score includes determining that the target mobile network operator would satisfy a service-level agreement at a lower cost to the mobile virtual network operator than the source mobile network operator would. Returning to the example of FIG. 5C, the mobile virtual network operator may establish the service-level agreement as the necessary baseline that any mobile network operator must satisfy in order to even be considered as a candidate for the target mobile network operator of the network switch procedure. Accordingly, in the example of FIG. 5C, each one of the three separate mobile network operators may be assumed to be capable of this level of performance established by the service-level agreement, while nevertheless the scores displayed within this figure illustrate how the mobile network operators may furthermore differentiate themselves in terms of performance factors that go above and beyond the necessary baseline established by the service-level agreement. For example, the higher score associated with one mobile network operator in contrast to another mobile network operator may indicate that, although both mobile network operators would satisfy the service-level agreement after performance of the network switch, one of the mobile network operators would perform even better along one or more metrics, such as those listed above, including price to the client, cost to the mobile network operator or mobile virtual network operator, speed, bandwidth, coverage, etc.

Figure 6:
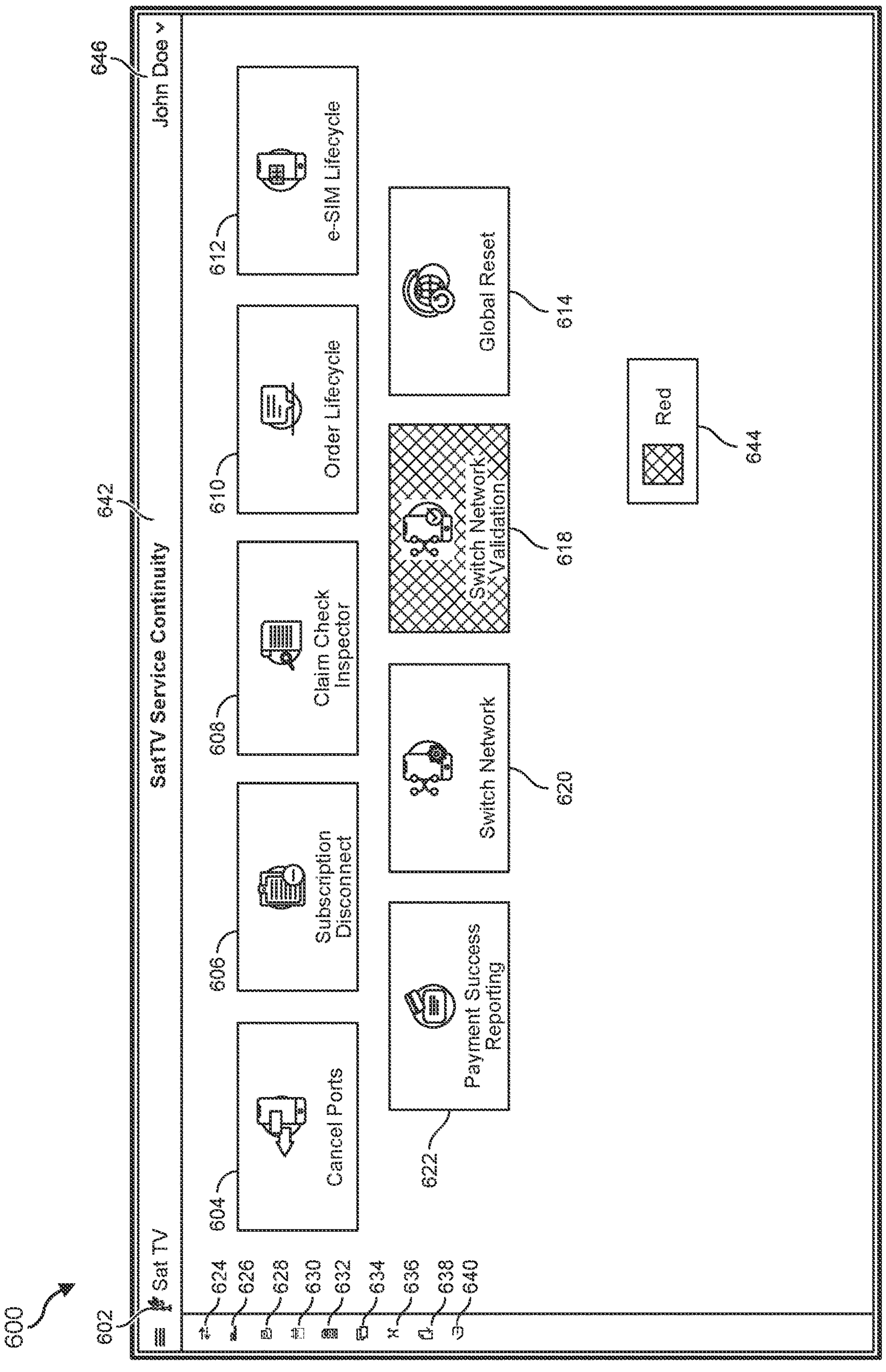
FIGS. 6-16 show a series of diagrams of the graphical user interface that may facilitate the network switch procedure.

FIGS. 6-16 show a series of diagrams of the graphical user interface that may facilitate the network switch. In some examples, the graphical user interface may correspond to a graphical user interface shown to agent 406 in diagram 404, as further discussed above. FIG. 6 shows a diagram 600 of the graphical user interface. As shown, the graphical user interface can include a logo 602 corresponding to a generic mobile network operator (i.e., "Sat TV"), which can serve as the mobile virtual network operator of method 100 in accordance with a master network services agreement. A headline 642 indicates that the graphical user interface may provide a front-end for an agent, such as agent 406 in diagram 404, of the mobile virtual network operator as the agent attempts to facilitate the performance of the network switch, as discussed above. In the example of this figure, agent 406 may be named "John Doe" and may be logged into the graphical user interface, as shown by an indicator 646.

Diagram 600 further shows how the graphical user interface may include a primary set of menu buttons 604-622 and a secondary set of applet buttons 624-640. The primary set of menu buttons may differ from the secondary set of applet buttons in that the primary set of menu buttons are bigger and more conspicuous for easier toggling or selection by the agent, while nevertheless disappearing optionally when the agent toggles or selects a corresponding one of the primary set of menu buttons. In contrast, the secondary set of applet buttons might be significantly smaller and less conspicuous, as shown, while nevertheless remaining present regardless of how the user navigates within the graphical user interface and/or regardless of which one of the primary set of menu buttons the agent toggles or selects as part of facilitating the performance of the network switch.

In particular, menu button 604 may enable the agent to cancel one or more ports associated with a client or subscriber. Menu button 606 may enable the agent to disconnect an account associated with a client or subscriber. Menu button 608 may enable the agent to perform a claim check inspection. Menu button 610 may enable the agent to view a corresponding order lifecycle for a client or subscriber. Similarly, menu button 612 may enable the agent to view a corresponding lifecycle of an electronic subscriber identity module. Menu button 622 may enable the agent to view information associated with payment success. Menu button 620 may enable the user to perform a network switch consistent with method 100, as further discussed above and also discussed in more detail below. Menu button 618 may enable the agent to perform a switch network validation procedure, which can check whether the network switch of method 100 is permitted or available to the client based on one or more conditions, as discussed further below. And menu button 614 may enable the agent to perform a global reset procedure.

In the particular example of this figure, the graphical user interface may color code the menu buttons in a dynamic manner that is interactive with, or responsive to, the location of an input device such as a mouse or trackball. Accordingly, the graphical user interface of diagram 600 is highlighted in a particular color, such as red, which can be indicated by a legend 644, as shown, thereby further indicating to the agent that menu button 618 corresponds to the menu button most recently traversed or touched by the mouse cursor.

Figure 7:
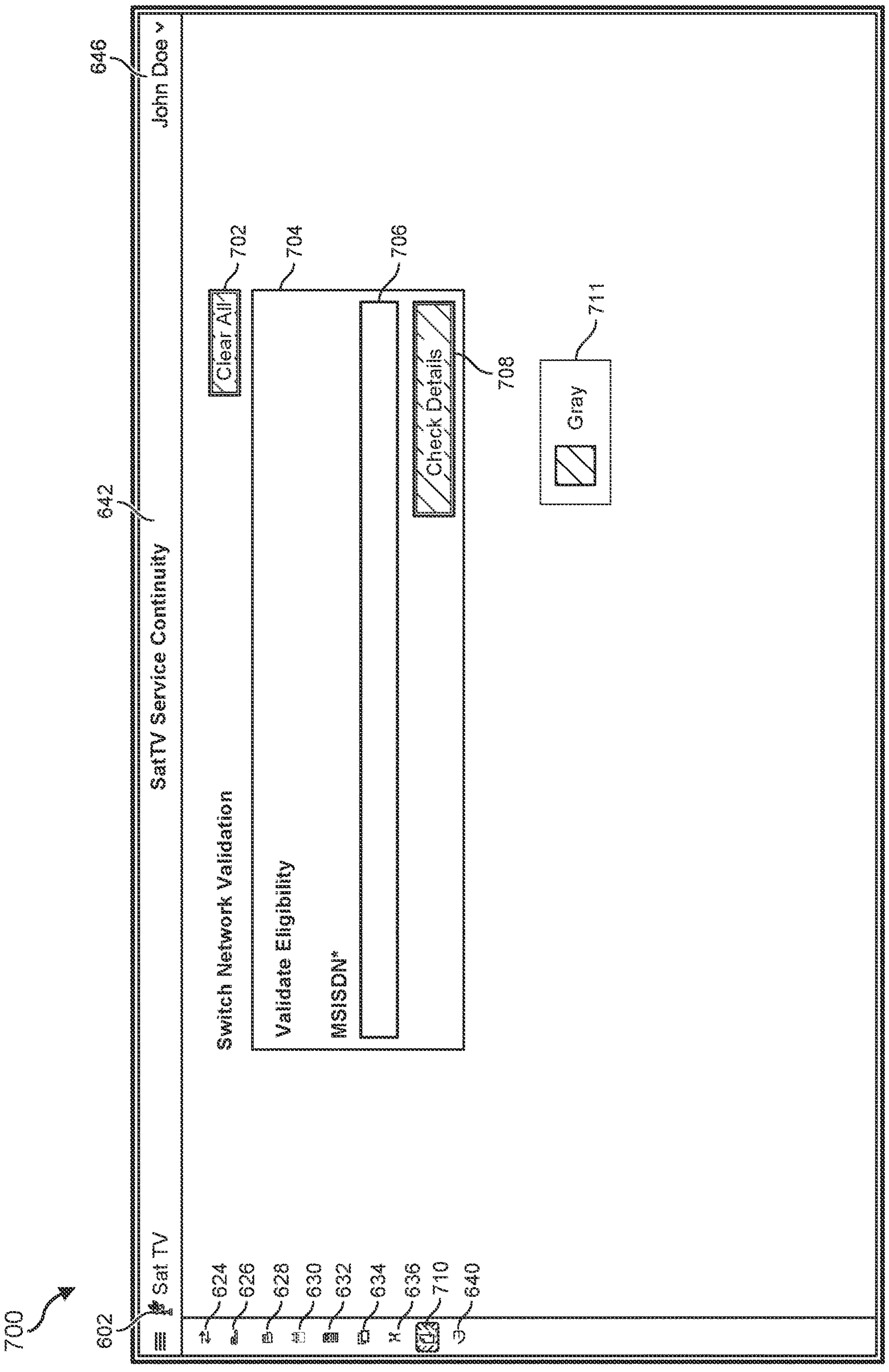
Figure 8:
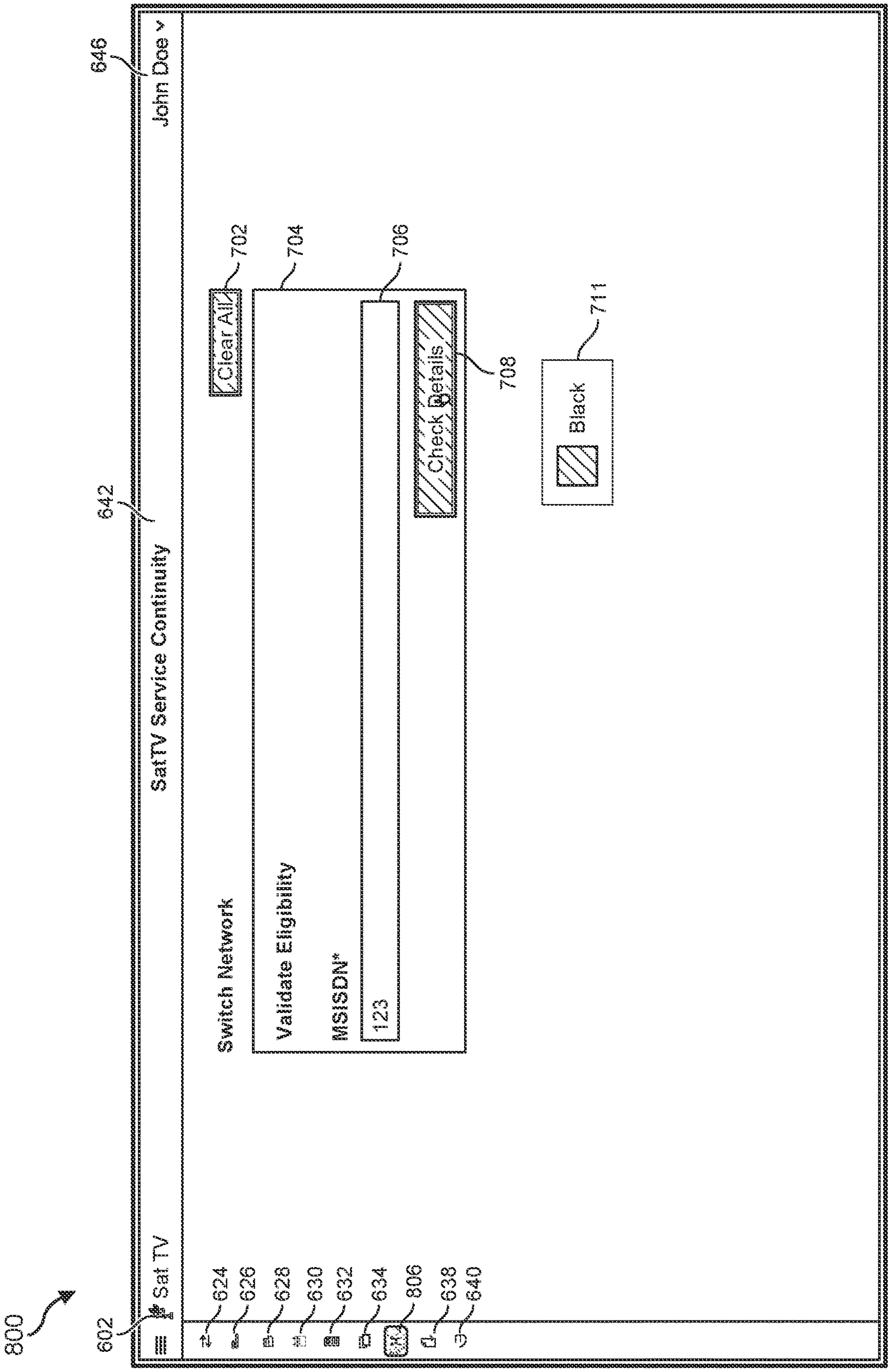

FIG. 7 shows a diagram 700 corresponding to the graphical user interface after the user has selected or toggled menu button 618 for "Switch Network Validation." Diagram 700 also highlights how applet button 710 may have been highlighted and may correspond to menu button 618. Similarly, and in parallel to diagram 700, FIG. 8 shows a diagram 800 corresponding to the graphical user interface after the user has selected or toggled menu button 620 for "Network Switch." Diagram 800 also further indicates to the reader how an applet button 806 may correspond to menu button 620.

The functionality between the "Network Switch Validation" and "Network Switch" components within the graphical user interface may be substantially parallel, as discussed further below, with the exception that the validation component may merely ascertain whether the network switch is permitted whereas the network switch may both ascertain whether the network switch is permitted and also optionally execute the network switch. Accordingly, the following discussion will focus upon the graphical user interface interactions that are associated with the "Network Switch" component, with the understanding that this discussion substantially overlaps in terms of applicability with respect to the "Network Switch Validation" component.

As shown, diagram 700 and diagram 800 include the following parallel components: a button 702 to clear previously entered input information, a validate eligibility box 704, an input component 706, a legend 711, and a check details button 708. The graphical user interface enables the user to enter a phone number, such as a mobile station international subscriber directory number, into input component 706. Subsequently, the user or agent may press or toggle check details button 708, which will trigger a procedure to ascertain whether the network search procedure of method 100 is available or permitted, as discussed in more detail below in connection with FIG. 20, for example. FIG. 8 shows a diagram 800 that parallels diagram 700, except that check details button 708 has been highlighted in a different color, as indicated by the corresponding legend, due to the fact that the input device cursor has interacted with check details button 708.

Figure 9:
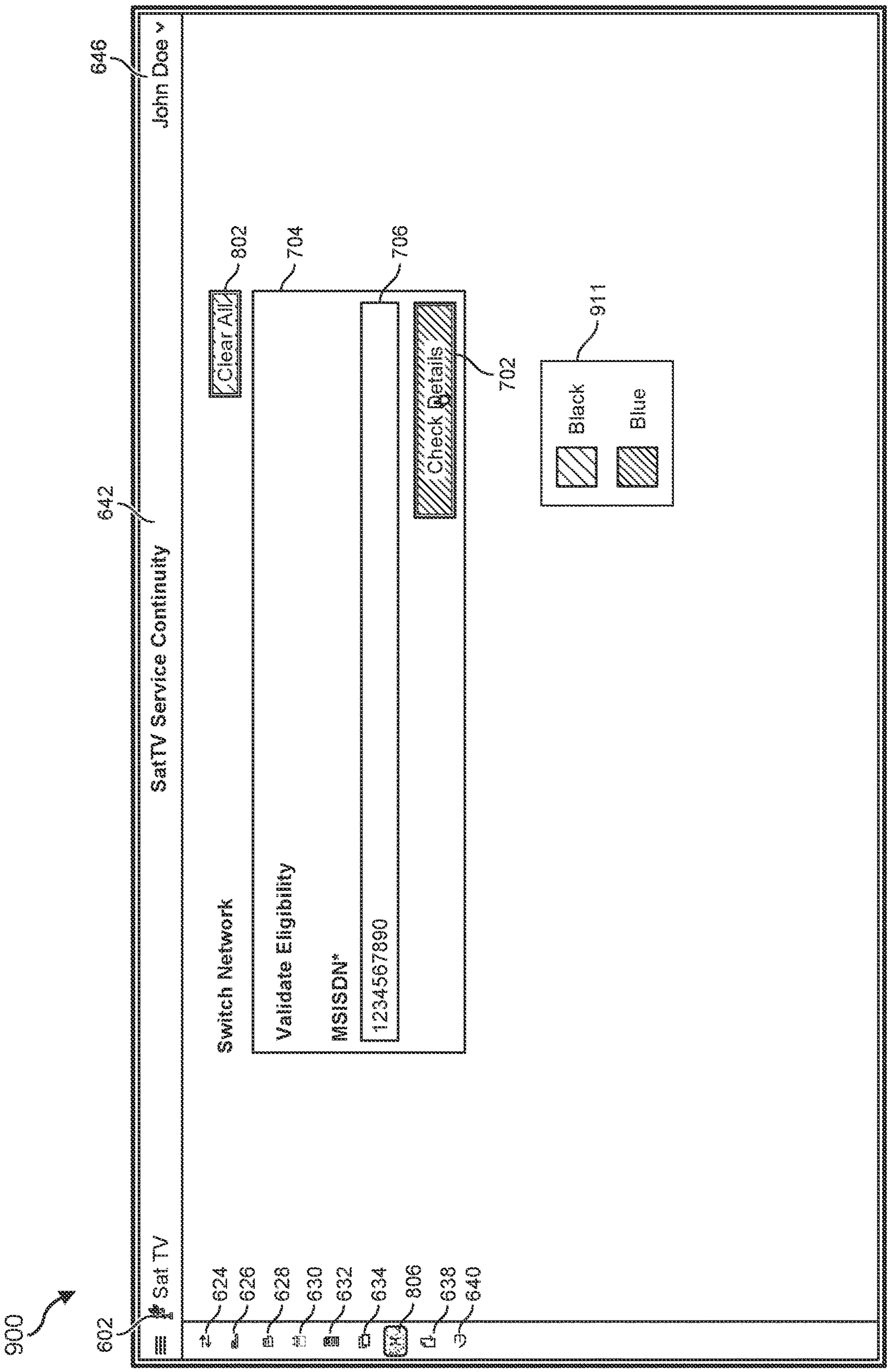

FIG. 9 shows a diagram 900 that parallels diagram 800, except that the entire phone number has been completed within input component 706 and a corresponding legend 911 has been updated, as shown. Accordingly, in some examples, a color of check details button 702 has responsively been altered or adjusted, consistent with the legend shown within this diagram. The alteration indicates to the user of the corresponding graphical user interface that the entire phone number has been entered into input component 706, and formatted correctly, such that check details button 702 has become activated and the corresponding procedure has become available to the user or agent interacting with the graphical user interface. Prior to the complete and successful entering of a properly formatted phone number, check details button 702 may remain in an inactive state, as further indicated by the previous color-coding of this particular button. This example is merely illustrative. Additionally, or alternatively, in other examples any other suitable mechanism may be used to indicate to the user that check details button 702 has become activated and may be used accordingly. Rather than changing a static color, the graphical user interface may be modified or adjusted according to an animation, the insertion or alteration of an icon, and/or the output of an audio alert, prompt, or other indicator, etc.

Figure 10:
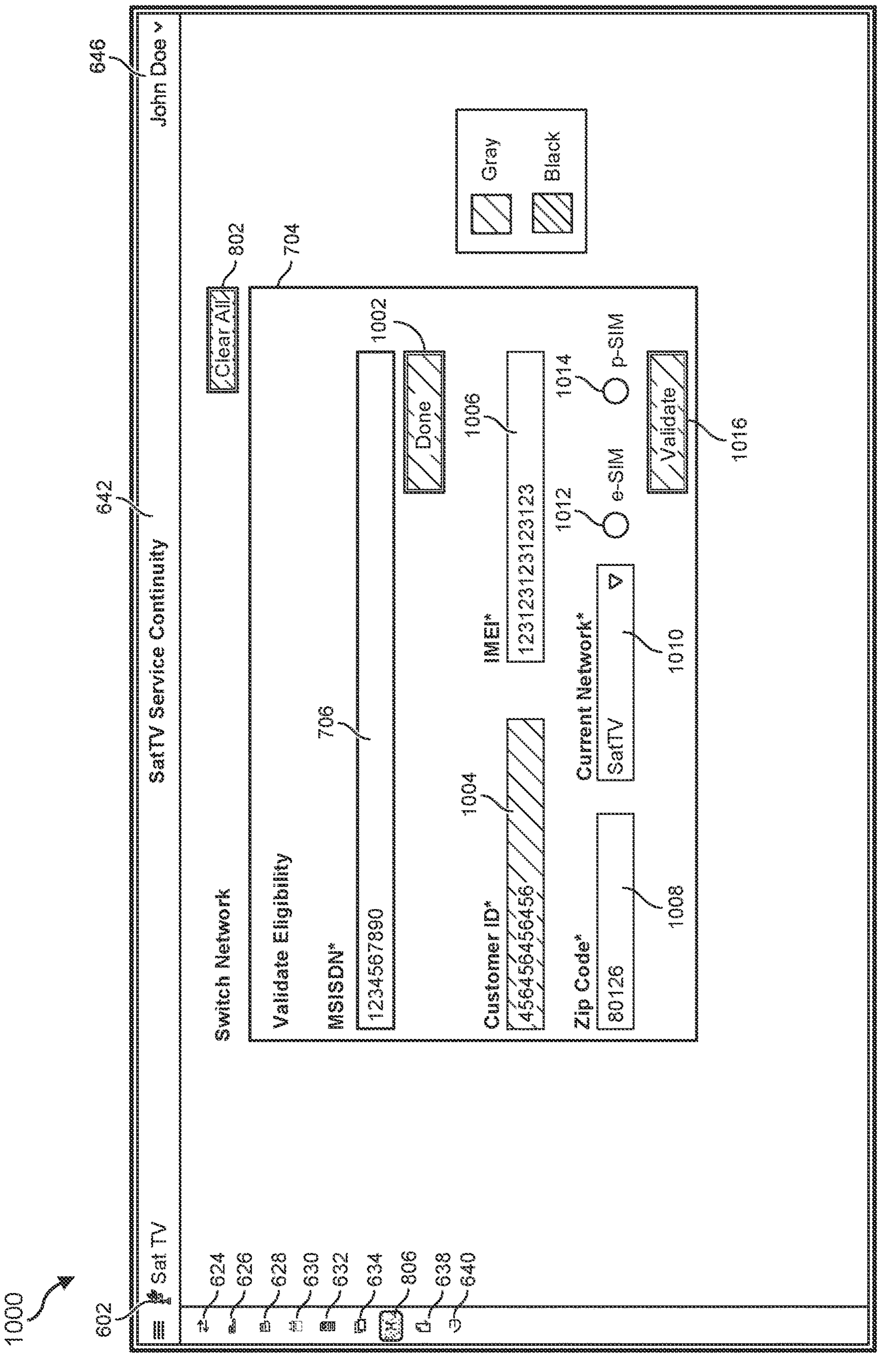

FIG. 10 shows a diagram 1000 that corresponds to a next sequence stage of the graphical user interface in response to the user or agent having pressed check details button 702. As further shown within the example of diagram 1000, check details button 702 may have optionally been replaced by a done button 1002. Additionally, a customer identifier prompt 1004, an international mobile equipment identity prompt 1006, a current network indicator 1010, a radio button 1012 and a radio button 1014, as well as a validate button 1016 may be displayed. Moreover, diagram 1000 illustrates to the reader how one or more values may have been automatically populated within corresponding fields of customer identifier prompt 1004, international mobile equipment identity prompt 1006, zip code prompt 1008, current network indicator 1010, radio button 1012, and/or radio button 1014. Specifically, diagram 1000 shows that the particular values for customer identifier prompt 1004, international mobile equipment identity prompt 1006, zip code prompt 1008, and current network indicator 1010 have been automatically populated. Moreover, the agent or user may also toggle radio button 1012 to thereby distinguish between whether the corresponding client is operating a device that uses an electronic subscriber identity module or a physical subscriber identity module card, as discussed in more detail below in connection with FIGS. 18-19A. In some examples, the first eight digits of the international mobile equipment identity may correspond to a type allocation code that identifies a type of a particular device rather than identifying a particular instance of the type of device (see also the discussion of FIG. 20D below).

In some examples, customer identifier prompt 1004 may indicate an internal or private identifier that the mobile virtual network operator maintains for the customer (e.g., a random GUID). Additionally, or alternatively, the graphical user interface may also indicate a more standardized identifier for one or more devices of the customer, such as a mobile identification number, a mobile subscription identification number, a mobile station identifier, or a short international mobile subscriber identity (IMSI_S). In various examples, the private or internal customer identifier may be mapped to the mobile identification number, a mobile subscription identification number, a mobile station identifier, or a short international mobile subscriber identity (IMSI_S) by the mobile virtual network operator, and one or both may be displayed.

In some examples, current network indicator 1010 may perform two functions. First, current network indicator 1010 may indicate the current network or mobile network operator to which the user or client is currently subscribed. As further discussed above, in some examples, current network indicator 1010 may automatically populate with an identifier or name of this particular mobile network operator in response to the user having triggered the check details operation. Nevertheless, in some examples, current network indicator 1010 may also perform a second operation that enables the agent to select a target mobile network operator to which the client would like to switch according to the network switch procedure, consistent with method 100. In the example of diagram 1000, current network indicator 1010 may form a drop-down menu that will enable the agent to interact with it and thereby press or toggle a different mobile network operator than the source network operator that automatically populated into this field. In further examples, when the agent selects the target mobile network operator from the drop-down menu corresponding to current network indicator 1010, then the text identifier "Current Network" may adjust or be altered to indicate "Target Network" or "Desired Network," or any other suitable replacement text, thereby indicating to the agent that the graphical user interface has not only identified the source mobile network operator but has also identified the target mobile network operator for purposes of the network switch. Additionally, or alternatively, in other examples, the transition from displaying the current network to the target network may be performed using any suitable mechanism for adjusting the graphical user interface and/or highlighting to the viewer of the graphical user interface this distinction.

Figure 11:
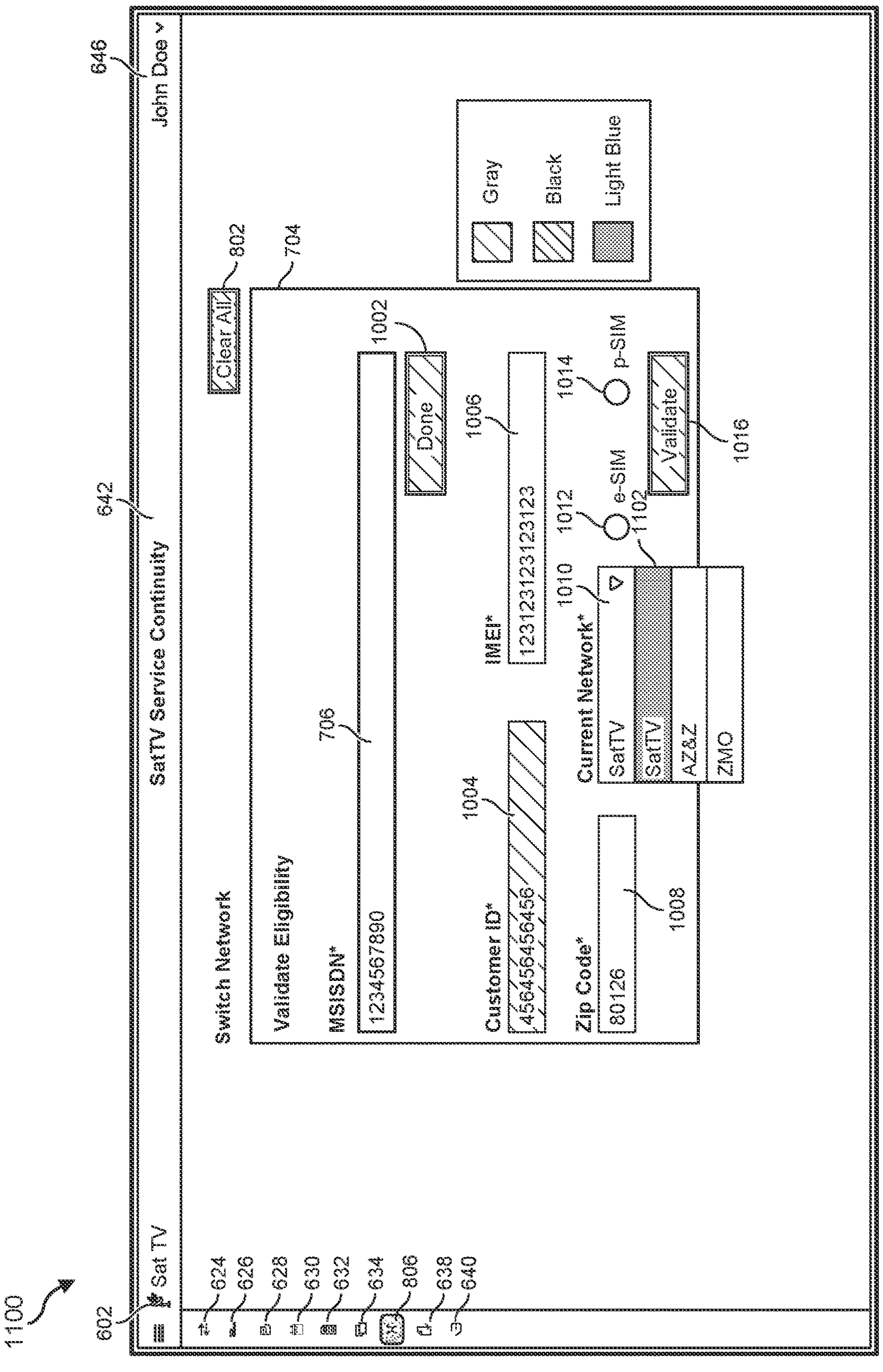
Figure 12:
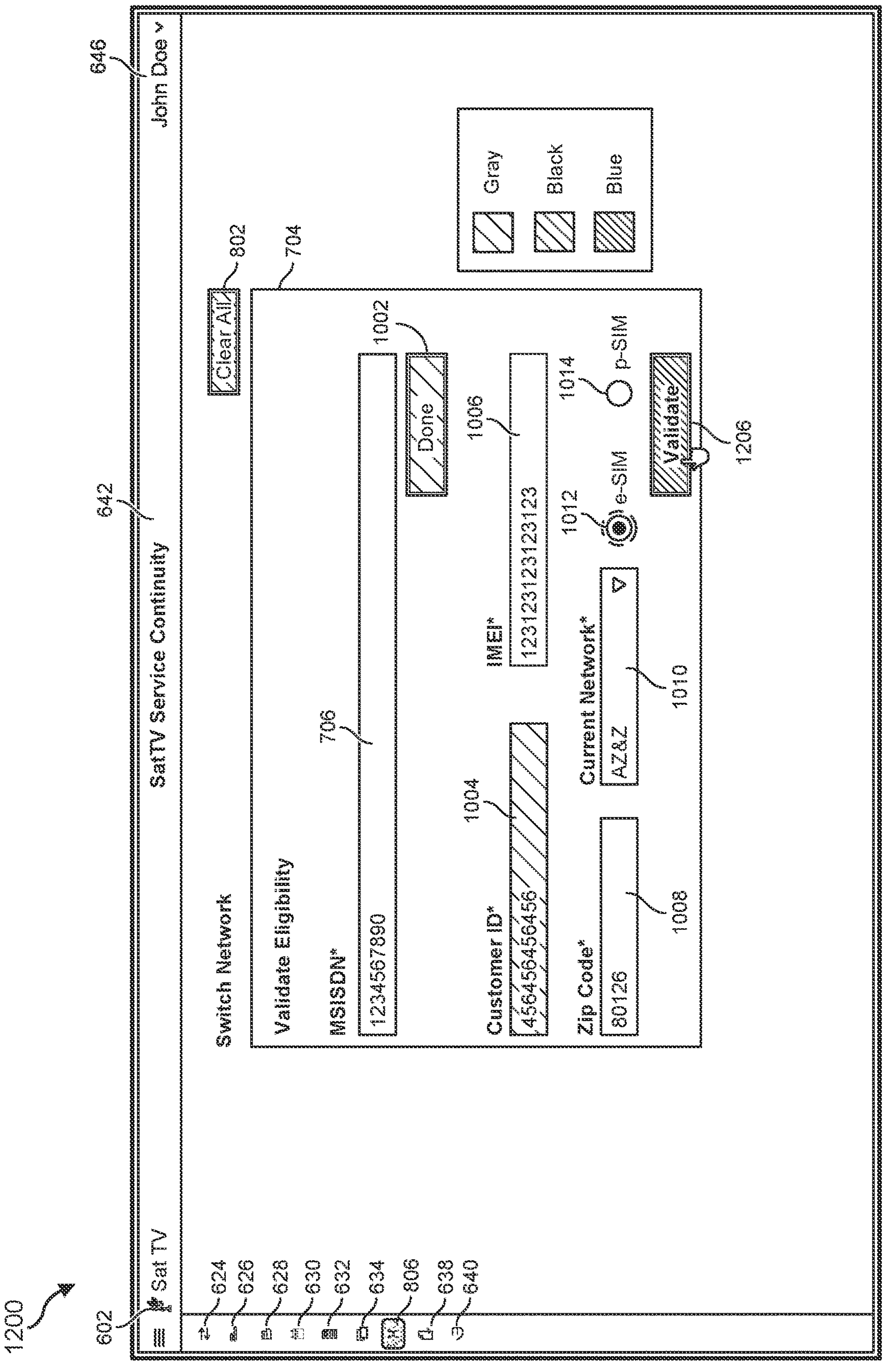

FIG. 11 shows a diagram 1100 that substantially parallels diagram 1000, except that in diagram 1100 the user or agent is interacting with current network indicator 1010 as a drop-down menu to select or toggle between different mobile network operators. Similarly, FIG. 12 shows a diagram 1200 that corresponds to diagram 1100 after the user or agent has successfully selected one of the different mobile network operators while also successfully selecting or toggling between radio button 1012 and radio button 1014. Radio button 1012 and radio button 1014 may distinguish between whether the user or client has an electronic subscriber identity module or a physical subscriber identity module card associated with the network switch procedure, as discussed in more detail below.

Figure 13:
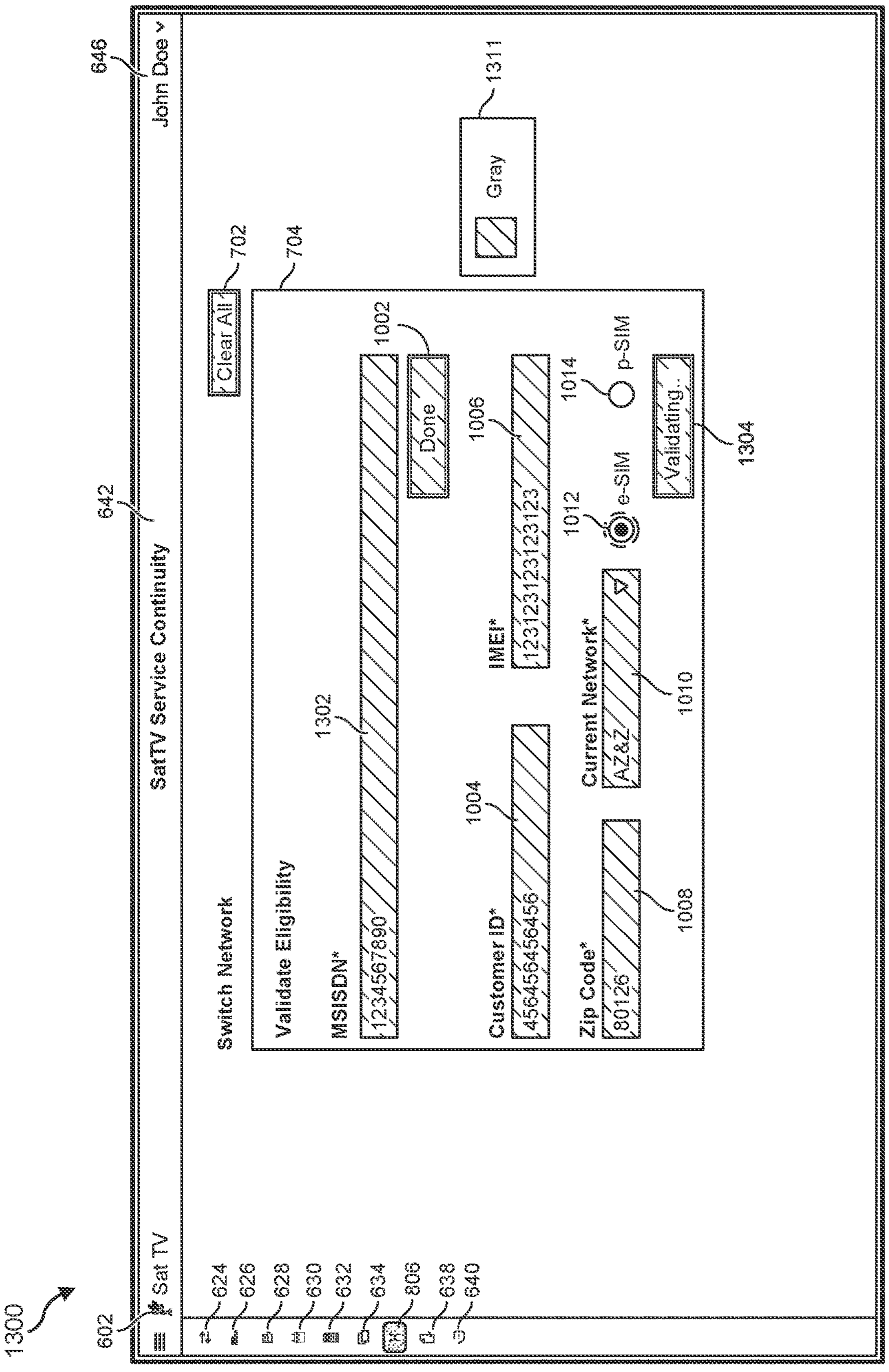
Figure 14:
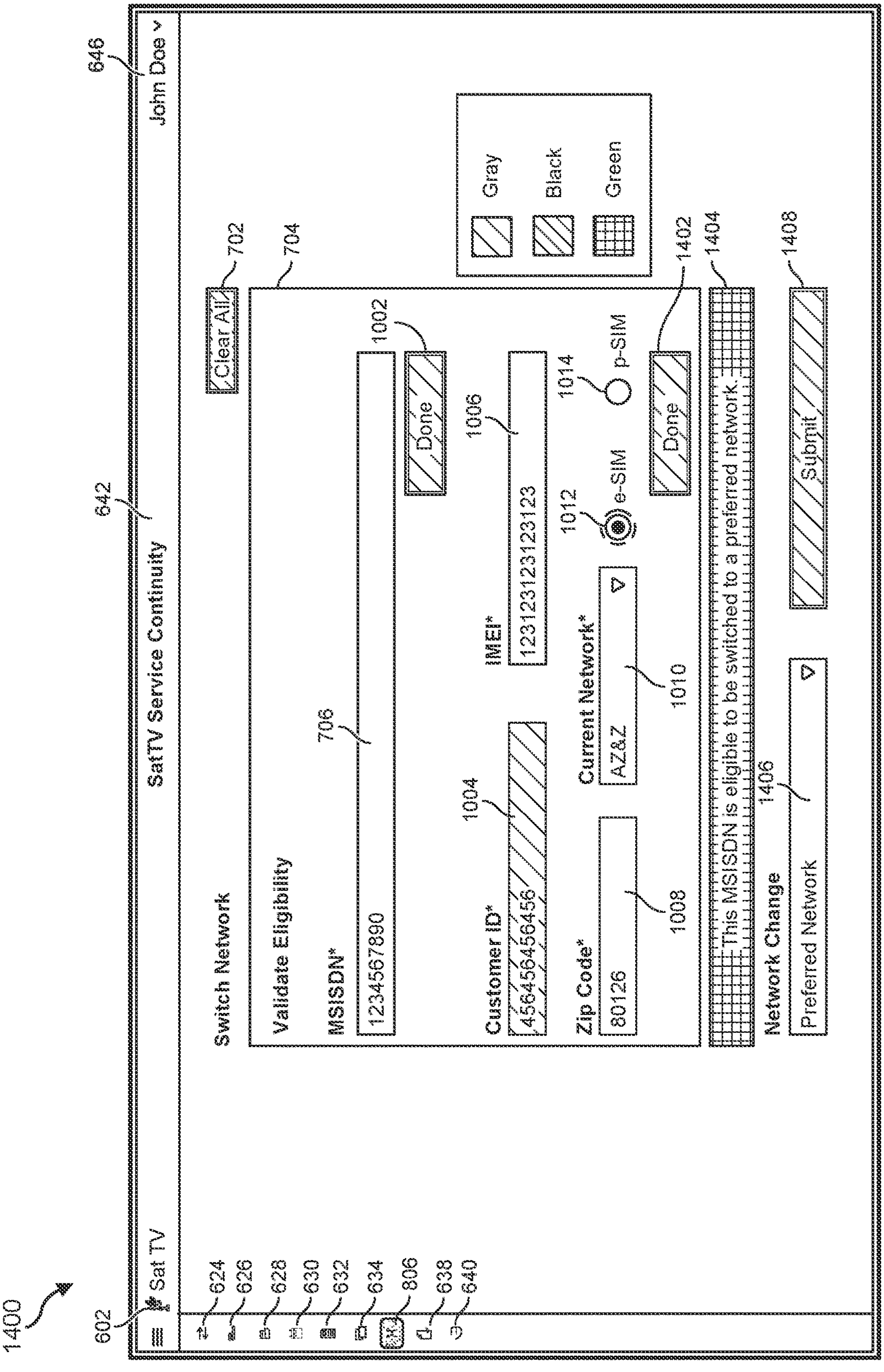
Figure 15:
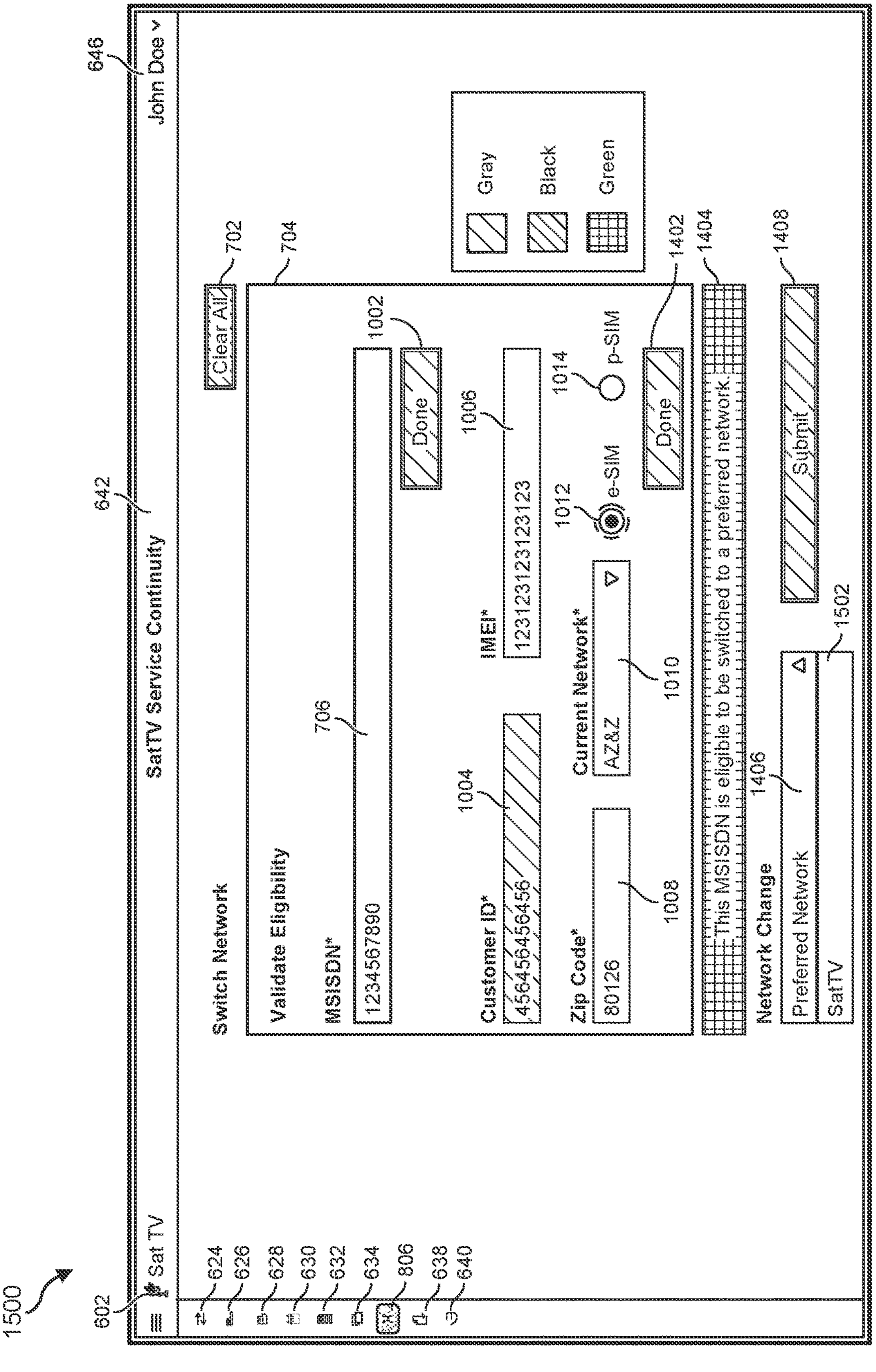

FIG. 13 shows a diagram 1300 in which the fields of the graphical user interface have generally been greyed out consistent with the color-coded legend, after the agent has pressed or toggled a validate button 1304. A legend 1311 has also been updated. Additionally, the text associated with validate button 1304 has transitioned from "validate" to "validating . . . " as shown. FIG. 14 shows a diagram 1400 which further shows an additional progression of the sequence of the graphical user interface. In particular, diagram 1400 inserts a done button 1402, an eligibility indicator 1404, a network change prompt 1406 and a submit button 1408. Done button 1402 may optionally enable the agent to conclude the session with the network switch procedure of menu button 620. Eligibility indicator 1404 may provide a response indicating whether the client is permitted to perform the network switch as specified or not. Network change prompt 1406 may enable the agent to select the target mobile network operator for the purpose of completing the network switch procedure. Accordingly, the agent may select from a corresponding drop-down menu the same mobile network operator that the agent had previously selected from current network indicator 1010, as discussed above. A drop-down menu 1502 within a diagram 1500 of FIG. 15 helps to illustrate this interactive functionality with respect to the graphical user interface. Returning to diagram 1400, in other examples, network change prompt 1406 may automatically populate with the same mobile network operator that the agent had used as the target mobile network operator with current network indicator 1010, thereby eliminating or minimizing additional manual interactivity with the agent and/or minimizing the potential for human error. After having selected, input, or confirmed the target mobile network operator within network change prompt 1406, the agent may press or toggle submit button 1408 to actually perform the network switch consistent with method 100, as discussed above.

Figure 16:
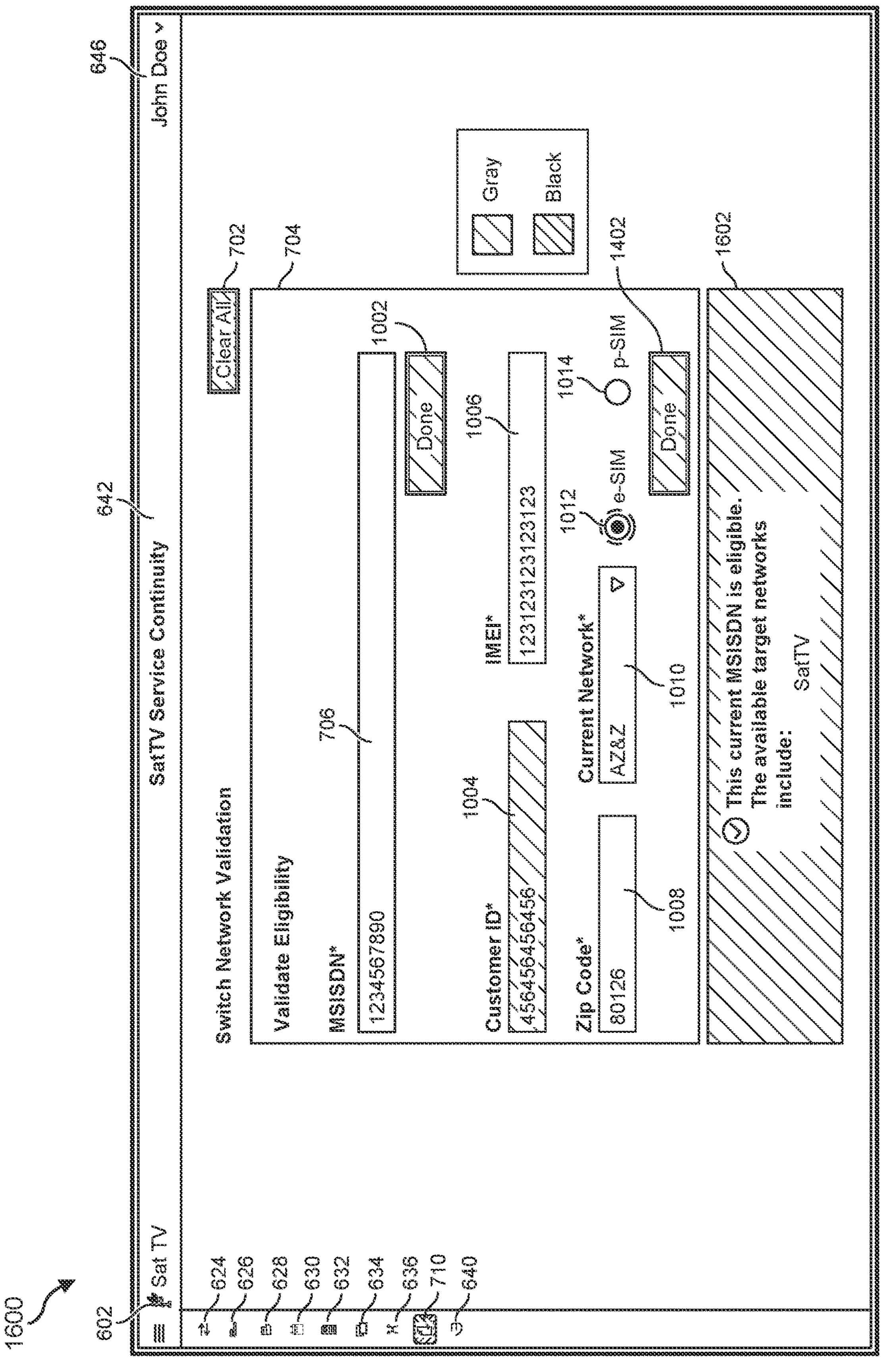

As further discussed above, menu button 620 for performing the switch network procedure and menu button 618 for performing the switch network validation procedure may substantially overlap, such that both procedures can involve the network switch validation procedure checking whether the network switch procedure is available or permitted as specified, while nevertheless the network switch procedure may further enable the agent to actually complete or finalize the network switch rather than merely check whether the network switch is permitted. Accordingly, for completeness, a diagram 1600 within FIG. 16 shows an eligibility indicator 1602, which can be displayed to the agent at the conclusion of performing the network switch validation procedure of menu button 618, as discussed above.

The graphical user interface of FIGS. 6-16 may also optionally bypass any request to the agent or client/subscriber for one or more items of client-specific information. In other words, in various examples method 100 may be performed in a manner that bypasses a request to the client for client-specific information due to the mobile virtual network operator already possessing the client-specific information. Such items of client-specific information may include one or more of an account number, an address, and/or pin number. As further discussed above, the graphical user interface may not include any fields or elements associated with the street address and/or pin number. Moreover, the graphical user interface may automatically populate with the customer identifier within customer identifier prompt 1004, as shown in FIG. 10, without the graphical user interface or agent needing to request this information. One or more of these items of information, or all of these items of information, may be requested or required as part of performing a traditional port in/out procedure in which the source mobile network operator is effectively abandoned, without the coordinating performed by the mobile virtual network operator, as discussed above. Requesting or requiring one or more of these items of information may effectively prevent, or help to address, instances of fraud whereby a criminal or other threat actor attempts to steal a corresponding victim's phone number or port the phone number to a different mobile network operator and corresponding account that is controlled by the criminal, for example.

In the context of method 100 involving the mobile virtual network operator, however, the same mobile virtual network operator may facilitate both the porting in procedure as well as the porting out procedure, in which case the request for one or more of these items of client-specific information may be effectively bypassed. For example, the request to the client for the customer number or account number may be bypassed because the mobile virtual network operator already possesses the information linking this customer number or account number with the corresponding phone number entered within input component 706. In contrast, in a related scenario in which the client contacts the target mobile network operator directly without interacting with a mobile virtual network operator, the target mobile network operator may not already possess the customer identifier associated with the source mobile network operator. Similarly, the target mobile network operator may not further possess the address information and/or pin information, as discussed above. Moreover, in some scenarios the requests for one or more of these items of information may have relatively high failure rates due to human error, forgetfulness, distraction, etc. Accordingly, the new ability of the mobile virtual network operator to effectively bypass the request to the client for one or more of these items of information may be advantageous by eliminating or reducing human error, reducing manual or human intervention by the client and/or the agent, and/or by reducing the failure rate associated with these network switch procedures, as further discussed above.

Figure 17A:
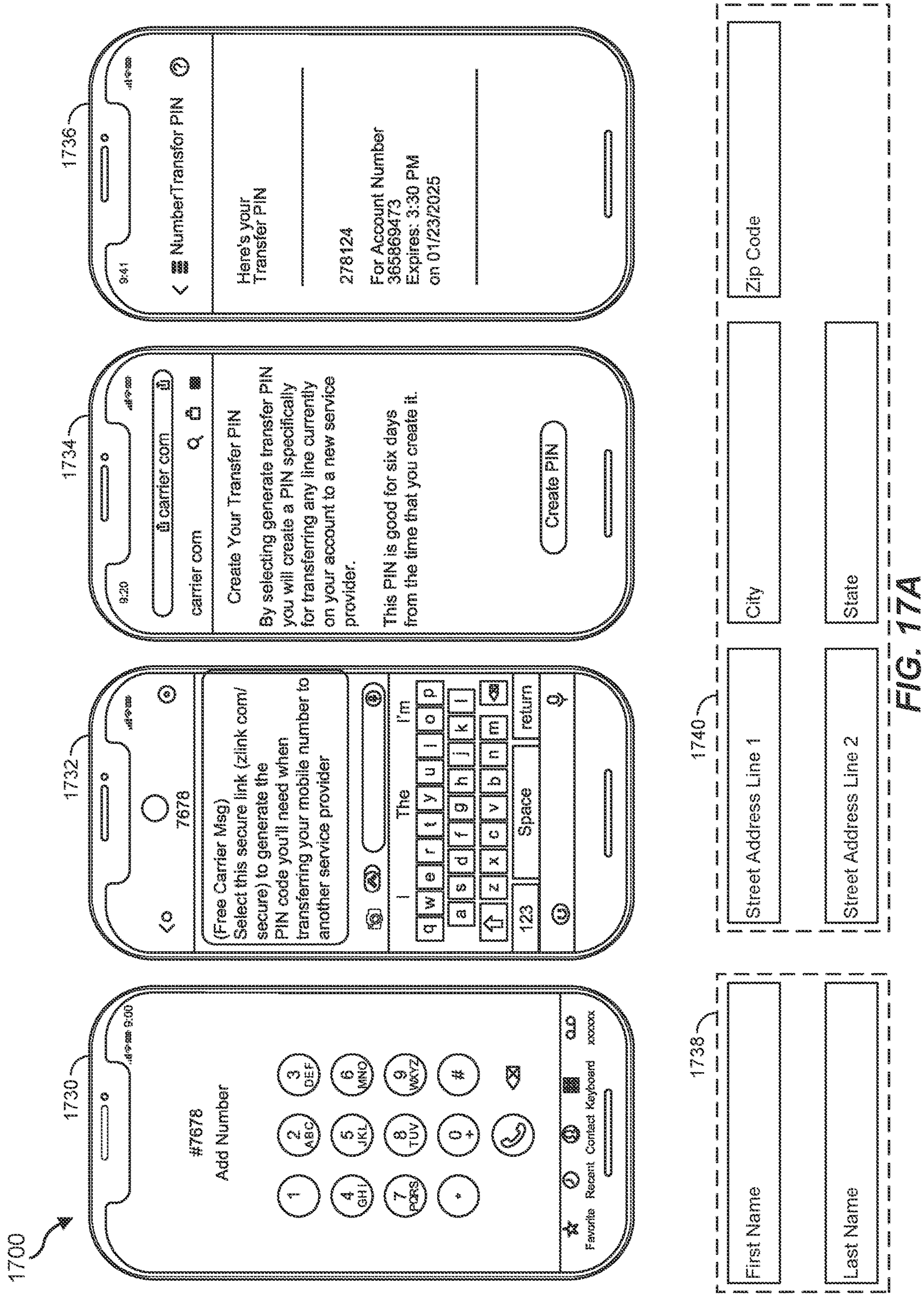
FIG. 17A shows a series of diagrams distinguishing between three separate types of plans provided by the mobile virtual network operator, including a prepaid plan, a postpaid plan, and an infrastructure-specific or device-specific plan.

FIG. 17A shows a series 1700 of diagrams 1730-1740 helping to illustrate, in a related scenario, how different items of client-specific information may be requested as part of a network switch procedure that may be performed without the facilitation of an intermediary mobile virtual network operator. Diagrams 1730-1736 show a sequence of graphical user interface stages by which a client may request client-specific information as part of abandoning a previous mobile network operator and transitioning to a new mobile network operator. Diagram 1730 shows that the client may contact or text a particular number that is directed to requesting client-specific information. Diagram 1732 shows that, in response, the previous mobile network operator may provide a port in/out pin code to the client. Diagram 1734 shows that the client may press a confirmation button to trigger the creation or generation of the port in/out pin code. Diagram 1736 shows that the client may receive, in response, the port in/out pin code and/or the client account number with the previous mobile network operator.

In addition to the port in/out pin code and/or the client account number with the previous mobile network operator, the new mobile network operator may also request or require one or more other items of client-specific information. Diagram 1738 shows that the client may be requested to provide an exact name, including a first name and/or last name. Additionally, or alternatively, diagram 1740 also shows that the client may be requested to provide one or more items of address information, including one or more of the fields shown within diagram 1740, including potentially the full address information, as shown.

Advantageously, the various network switch procedures outlined in this disclosure, as facilitated by the mobile virtual network operator, may bypass the request for one or more of the port in/out pin code, the client account number with the previous mobile network operator, the name information, and/or the address information. In various examples, the mobile virtual network operator may be configured with the source mobile network operator and the target mobile network operator in a streamlined manner that enables the mobile virtual network operator to automatically populate one or more fields with these items of client-specific information directly, without the client being forced, requested, or required to obtain and provide these items of client specific information themselves. In some examples, the security benefit associated with requesting these items of client-specific information in the related scenario may be assured through one or more substitute procedures, such as the mobile virtual network operator verifying the identity of the person requesting the network switch using a security pin that the client has with the mobile virtual network operator (as distinct from the port in/out pin code provided by the previous mobile network operator) and/or another substitute identity-verification procedure, which in some cases can be more convenient, less cumbersome, and/or less prone to error than requesting the client to provide the client-specific information in the related scenario.

Figure 17B:
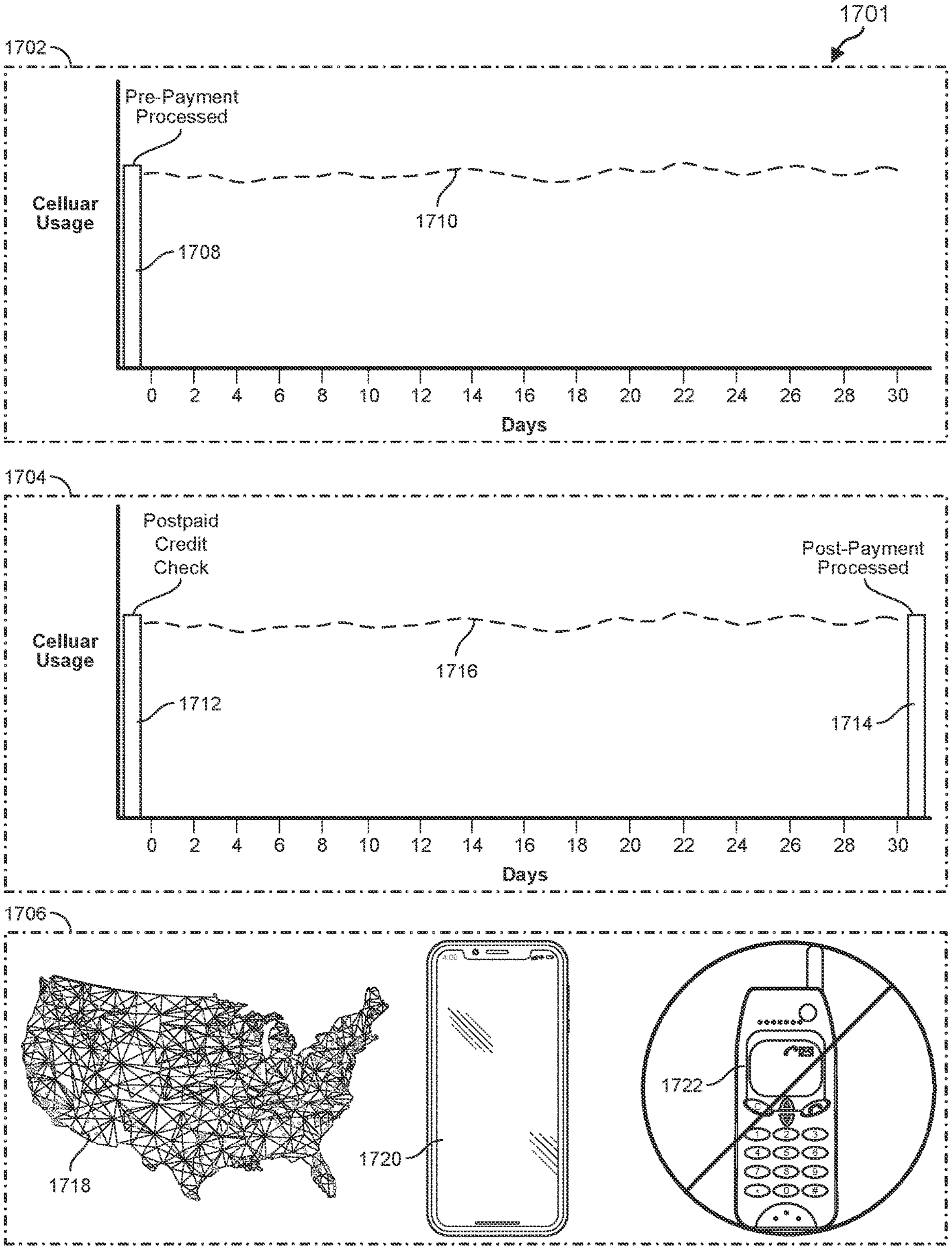
FIG. 17B shows a series of diagrams showing how a transfer pin may be retrieved according to a related methodology.

In various examples, method 100 may be performed in coordination with a digital operator platform. FIG. 17B shows a series 1701 of a diagram 1702, diagram 1704, and a diagram 1706 illustrating three different plans or options to which a user or client can subscribe using the digital operator platform. Diagram 702 corresponds to a pre-paid plan that indicates a pre-payment process event 1708 at the beginning of a month prior to network services consumption according to a curve 1710, as shown. In contrast, diagram 1704 corresponds to a postpaid plan that indicates a postpaid credit check 1712 at the beginning of a month prior to network services consumption according to a curve 1716. Diagram 1704 also further illustrates how, at the end of the month, a post-payment process event 1714 may be performed consistent with this plan. Lastly, diagram 1706 may help to illustrate to the reader a third plan or option that limits a user or client to a particular mobile network operator and/or a particular device type. For example, this third plan may provide access to a fifth-generation or beyond cellular network infrastructure on a nation-wide scale, as shown by a coverage map 1718. Additionally, or alternatively, this third plan corresponding to diagram 1706 may require the user or client to use one particular device type, corresponding to a device 1720, rather than using any other type of device, which is illustrated using the disallowed device 1722, as shown.

FIG. 17B shows a series of diagrams distinguishing between three separate types of plans provided by the mobile virtual network operator, including a prepaid plan, a postpaid plan, and an infrastructure-specific or device-specific plan. The relevance of series 1701 of these diagrams becomes more apparent when one considers the network switch validation procedure discussed above in the context of the graphical user interface as well as further discussed below in the context of FIG. 20A. In particular, each of the different plans or options associated with series 1701 may be further associated with particular billing or payment plans. Nevertheless, not every source mobile network operator or target mobile network operator may provide, or be consistent with, one or more of these billing or payment plans. Accordingly, performing the network switch validation procedure may check whether the target mobile network operator, as indicated within the graphical user interface, would be consistent with the particular payment plan on which the user or client is already subscribed, as discussed in more detail below. Similarly, not all mobile network operators will be consistent with, or provide coverage for, all device types. In the example of diagram 1706, a particular device 1720 may be required in order to receive coverage through a particular mobile network operator. Accordingly, when the agent indicates the device type that the user or client already has (see international mobile equipment identity prompt 1006 above), the network check validation procedure can further check whether the target mobile network operator is consistent with, or provides service support for that particular device type (e.g., device 1720 rather than disallowed device 1722).

Figure 18A:
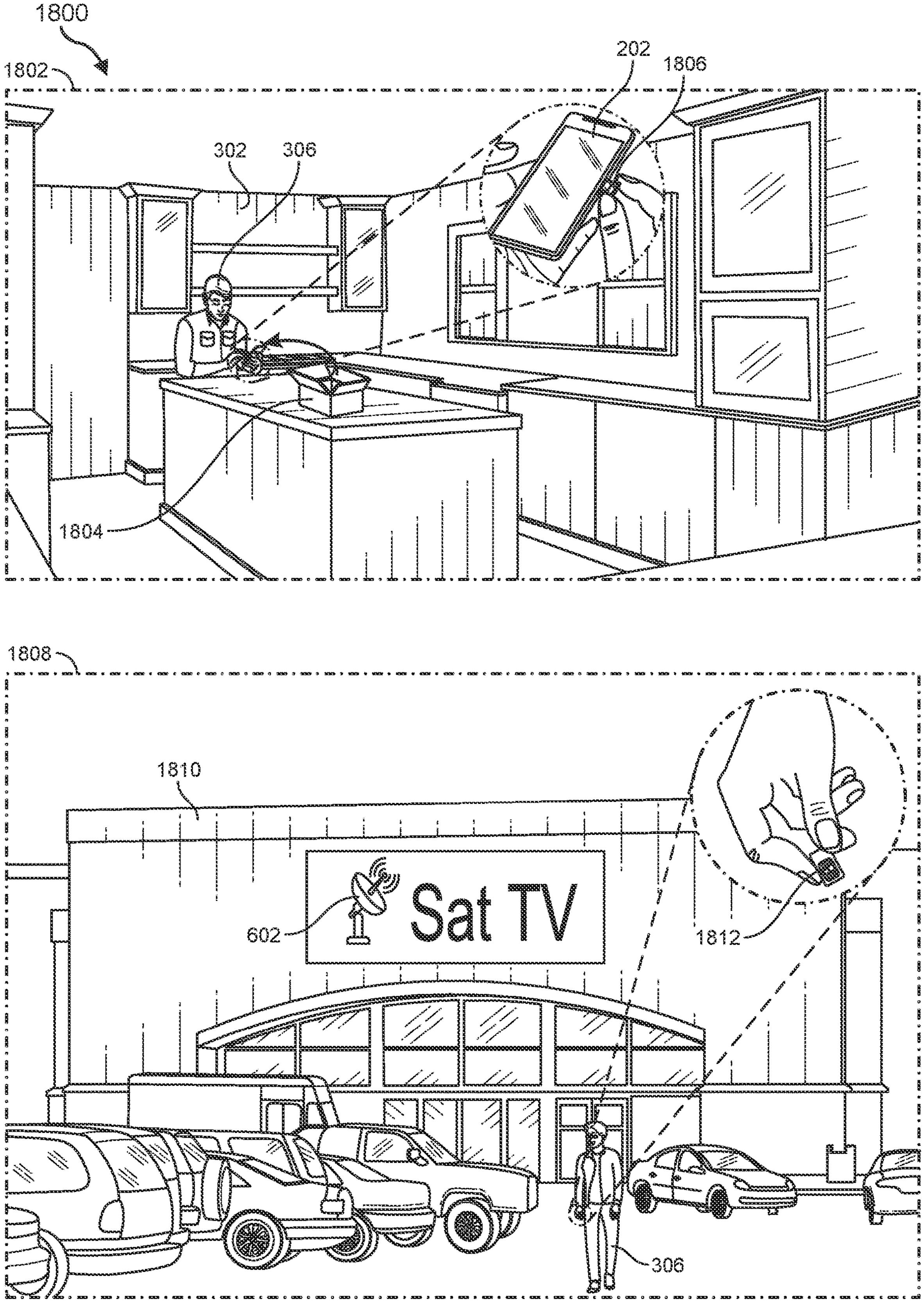
FIG. 18A shows a series of diagrams indicating how the user may obtain a physical subscriber identity module card as part of completing the network switch.

FIG. 18A shows a series 1800 of a diagram 1802 and a diagram 1808 indicating how the user may obtain a physical subscriber identity module card as part of completing the network switch. In some examples involving this scenario, the mobile virtual network operator facilitates provisioning the physical subscriber identity module card to a device of the client as part of completing the network switch. In particular, diagram 1802 indicates how client 306 within remote cabin 302 may insert a physical subscriber identity module card 1806. Physical subscriber identity module card 1806 may have been received from a package 1804, which may have been transmitted or delivered from the mobile virtual network operator and/or the target mobile network operator associated with the network infrastructure to which the client is transitioning, as discussed above. Accordingly, in the example of diagram 1802, the client receives the physical subscriber identity module card through physical mail delivery. In these examples, the network switch may have been initiated by the client and/or the mobile virtual network operator. In scenarios where the target mobile network operator uses a physical subscriber identity module card, then the mobile virtual network operator may initiate proactively the network switch at least in part by facilitating the provisioning of the physical subscriber identity module card to the client or to the device of the client as part of completing the network switch.

Additionally, or alternatively, diagram 1808 shows how client 306 may receive another physical subscriber identity module card 1812. Rather than receiving physical subscriber identity module card 1812 through mail delivery, as in the example of diagram 1802, client 306 in diagram 1808 may receive physical subscriber identity module card 1812 from a retail location 1810, which can display another instance of the corresponding logo 602.

Series 1800 of diagram 1802 and diagram 1808 help to illustrate to the reader how, in some variations of method 100, the device on which the client is performing the network switch and/or the target mobile network operator may involve or require a physical subscriber identity module card. Accordingly, in these examples, the mobile virtual network operator may facilitate the provisioning of another instance of a physical subscriber identity module card that is appropriately configured for usage with the target mobile network operator. In other words, as understood by those having skill in the art, when a device or target mobile network operator uses or requires a physical subscriber identity module card, and the client seeks to switch from one mobile network operator to another mobile network operator, then a new and distinct physical subscriber identity module card may be involved to activate services with the target mobile network operator. In the example of method 100 where this network switch procedure is performed or facilitated by a mobile virtual network operator, then the mobile virtual network operator may facilitate the provisioning of the new instance of the physical subscriber identity module card that is configured for usage with the target mobile network operator to enable the user to successfully perform the network switch procedure. The scenario of series 1800 addresses the practical realities that, in general, physical subscriber identity module cards are specific to, or limited to, particular mobile network operators respectively, such that performing a network switch procedure from a source mobile network operator to a target mobile network operator generally involves provisioning a new or distinct physical subscriber identity module card.

Figure 18B:
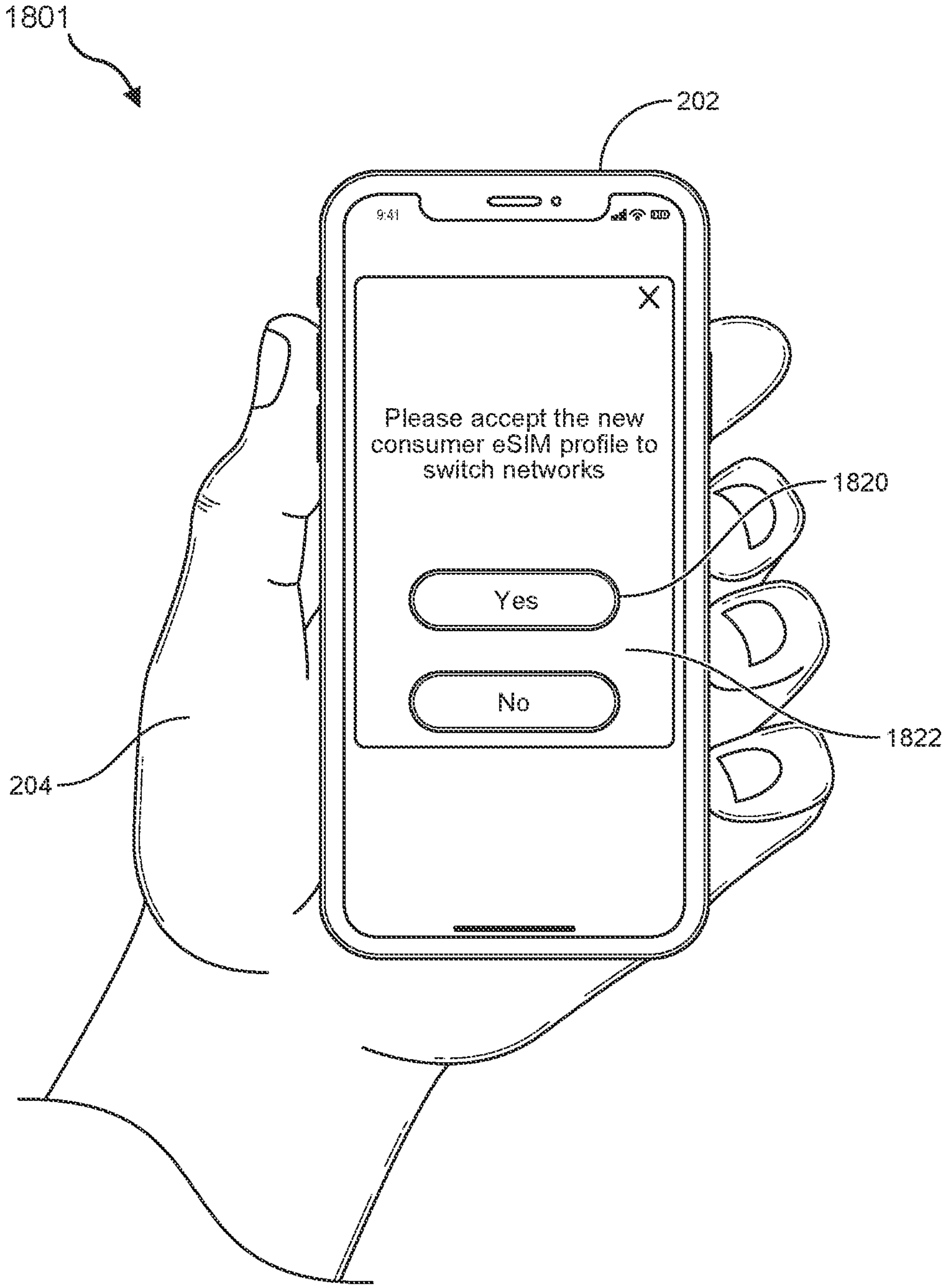
FIG. 18B shows a diagram illustrating how the user may be prompted to manually accept a new consumer electronic subscription identity module profile that is associated with the target mobile network operator as part of performing the network switch procedure.

FIG. 18B shows a diagram illustrating how the user may be prompted to manually accept a new consumer electronic subscription identity module profile that is associated with the target mobile network operator as part of performing the network switch procedure. In contrast to machine-to-machine electronic subscriber identity module embodiments, consumer electronic subscriber identity module embodiments may involve some interactivity with the client in order for the client to accept the new profile for the electronic subscriber identity module. In the example of this figure, the client may select a button 1820 or a button 1822 in order to decide whether to accept the new profile for the electronic subscriber identity module.

In other examples, the network switch to the target mobile network operator uses a machine to machine electronic subscriber identity module for the target mobile network operator. In these examples, the mobile virtual network operator may initiate proactively the network switch at least in part by performing the network switch in a manner that is invisible to the client (i.e., that operates in the background) or that does not involve input from the client.

Figure 19A:
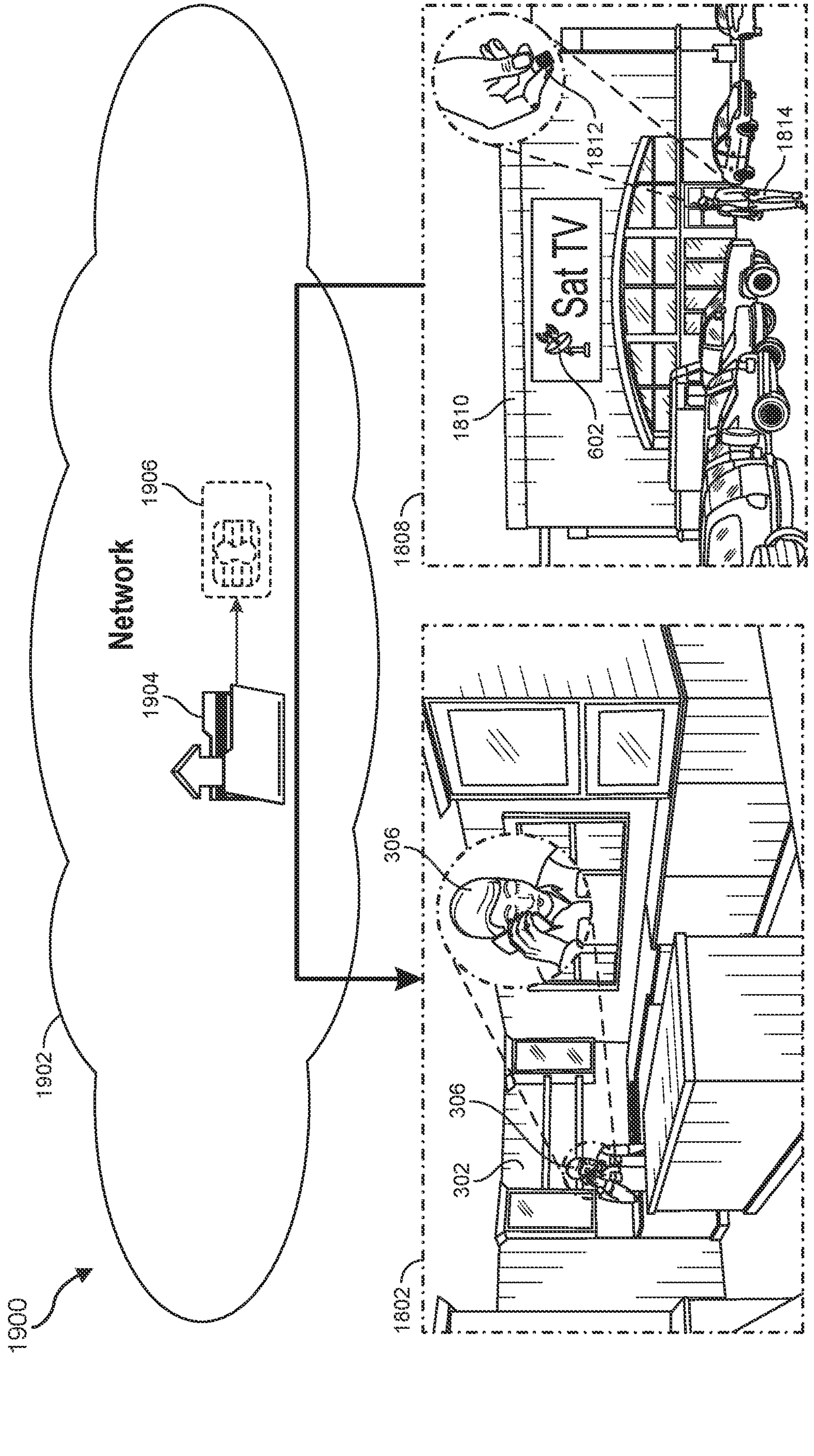
FIG. 19A shows a diagram indicating how the user may receive an electronic subscriber identity module as part of completing the network switch.

Additionally, or alternatively, in some examples the device of the client on which the network switches being performed operates using a machine to machine electronic subscriber identity module. FIG. 19A shows a diagram 1900 indicating how client 306 may receive an electronic subscriber identity module 1906 as part of completing the network switch. In some examples, electronic subscriber identity module 1906 may be stored within a file 1904 or other package or container for transmitting corresponding software components. In particular, diagram 1900 includes a version of diagram 1802 and a version of diagram 1808 thereby illustrating how, in such examples, the mail delivery or in-store pickup procedure of series 1800 are not required or involved, due to the fact that electronic subscriber identity module 1906 may be transmitted electronically over a network 1902, such as the Internet, as distinct from a physical subscriber identity module card, which must be transmitted physically, as discussed above. In other words, in these embodiments the network switch may be performed over the air (OTA). Moreover, in various examples involving the electronic subscriber identity module, the mobile virtual network operator performs the network switch in a manner that is invisible to the client. These examples can include scenarios where the electronic subscriber identity module corresponds to, or includes, an embedded universal integrated circuit card. Additionally, or alternatively, other examples can include scenarios where the electronics subscriber identity module corresponds to a machine-to-machine (M2M) implementation. In contrast, in some non- M2M or consumer electronic subscriber identity module scenarios, completing the network switch using the electronic subscriber identity module may involve the user of the device locally interacting with the device or entering input to accept or approve the non-M2M electronic subscriber identity module.

Figure 19B:
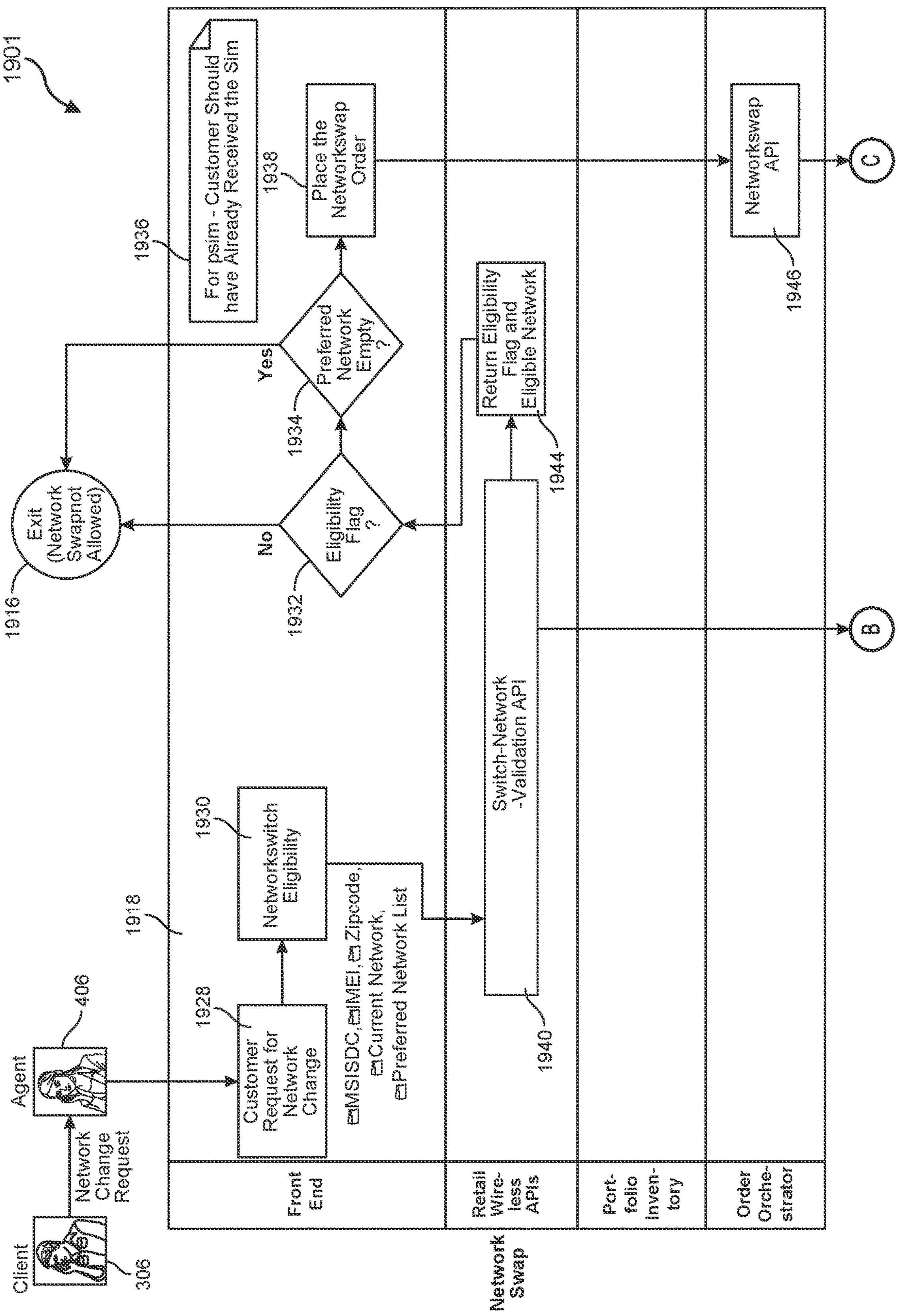
FIG. 19B shows a workflow diagram indicating a sequence of steps corresponding to ordering and completing the network switch.

FIG. 19B shows a workflow diagram 1901 indicating a sequence of steps corresponding to ordering and completing the network switch. Workflow diagram 1901 can begin with client 306 requesting the network change, or providing an indication or suggestion to perform the network change, to agent 406, as discussed above in connection with FIGS. 2-4. In various examples, client 306 may provide this indication through a telephone call, through a smartphone application interface, and/or through a desktop web browser, etc. For example, the client or customer may indicate to the agent of the mobile virtual network provider that the network coverage and/or signal strength a current location of the client is low quality.

In response, agent 406 may record the customer request for network change at step 1928, which may further trigger the performance of the network switch validation procedure, as discussed above, at a step 1930 shown in workflow diagram 1901. The record of the customer request for the network change may include an identification or indication of one or more of the following items of information: the client's phone number, the client device type, the client's zip code, the client's current network or mobile network operator, and/or the client's preferred or desired target mobile network operator.

Consequently, at a step 1940, the network switch validation procedure may be performed through a corresponding application programming interface. As shown, from step 1940 workflow diagram 1901 may proceed to the flow diagram of the next figure, FIG. 20A.

Figure 20A:
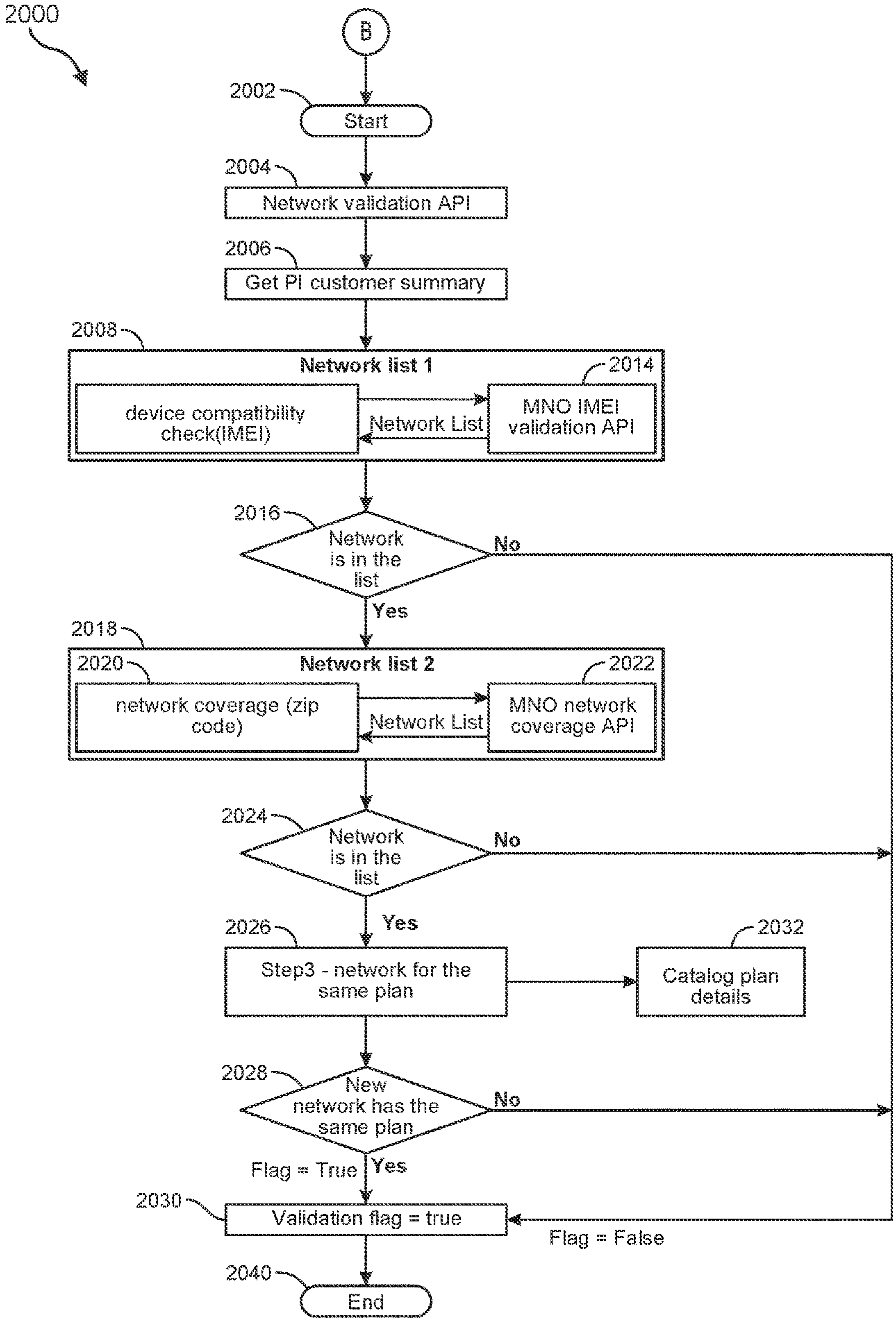
FIG. 20A shows a flow diagram indicating a sequence of steps for testing whether the network switch is available to a particular user based on one or more specified conditions.

FIG. 20A shows a flow diagram for a method 2000 indicating a sequence of steps for testing whether the network switch is available to a particular user based on one or more specified conditions and consistent with the discussion of FIGS. 6-16 above. At step 2002, method 2000 may begin. At step 2004, the network switch validation procedure application programming interface may be invoked. At step 2006, the network switch validation procedure may obtain a summary of information describing the customer, or relating to the customer, from the portfolio inventory. The portfolio inventory may correspond to an inventory or database providing records of what products, services, and/or resources have been allocated to a particular customer.

At step 2008, the network switch validation procedure may check whether the device type of the customer is supported by the target mobile network operator. Accordingly, the network switch validation procedure may check whether a list of mobile network operators that support the device type of the client includes the target mobile network operator that the user, client, subscriber, and/or agent has specified as desired or preferred, as discussed above.

If the answer is no at a decision step 2016, which indicates that the target mobile network operator is not included within the corresponding list, then method 2000 may return a value of false at a corresponding step 2030, as shown, or otherwise indicate that the target mobile network operator does not support the device type of the client. Alternatively, if the answer is yes at decision step 2016, then method 2000 may proceed to step 2018, at which point method 2000 may check whether the target mobile network operator provides coverage at the zip code for the client. For example, method 2000 may check whether a list of mobile network operators that provide coverage to the zip code for the client includes the target mobile network operator specified through the graphical user interface of FIGS. 6-16.

If the answer is no at decision step 2024, which indicates that the target mobile network operator is not included within the corresponding list, then method 2000 may return a value of false at the corresponding step 2030. Alternatively, if the decision is yes at decision step 2024, then method 2000 may proceed to a step 2026, at which point method 2000 checks whether the target mobile network operator provides the same plan as the plan in which the client is currently subscribed, or otherwise provides a plan that is sufficiently similar or consistent according to a predefined policy. If the answer is yes at decision step 2028, then method 2000 may proceed to step 2030 and report a value of true. Otherwise, if the answer is no at decision step 2028, method 2000 may report a value of false at step 2030.

Those having skill in the art will readily understand that the three separate checks performed as part of method 2000 and corresponding to decision step 2016, decision step 2024, and decision step 2028 may not each be necessary as part of the overall network switch validation procedure. Accordingly, in various embodiments, only one or two of these three separate options may be included within a network switch validation procedure. Additionally, or alternatively, in other variations one or more additional checks may be supplemented onto method 2000 as appropriate or as desired. Similarly, those having skill in the art will readily understand that the order in which these three separate checks are performed may be arbitrary such that the order may be reversed or rearranged without deviating from the overall inventive concept of the technology described within this application, for example.

Figure 20B:
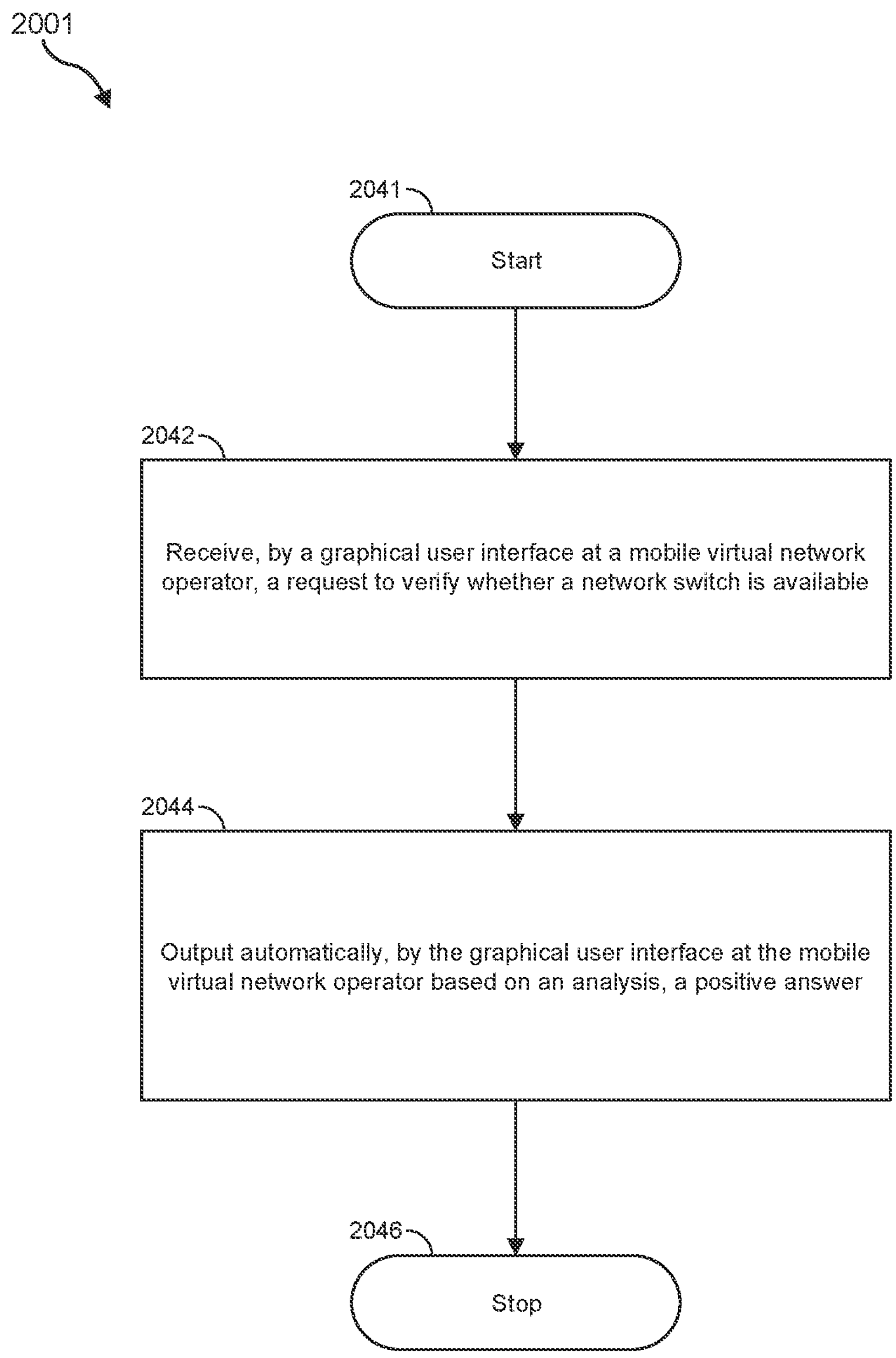
FIG. 20B shows a flow diagram for a method for performing a network switch validation procedure.

FIG. 20B shows a flow diagram for a method 2001 for performing a network switch validation procedure. At a step 2041, method 2001 may start or begin. At step 2042, the method may further include receiving, by a graphical user interface at a mobile virtual network operator, a request to verify whether a network switch is available for the mobile virtual network operator to switch a client from a source mobile network operator that is serving the client for the mobile virtual network operator to a target mobile network operator that is serving clients for the mobile virtual network operator. At step 2044, the method may further include outputting automatically, by the graphical user interface at the mobile virtual network operator based on an analysis of attributes of at least the client and the target mobile network operator, a positive answer indicating that the network switch is available for the mobile virtual network operator to switch the client from the source mobile network operator that is serving the client for the mobile virtual network operator to the target mobile network operator that is serving clients for the mobile virtual network operator. At step 2046, method 2001 may stop or conclude. As used herein, the term "graphical user interface" can broadly refer to both the logic for accepting input and forwarding output as well as the underlying intelligence or logic that is generating the output to be displayed.

Figure 20C:
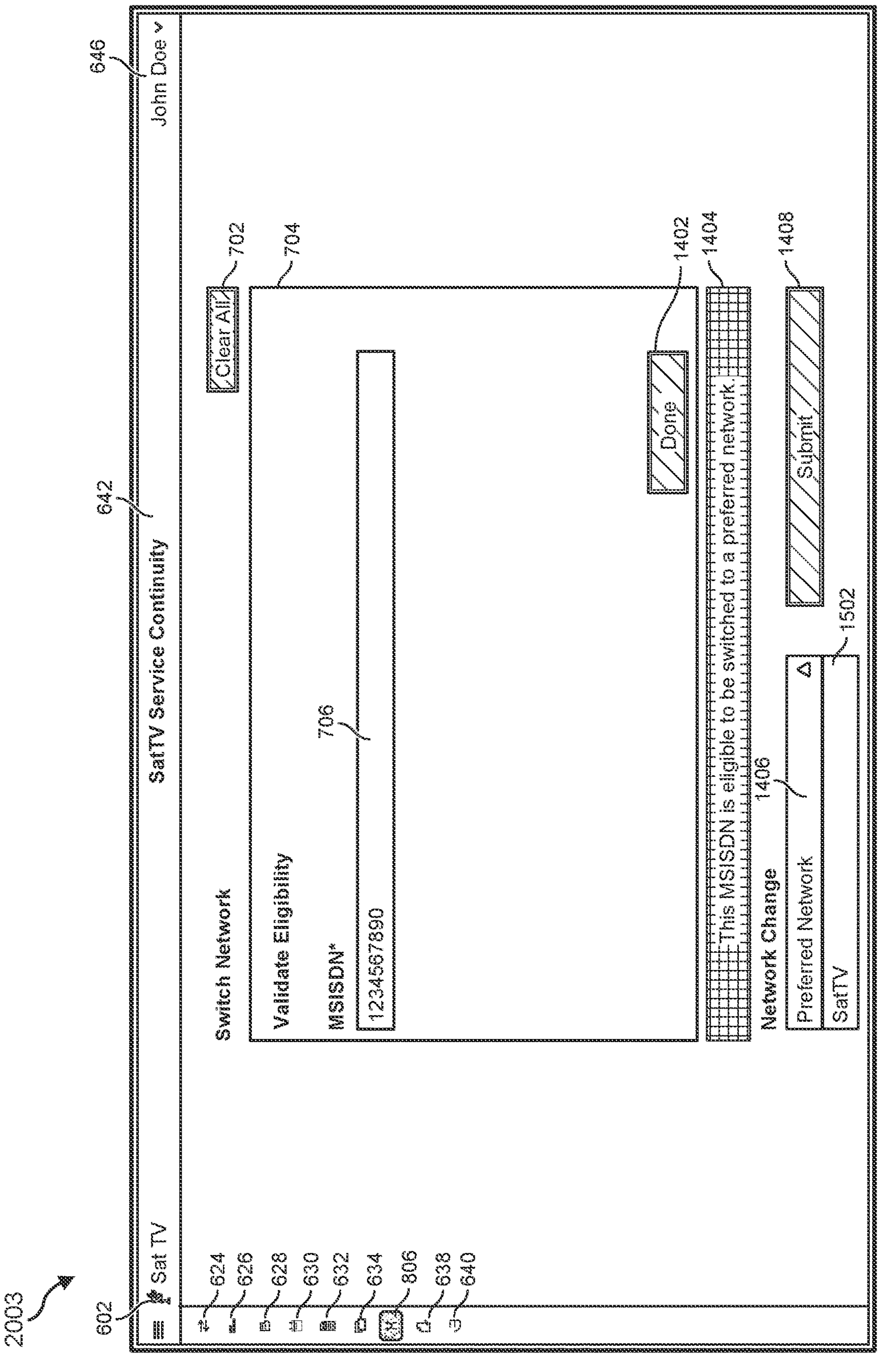
FIG. 20C shows a diagram of a graphical user interface that may facilitate the performance of the network switch procedure.

FIG. 20C shows a simplified diagram 2003 of diagram 1400 in FIG. 14. In comparison to diagram 1400, diagram 2003 has removed some elements from validate eligibility box 704. Accordingly, within diagram 2003, validate eligibility box 704 still includes input component 706 where the agent or user may enter a mobile station international subscriber directory number, telephone number, and/or other subscription identifier. The agent may enter this item of information at step 2042 of method 2001, as discussed above. In response, the front end associated with the graphical user interface may output eligibility indicator 1404 at step 2044. In the example of diagram 2003, eligibility indicator 1404 may simply indicate whether the client is eligible to be switched to any different mobile network operator that is serving clients of the mobile virtual network operator. In these scenarios, the user or agent might not, prior to performing the network validation procedure, indicate a preferred network that the client is particularly interested in and, accordingly, the eligibility analysis may be performed to ascertain whether the client can be switched to any different mobile network operator. In these scenarios, network change prompt 1406 may list one or more mobile network operators that may be available as the target for performing the network switch procedure. Alternatively, in other examples, the agent or user may specify a particular mobile network operator in advance of performing the network switch validation procedure and, in response, may receive a binary result indicating whether the network procedure is available for that particular mobile network operator as the target mobile network operator, as distinct from an eligibility indication of whether any mobile network operator is available as the target for performing the network switch procedure.

Figure 20D:
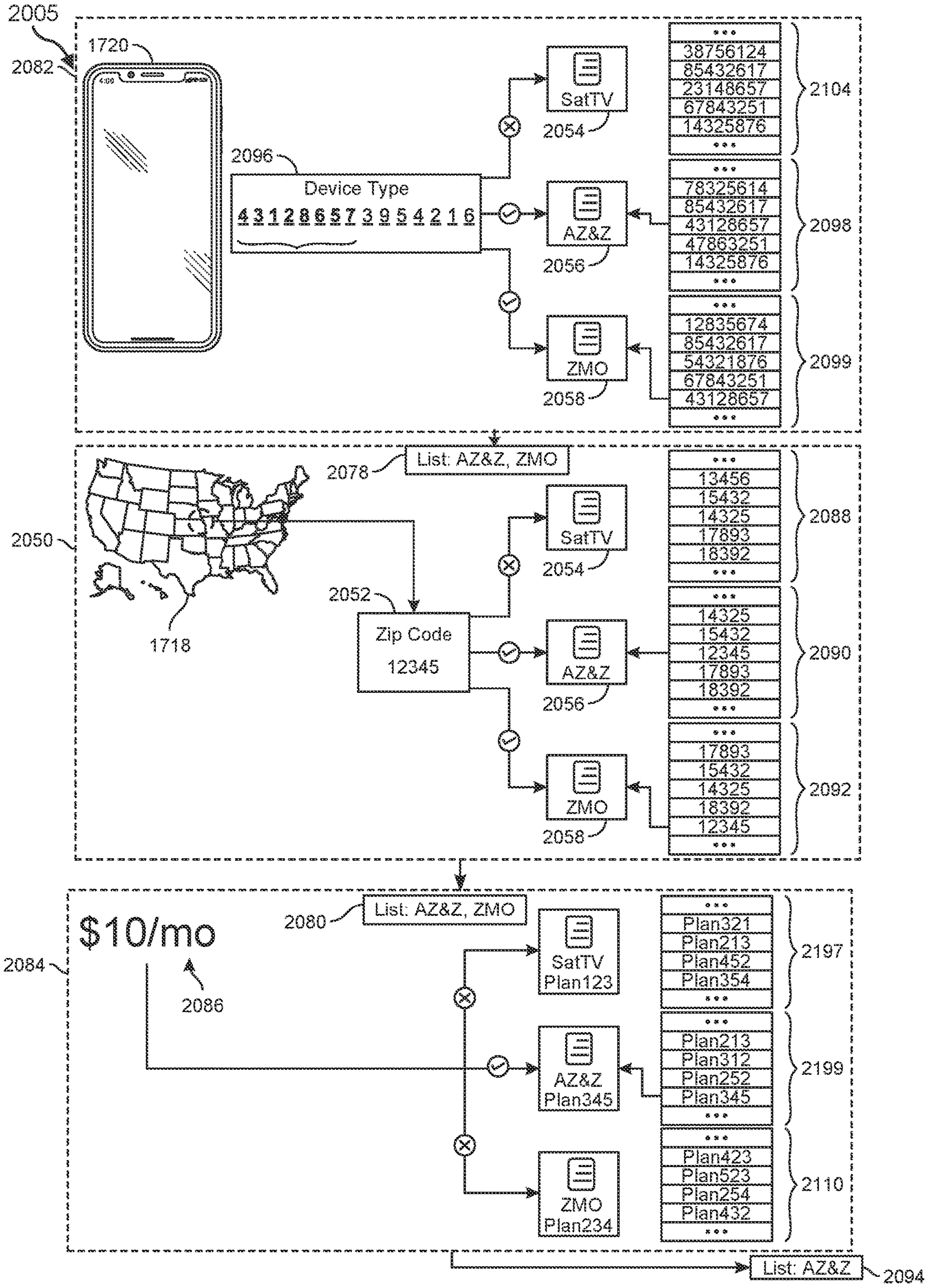
FIG. 20D shows a series of diagrams corresponding to a workflow of how the network switch validation procedure may be performed.

The mobile virtual network operator may perform method 2001 in a variety of ways. Generally speaking, the mobile virtual network operator may perform method 2001 at least in part by performing one or more checks, including the three checks described below. FIG. 20D shows a series 2005 of diagrams including a diagram 2050, a diagram 2082, and a diagram 2084, which can correspond to the three checks that are further described below. The first check may include checking automatically, by the graphical user interface at the mobile virtual network operator in response to receiving the request, whether an international mobile equipment identity of a device of the client is covered by the target mobile network operator to return a first value. Accordingly, diagram 2082 shows again device 1720, which has a corresponding device type 2096 indicated by an international mobile equipment identity. As shown, the first eight digits of the international mobile equipment identity may correspond to a type allocation code indicating the type of the corresponding device. Accordingly, mobile network operator 2054, mobile network operator 2056, and mobile network operator 2058 may provide a list 2104, a list 2098, and a list 2099, respectively, that indicate which device types are covered or supported by the mobile network operator. This can result in a list 2078 of the mobile network operators that provide coverage for the type allocation code included within the international mobile equipment identity of a device used by a requesting client, as discussed above. In other words, the method may further include invoking, by the mobile virtual network operator, an international mobile equipment identity application programming interface that returns a list of mobile network operators that are serving the mobile virtual network operator and that support an international mobile equipment identity or type allocation code of a device of the client. In these examples, the mobile virtual network operator may further check whether the target mobile network operator is included within the list of mobile network operators.

The second check may include checking automatically, by the graphical user interface at the mobile virtual network operator in response to receiving the request, whether a geographic location of the client is covered by the target mobile network operator to return a second value. Accordingly, diagram 2050 repeats coverage map 1718 and further provides a workflow including a target zip code 2052, which can be checked against a mobile network operator 2054, a mobile network operator 2056, and the mobile network operator 2058, as shown. In particular, the workflow further illustrates how each one of the respective mobile network operators has a list 2088, a list 2090, and a list 2092, respectively, of zip codes that are covered by the corresponding mobile network operator. Accordingly, within diagram 2050, a check may be performed whether the target zip code 2052 is present within the list of zip codes for each respective mobile network operator. In the particular example of this figure, the target zip code is found within list 2090 and list 2092, as shown. This may produce a list 2080 as shown. Accordingly, these two mobile network operators may be forwarded, as a result, to a next stage of the validation procedure, at which point a third check may be performed. In other words, in some examples the second check includes invoking, by the mobile virtual network operator, a network coverage application programming interface that returns a list of mobile network operators that are serving the mobile virtual network operator and that cover a geographic location of the client and checking whether the target mobile network operator is included within the list of mobile network operators. For any one or more of the first check, second check, third check, and/or other alternative checks the resulting list of mobile network operators as candidate target mobile network operators may automatically exclude the source mobile network operator, since the network switch would never be performed from the same mobile network operator to itself.

The third check may include checking automatically, by the graphical user interface at the mobile virtual network operator in response to receiving the request, whether the target mobile network operator provides a target configuration that satisfies a consistency policy with a source configuration on which the source mobile network operator is providing telecommunication service to the client to return a third value. Accordingly, diagram 2084 shows a plan indicator 2086 that indicates one or more attributes of a corresponding billing or resource exchange plan on which the requesting client has already been onboarded with the source mobile network operator. Accordingly, the mobile virtual network operator may check within a list 2199 for mobile network operator 2056, a list 2197 for mobile network operator 2054, and a list 2110 for mobile network operator 2058 to verify whether these mobile network operators provide a plan that is the same as, or consistent with, the plan from the source mobile network operator. As shown, only mobile network operator 2056 may provide a plan that is the same as, or consistent with, the plan of the source mobile network operator. Accordingly, diagram 2084 may indicate an output of a list 2094 that only includes mobile network operator 2056, which is the only mobile network operator that satisfies the three separate checks in series, as discussed above.

Additionally, or alternatively, in other embodiments the network switch validation procedure may also perform one or more additional checks. For example, the mobile virtual network operator may check whether or not the client already has an order that is currently in process and not yet completed or finalized, which can be ascertained with respect to the order orchestrator. As another example, the mobile virtual network operator may check whether the port in procedure is available with respect to the client and the target mobile network operator. Accordingly, the overall results of the network switch validation procedure may be failure if any of these different checks fails, even if all of the other remaining checks pass.

In some examples, the third check checks automatically whether the target configuration and the source configuration are identical. Additionally, or alternatively, the third check can include checking whether the target configuration and the source configuration are consistent with each other. In other words, the mobile virtual network operator may establish thresholds and/or tolerance levels, or other criteria, indicating when a plan available at a target mobile network operator is nevertheless consistent with a plan available at a source mobile network operator despite the fact that these two respective plans are not absolutely identical. By way of illustrative example, a plan of "$9.99/month" may be consistent with the plan of "$10.00/month" according to a consistency policy established by the mobile virtual network operator due to the difference between two different values of a respective field (e.g., price) in these two plans is sufficiently small below a threshold or within a tolerance amount. Moreover, although this example focuses upon the value of the price per month, the consistency policy may evaluate any one or more of a multitude of different fields associated with, or defined within, corresponding billing or resource exchange plans to determine whether the values of these fields satisfy the consistency policy.

In some examples, the mobile virtual network operator may output automatically the positive answer based on one, two, or three of the return values for the three respective checks being true. Generally speaking, the mobile virtual network operator may in some scenarios prefer to require or request that all three of the first value, the second value, and the third value are true.

In some examples, a request to the client for client-specific information is bypassed due to the mobile virtual network operator already possessing the client-specific information. As discussed above in connection with series 1700, the items of client-specific information may include one or more fields of the address of the client, such as the entire or full address of the client.

Moreover, additionally or alternatively, in these examples, the analysis of the network switch validation procedure can be performed after the client has already been onboarded with the mobile virtual network operator through the source mobile network operator rather than performing the analysis as part of onboarding the client with the mobile virtual network operator. In other words, the analysis of whether the client can be switched from the source mobile network operator to the target network operator can be performed at a time when the client has already been onboarded with the source mobile network operator and while the source mobile network operator and the target network operator are both serving clients for the mobile virtual network operator. Accordingly, this scenario can be readily distinguished by those having skill in the art from a related scenario where a client has not yet subscribed to a mobile virtual network operator and is inquiring about whether a switch can be performed from a current mobile network operator that is serving the client but which is divorced or not associated with the mobile virtual network operator to a single mobile network operator that is serving the mobile virtual network operator.

Returning to workflow diagram 1901 in FIG. 19B, at the conclusion of the corresponding network switch validation procedure, workflow diagram 1901 may proceed to a step 1944 and return the corresponding eligibility flag and/or the corresponding mobile network operator to which this eligibility flag applies. In other words, in some examples the network switch validation procedure may check whether the network switch is available to be performed with respect to any one or more mobile network operators associated with the mobile virtual network operator, while in other examples the network switch validation procedure may check whether the network switch is available to be performed with respect to a particular mobile network operator as specified by the client and/or the agent, as discussed above. In the latter scenario, the network switch validation procedure may return a flag indicating whether the network switch is available with respect to any such mobile network operator. If the answer is no at a decision step 1932, then workflow diagram 1901 may proceed to a step 1916, at which point the corresponding method may conclude or end. Alternatively, if the answer is yes at decision step 1932, then workflow diagram 1901 may proceed to decision step 1934, at which point it may be determined whether the list of mobile network operators for which the network switch procedure is available is empty or includes the preferred network mobile operator that may have been specified by the agent using the front-end, as discussed above in connection with FIGS. 6-16. If the answer is yes at decision step 1934, then workflow diagram 1901 may proceed to step 1916, as further discussed above. Alternatively, if the answer is no at decision step 1934, then workflow diagram 1901 may proceed to a step 1938, at which point the agent will have the option to trigger or command the actual performance of the network switch procedure that has been determined to be permitted or available, as discussed above. Workflow diagram 1901 also includes an optional step 1936 that highlights to the reader that, in the case of a physical subscriber identity module card, then the customer should have already received this card, as discussed above in connection with FIG. 18. If the agent does choose to actually perform the network switch procedure at step 1938, then the agent may trigger or invoke the corresponding application programming interface at a step 1946, as shown. From step 1946, workflow diagram 1901 may proceed to another subsequent workflow diagram of FIG. 21, as discussed in more detail below.

FIG. 21 shows a workflow diagram 2100 indicating a sequence of steps for implementing and finalizing the network switch after the testing of FIG. 20 has been performed. At a step 2112, the network switch request may be forwarded from workflow diagram 1900 using the front end to the corresponding order orchestrator. At step 2193, the order orchestrator may initiate the corresponding networks switch procedure. Accordingly, at step 2116, the order orchestrator may create a new account identifier or subscription identifier. The order orchestrator may perform step 2116 in coordination with a mobile virtual network enabler that facilitates subscriber onboarding at a step 2138. Subsequently, at a step 2118, the order orchestrator may call or invoke a corresponding account creation application programming interface. The invoking of the application programming interface at step 2118 may be performed in coordination with a portfolio inventory system, as shown, at a step 2128 and a step 2130. At step 2128, the portfolio inventory system may clone one or more values for fields of a user profile for the old account identifier into a new user profile for the new account identifier (see also FIGS. 21D and 21H-21L). Similarly, at step 2130, the portfolio inventory system may set the status of the corresponding account to "pending active." In response, at a step 2132, the portfolio inventory system may create offers for all the items or mobile value added services that are already present on the old account that is associated with the source mobile network operator. Accordingly, at step 2132, the portfolio inventory system may further coordinate with the mobile virtual network enabler to create the corresponding offer, or overall offer, at a step 2140, as shown.

Step 2132 may help indicate to the reader how, in some variations, method 100 may be performed in a manner that maintains continuity for one or more aspects of a configuration of the corresponding client account with a mobile virtual network operator when switching between the source mobile network operator and the target mobile network operator. In other words, method 100 may further include maintaining continuity of client-specific account information across the network switch. In various examples, one or more of these items of client-specific account information and/or other client account configuration settings include an account balance, historical data, personal information, autopay information, activation or migration date, device active status, or warranty status. In other words, because the mobile virtual network operator can function as a bridge between the source mobile network operator and the target mobile network operator, the mobile virtual network operator can thereby provide continuity regarding one or more of these items or aspects of client account configuration information. Accordingly, method 100 can in these examples improve upon related systems which involve abandoning the source mobile network operator without the facilitation of a mobile virtual network operator, in which case one or more of these items of information and/or client account configuration settings would need to be manually or otherwise reconfigured or updated in a more cumbersome and/or inconvenient manner due to the fact that the target mobile network operator would, in these scenarios, not already possess these items of information.

After step 2118, the order orchestrator may, at a step 2120, update a corresponding cross-reference with the new account identifier into a retail wireless database 2122. Subsequently, at a step 2124, the order orchestrator may invoke a port in application programming interface. As shown, the order orchestrator may perform step 2124 in coordination with a mobile virtual network enabler at a step 2142. The mobile virtual network enabler may generate a port in event based on the new account identifier at a step 2144. In response, the portfolio inventory system may update as active the new account identifier status at a step 2134. Similarly, at a step 2146, the mobile virtual network enabler may generate a port out event based on the old account identifier. In response, the portfolio inventory system may update the old account identifier status as terminated at a step 2136. Lastly, at a step 2148, the front end may optionally indicate to the agent that the corresponding procedure of workflow diagram 2100 has come to a conclusion.

Figure 21A:
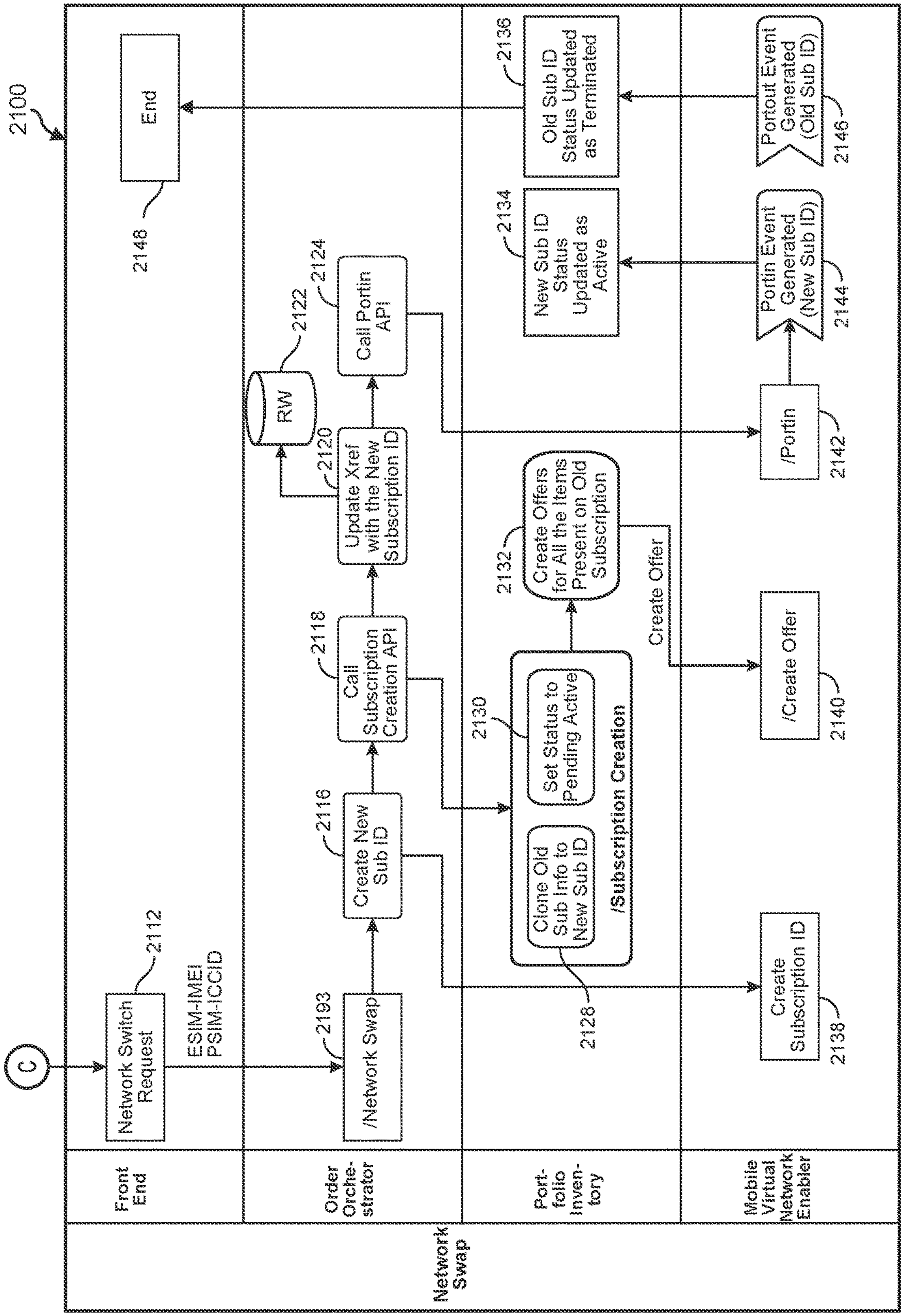
FIG. 21A shows a workflow diagram indicating a sequence of steps for implementing and finalizing the network switch.
Figure 21B:
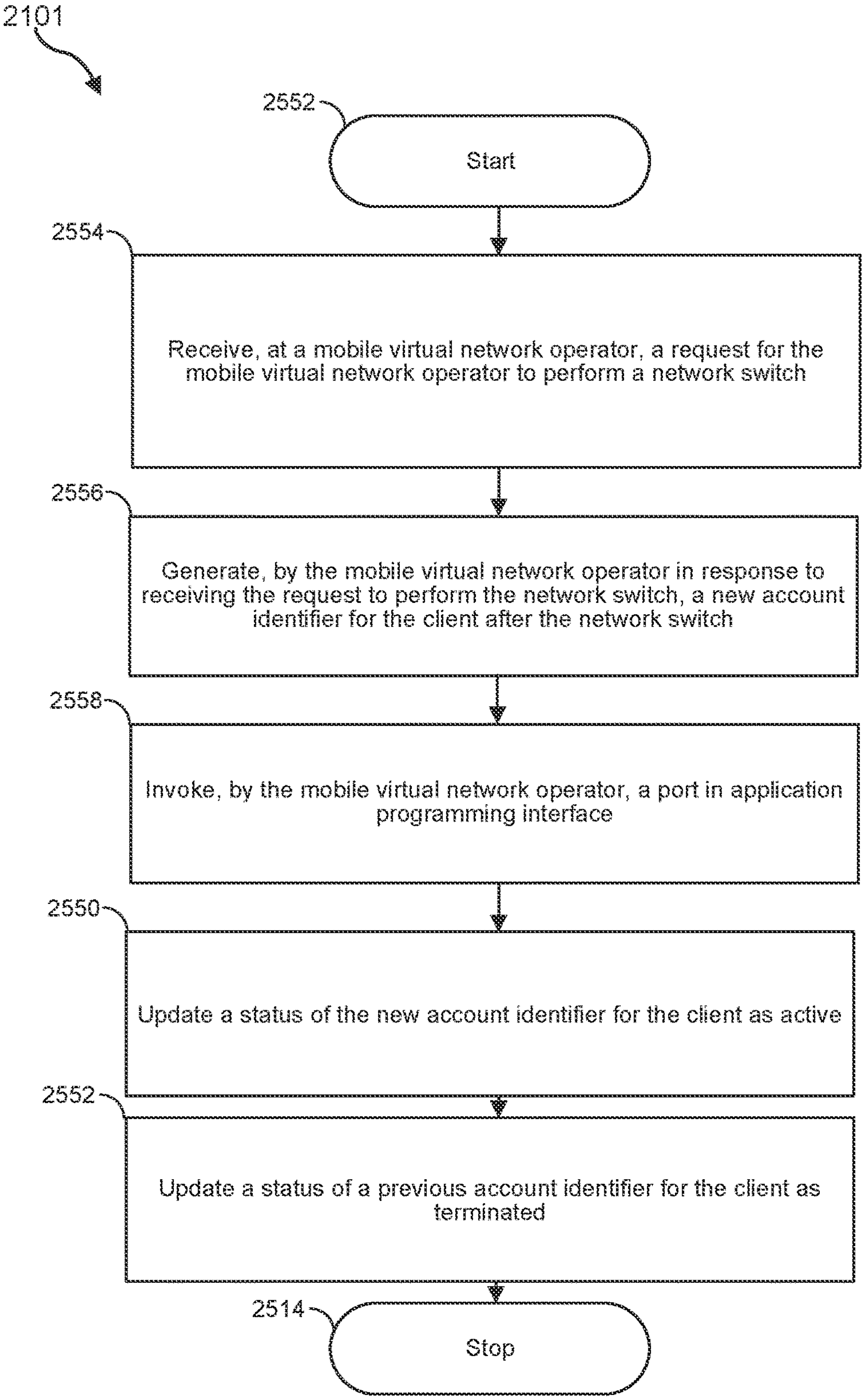
FIG. 21B shows a flow diagram for a method relating to the mechanics of finalizing the network switch procedure in one embodiment.

FIG. 21B shows a flow diagram for a method 2101 relating to the mechanics of finalizing the network switch procedure in one embodiment. At step 2552, method 2101 may start or begin. At step 2554, method 2101 may include receiving, at a mobile virtual network operator, a request for the mobile virtual network operator to perform a network switch by porting a phone number of a client of the mobile virtual network operator from a source network infrastructure of a source mobile network operator that is serving the client for the mobile virtual network operator to a target network infrastructure of a target mobile network operator that is serving clients for the mobile virtual network operator. At step 2556, method 2101 may include generating, by the mobile virtual network operator in response to receiving the request to perform the network switch, a new account identifier for the client after the network switch. At step 2558, method 2101 may include invoking, by the mobile virtual network operator, a port in application programming interface to port the phone number of the client onto the target network infrastructure of the target mobile network operator using the new account identifier. At step 2550, method 2101 may include updating, within a portfolio database of the mobile virtual network operator in response to the request to perform the network switch, a status of the new account identifier for the client as active. At step 2552, method 2101 may include updating, within the portfolio database of the mobile virtual network operator in response to the request to perform the network switch, a status of a previous account identifier for the client as terminated. At step 2514, method 2101 may stop or conclude.

As used herein, the term "account identifier" can generally refer to a subscription identifier or other identifier that is specific to, or designed for, distinguishing between different clients, customers, and/or users of a mobile virtual network operator or mobile network operator. Moreover, as used herein, the term "portfolio database" can generally refer to a database of the mobile virtual network operator that maintains a centralized or canonical account of statuses of accounts and/or telecommunication lines, consistent with the discussion in this disclosure.

Figure 21C:
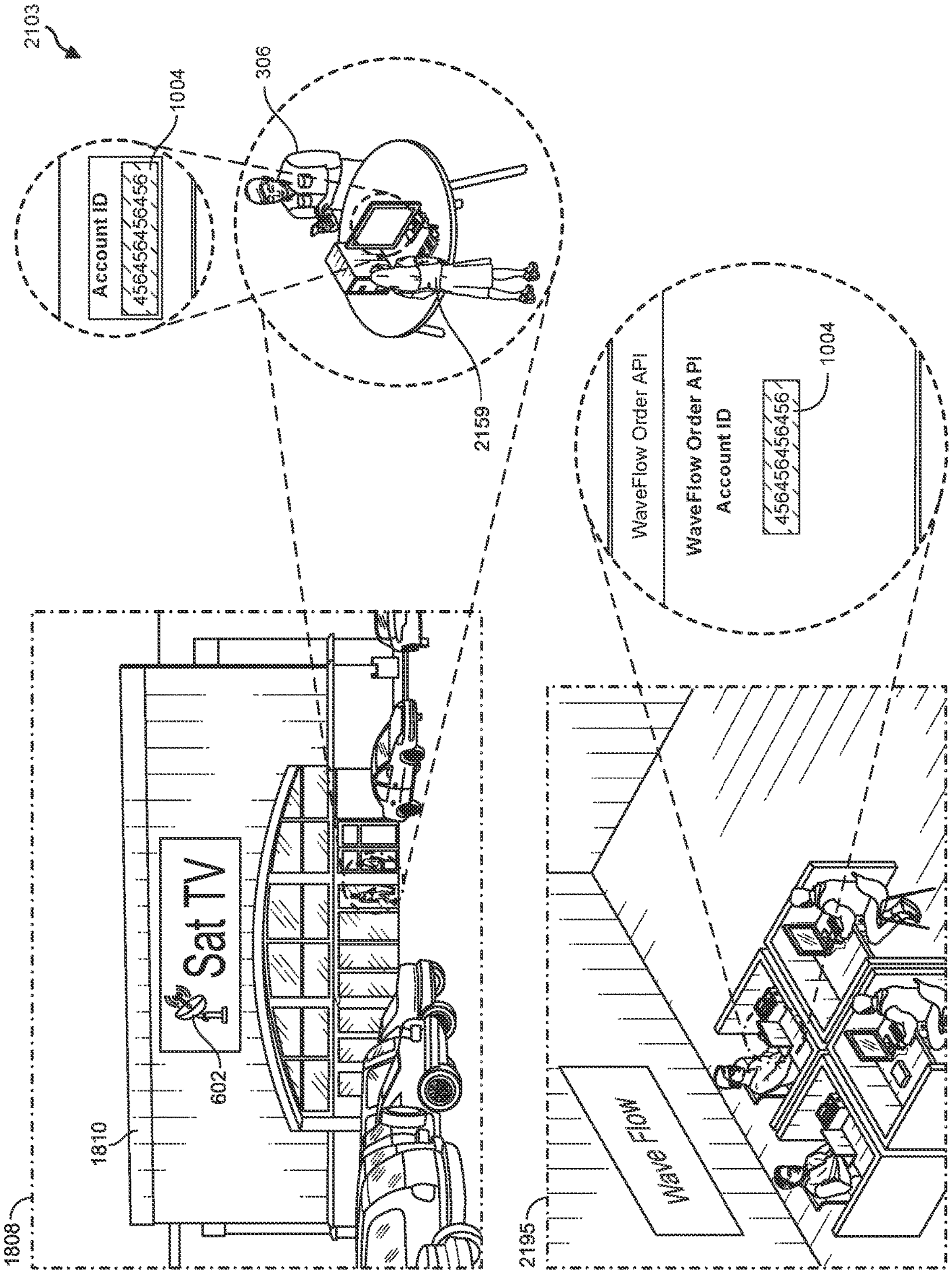
FIG. 21C shows a diagram indicating how a new account identifier may be provided to a mobile virtual network enabler as part of performing the network switch procedure.

FIG. 21C shows a diagram 2103 indicating how a new account identifier may be provided to a mobile virtual network enabler as part of performing the network switch procedure. Diagram 2103 may repeat diagram 1808, while also illustrating how client 306 may interface with an agent 2159 of the mobile virtual network operator. In the discussion with the agent, the client may inquire about, or request, the network switch procedure to switch from the source mobile network operator that is currently serving the client for the mobile virtual network operator to one or more different mobile network operators serving clients of the mobile virtual network operator, as discussed above. Upon agreeing on performing the network switch, the agent may trigger the generation of a new account identifier, at step 2556, thereby generating customer identifier 1004.

Moreover, diagram 2103 also includes a sub-diagram 2195, which further illustrates how a mobile virtual network enabler may receive customer identifier 1004 as part of the network switch procedure. As understood by those having skill in the art, the term "mobile virtual network enabler" may refer to a third party providing support services to the mobile virtual network operator such that one or more sub-tasks associated with the provisioning of mobile telecommunication services can be outsourced to the mobile virtual network enabler. In some examples, the mobile virtual network enabler may perform the port in/out procedure directly and/or may create the offer aggregating the cloned mobile value added services based on one or more commands from the mobile virtual network operator, which may invoke corresponding application programming interfaces, consistent with workflow diagram 2100. Accordingly, in some examples the port in application programming interface of method 2101 is provided by a mobile virtual network enabler and the mobile virtual network enabler ports in the phone number of the client onto the target network infrastructure of the target mobile network operator using the new account identifier on behalf of the mobile virtual network operator. Moreover, in these examples method 2101 may also include the mobile virtual network operator porting out the phone number from the source network infrastructure of the source mobile network operator, which can be performed by the mobile virtual network operator directly or by the mobile virtual network operator invoking a corresponding application programming interface at a mobile virtual network enabler.

Figure 21D:
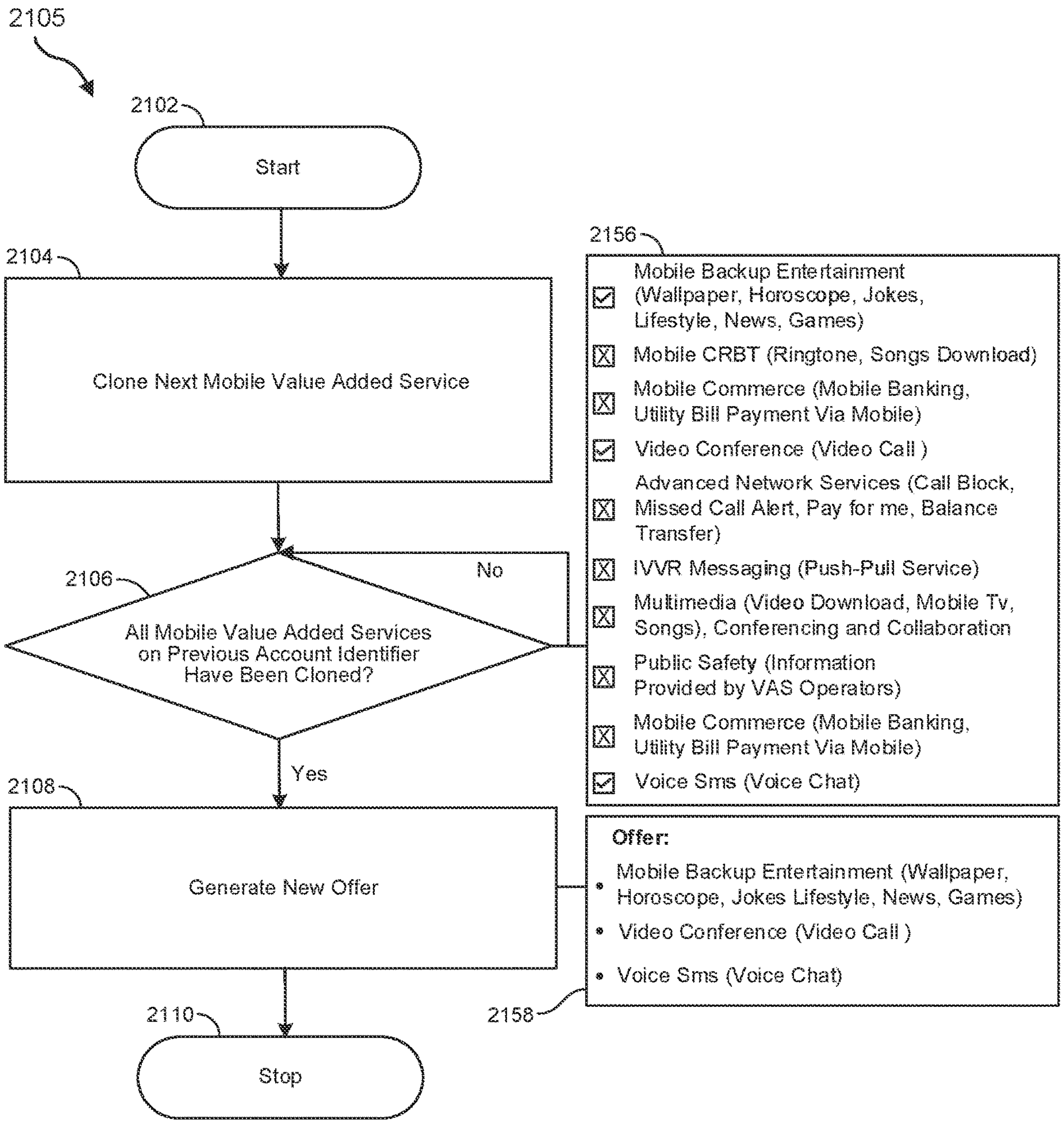
FIG. 21D shows a flow diagram for a method for cloning a plurality of values associated with the user profile for a client of the mobile virtual network operator as part of performing the network switch procedure.

FIG. 21D shows a flow diagram for a method 2105 for cloning a plurality of values associated with the user profile for a client of the mobile virtual network operator as part of performing the network switch procedure. Method 2105 may be performed as part of the activation and deactivation actions of method 2101, as discussed above, and/or as part of the cloning actions of method 2013 in FIG. 21H, as discussed in more detail below. At step 2102, method 2105 may start or begin. At step 2104, method 2105 may initiate by cloning a next mobile value added service from the user profile for the previous account identifier to the user profile for the newly generated account identifier. The first or initial mobile value added service may include any one or more of the illustrative examples of mobile value added services that are listed within the list 2156, as shown. Subsequently, at step 2106, method 2105 may check whether all mobile value added services on the previous account identifier have been cloned. If the decision is yes at step 2106, then method 2105 may proceed to a step 2108, at which point the mobile virtual network operator may directly generate a new offer (e.g., an aggregated offer) that includes all of the mobile value added services that have been cloned from the user profile for the previous account identifier to the user profile for the newly generated account identifier. In the particular example of this figure, a list 2158 indicates the three specific mobile value added services that have been cloned from the user profile for the previous account identifier to the user profile for the newly generated account identifier. Similarly, the checkmarks within list 2156, as shown, indicate the same subset of mobile value added services that were previously attached to the user profile for the previous account identifier and carried over or cloned to the user profile for the newly generated account identifier. If the decision was no at step 2106, then method 2105 may return to the beginning of step 2106 in a loop until all of the mobile value added services that were previously attached to the user profile for the previous account identifier have been exhausted. In summary, the mobile virtual network operator may generally clone one, some, or all of the mobile value added services from the user profile for the previous account identifier to the new user profile for the newly generated account identifier.

In the example of method 2105, a subset of mobile value added services may be added in parallel or in series as part of performing the network switch procedure. Additionally, or alternatively, one or more other items that are attached to a particular account identifier may be similarly cloned to the user profile of the newly generated account identifier. These items of information may include insurance information, warranty or device security information, personal identifiable information, an activation or migration date, and/or any one or more of the items of information discussed below in connection with FIGS. 21I-K.

Figure 21E:
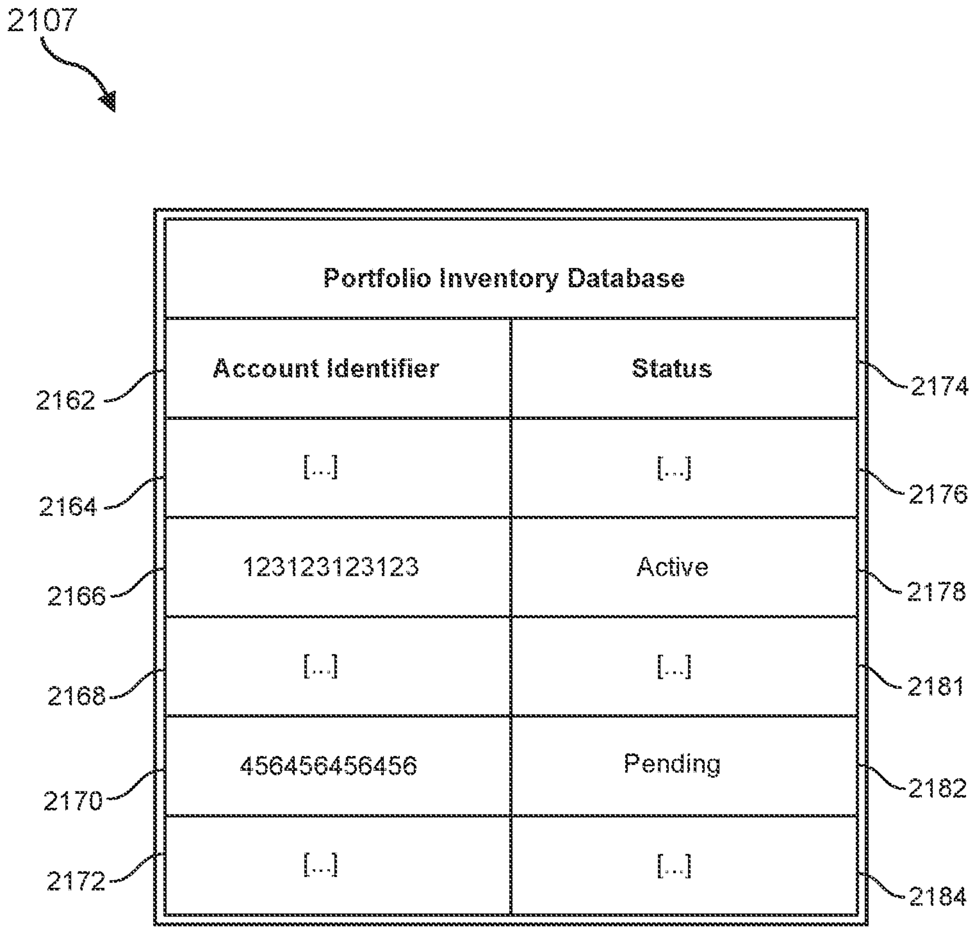
FIG. 21E shows a diagram of an example excerpt from a portfolio database prior to finalizing the network switch procedure.

FIGS. 21E-21G show a respective diagram 2107, a diagram 2109, and a diagram 2111 showing how an excerpt from the portfolio database may be updated according to method 2101. FIG. 21E shows a diagram 2107 of an example excerpt from a portfolio database prior to finalizing the network switch procedure. As shown, the portfolio database may indicate an account identifier 2162 and a status 2174, which correspond to respective columns. A cell 2164, a cell 2168, a cell 2176, and a cell 2181 may show ellipses to indicate that the items of information displayed within a cell 2166, a cell 2170, a cell 2178, and a cell 2182 are merely excerpts within a much larger portfolio database for a mobile virtual network operator. In the example of this figure, cell 2166 shows the account identifier for the account established within the mobile virtual network operator for the client prior to performance of the network switch procedure, whereas cell 2170 shows the account identifier for the account newly generated for the client as a result of performing the network switch procedure and consistent with method 2101. In terms of specifics, cell 2182 shows that the status of the corresponding account identifier is "active" because the corresponding account or subscription has not yet been updated as terminated at step 2136 of workflow diagram 2100. Similarly, the status of "pending" is indicated at cell 2182 for the newly generated account identifier, after the status has been updated to "pending" at step 2130 of workflow diagram 2100. In other words, at this stage of the network switch procedure, the mobile virtual network operator sets a status for the new account identifier within a portfolio database to pending after the new account identifier is generated and prior to porting in the phone number of the client onto the target network infrastructure of the target mobile network operator. In some examples, the account identifier may constitute, include, or correspond to a mobile identification number, a mobile subscription identification number, a mobile station identifier, or a short international mobile subscriber identity (IMSI_S).

In contrast, FIG. 21F shows a diagram 2109 of an example excerpt from the portfolio database during the network switch procedure. In this example of this figure, the value of cell 2182 has been switched to "active," thereby indicating that telecommunication service is being provided to the client through the corresponding line. The value of cell 2182 may be switched to "active" at step 2134 of workflow diagram 2100, as discussed above. Lastly, FIG. 21G shows a diagram 2111 of an example excerpt from the portfolio database after finalizing the network switch procedure. In the example of this figure, cell 2190 has a value switched to "terminated," as shown, in accordance with step 2136 of workflow diagram 2100. In the manner outlined above, the corresponding portfolio database has been updated, in sequence, throughout the different stages of mechanically implementing the network switch procedure. In other words, at this stage of the network switch procedure, the mobile virtual network operator switches the status for the new account identifier within the portfolio database from pending to active after the phone number of the client is ported into the target network infrastructure of the target mobile network operator.

Additionally, or alternatively, in some examples the mobile virtual network operator may also optionally update a cross-reference within an order orchestrator database of the mobile virtual network operator based on the network switch. In the example of workflow diagram 2100, the mobile virtual network operator may update the cross-reference at step 2120, as shown. The cross-reference may be updated within retail wireless database 2122 within the corresponding order orchestrator. Generally speaking, the order orchestrator may maintain retail wireless database 2022 to maintain tracking information or status information regarding the status of various orders as they proceed through the different stages of being fulfilled. In contrast, the portfolio database of method 2101 may maintain a canonical database of which accounts are active or not, as well as the corresponding statuses and associated metadata, as discussed above. Accordingly, in the context of workflow diagram 2100, the mobile virtual network operator may update one or both of these two different databases to maintain corresponding records going forward.

Figure 21H:
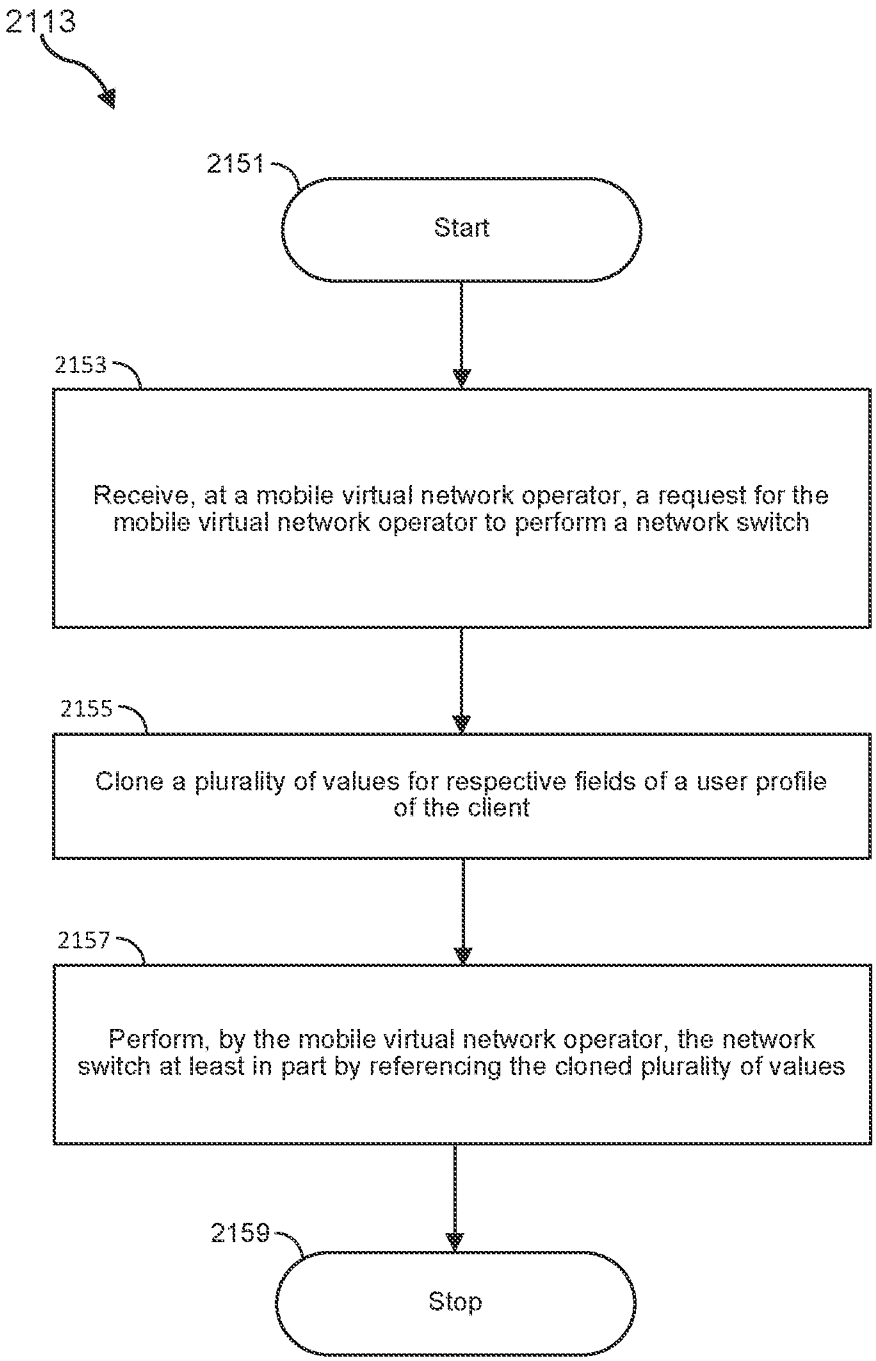
FIG. 21H shows a flow diagram for a method for cloning a plurality of values within a user profile for a client of the mobile virtual network operator as part of performing the network switch procedure.

FIG. 21H shows a flow diagram for a method 2113 for cloning a plurality of values within a user profile for a client of the mobile virtual network operator as part of performing the network switch procedure. At step 2151, method 2113 may start or begin. At step 2153, method 2113 may include receiving, at a mobile virtual network operator, a request for the mobile virtual network operator to perform a network switch by porting a phone number of a client of the mobile virtual network operator from a source network infrastructure of a source mobile network operator that is serving the client for the mobile virtual network operator to a target network infrastructure of a target mobile network operator that is serving clients for the mobile virtual network operator. At step 2155, method 2113 may include cloning, by the mobile virtual network operator in response to receiving the request to perform the network switch, a plurality of values for respective fields of a user profile of the client. At step 2157, method 2113 may include performing, by the mobile virtual network operator, the network switch at least in part by referencing the cloned plurality of values for respective fields of the user profile such that a continuity of user experience for the client with the mobile virtual network operator is facilitated. At step 2159, method 2113 may stop or conclude. Moreover, in these examples, the cloned plurality of values for respective fields of the user profile specifies each of at least two items within a set that comprises a mobile value added service (see method 2105 in FIG. 21D), an account difference, historical data, personal identifiable information, resource exchange settings, an activation or migration date, a device security, or a device active status. Additionally, or alternatively, the cloned plurality of values for respective fields of the user profile may specify each of at least three items, four items, five items, etc., or any suitable permutation of items, from within the set. In some examples, the cloned plurality of values for respective fields of the user profile specifies all of the items within the set listed above. In further examples, the cloned plurality of values may additionally, or alternatively, specify any other suitable user profile value or user profile attribute described in this disclosure.

Figure 21I:
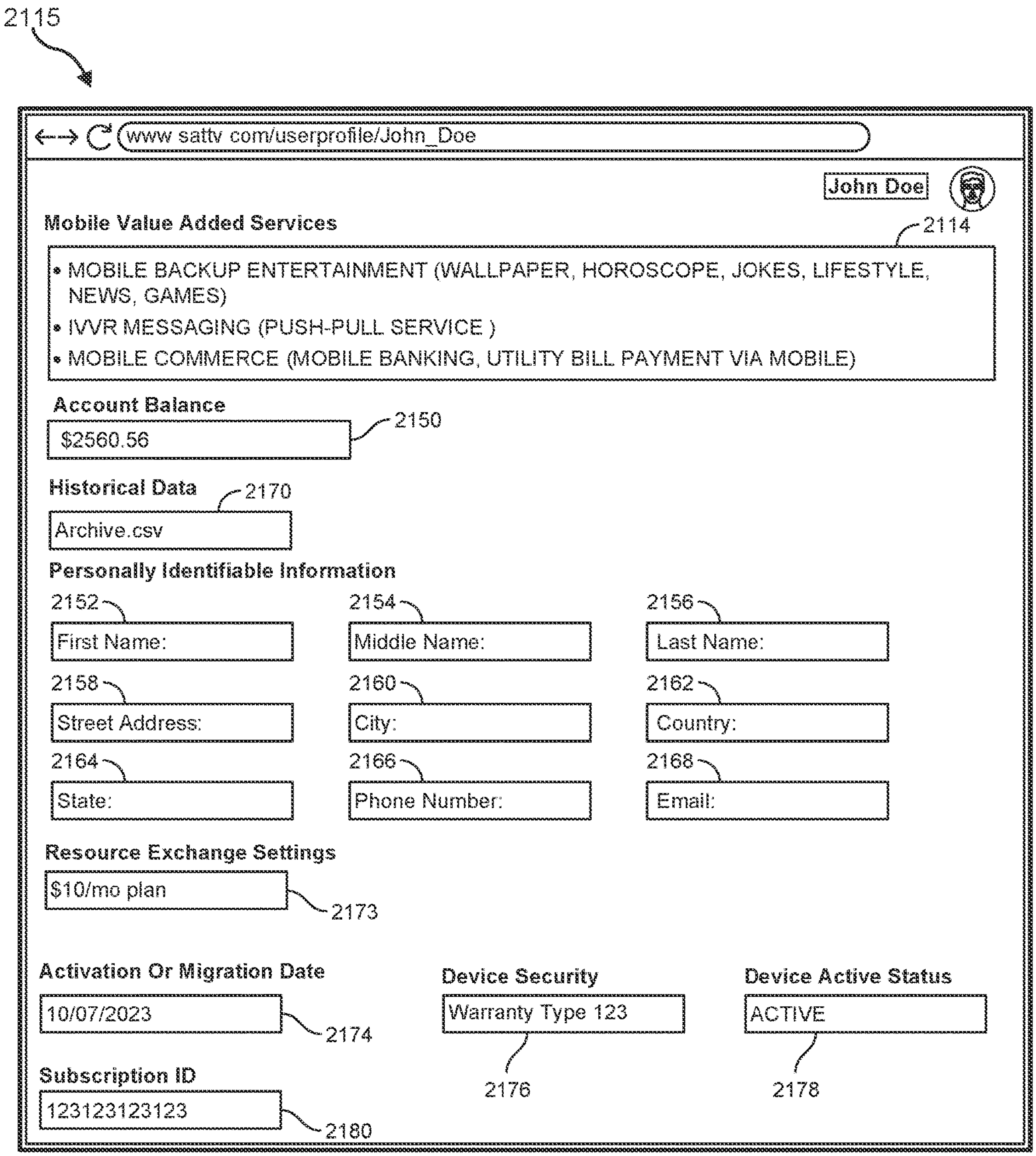
FIG. 21I shows a diagram of an example old user profile prior to completion of the cloning procedure.

FIG. 21I shows a diagram 2115 of an example previous user profile prior to completion of the cloning procedure. As shown within this figure, diagram 2115 may include respective fields that specify values associated with the user profile for that particular client and the particular account with the mobile virtual network operator. Accordingly, diagram 2115 repeats list 2114 of the mobile value added services that are associated with the previous account identifier for the client, which corresponds to field 2180. As further discussed above, in some examples, the account identifier may constitute, include, or correspond to a mobile identification number, a mobile subscription identification number, a mobile station identifier, or a short international mobile subscriber identity (IMSI_S). Diagram 2115 also further includes fields 2150-2180, as shown. These various fields specify the account balance, historical data, one or more items of personally identifiable information, resource exchange settings or billing plan settings, an activation or migration date, a device security identifier or warranty identifier, and/or a device active status.

Figure 21J:
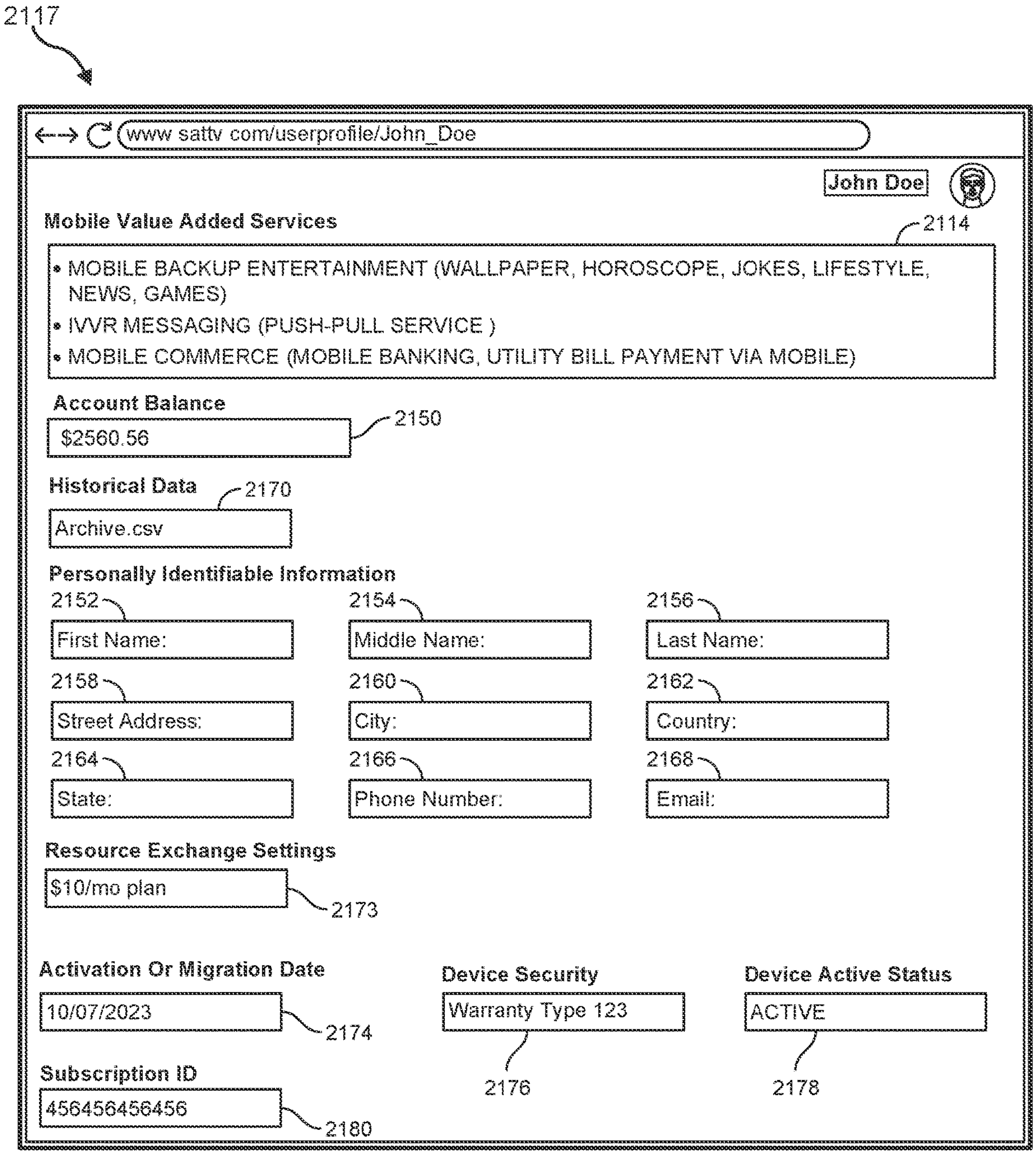
FIG. 21J shows a diagram of the example new user profile after performance of the cloning procedure.

FIG. 21J shows a diagram 2117 of the example new user profile after performance of the cloning procedure. Diagram 2117 may be effectively the same as diagram 2115, except that field 2180 has changed to reflect the newly generated account identifier. The account identifier may have been generated as part of method 100, method 2101, and/or any of the other suitable network switch procedures described within this disclosure.

The cloning of the various values associated with the user profile may provide a number of benefits or advantages to the client. Generally speaking, any one or more of the network switch procedures described in this disclosure may provide a streamlined experience for the user switching from the source mobile network operator to the target mobile network operator while maintaining a generally streamlined customer experience with the mobile virtual network operator. In the case of a machine-to-machine electronic subscriber identity module scenario, the network switch procedure may be effectively invisible to the user and operate in the background, as further discussed above. Moreover, because the resource exchange settings or billing plan associated with field 2173 may remain the same or substantially same according to the consistency policy, then disruptions associated with the network switch procedure may be minimized or eliminated. In some examples, the network switch can be performed without disturbing a monthly recurring charge from the client to the mobile virtual network operator, which can facilitate a streamlined and user-friendly customer experience associated with performing the network switch procedure. Additionally, or alternatively, in further examples the mobile virtual network operator may maintain a historical archive that links a previous account identifier for the client on the source mobile network operator with a new account identifier for the client on the target mobile network operator. These may be maintained within the portfolio database of workflow diagram 2100, for example.

Figure 22:
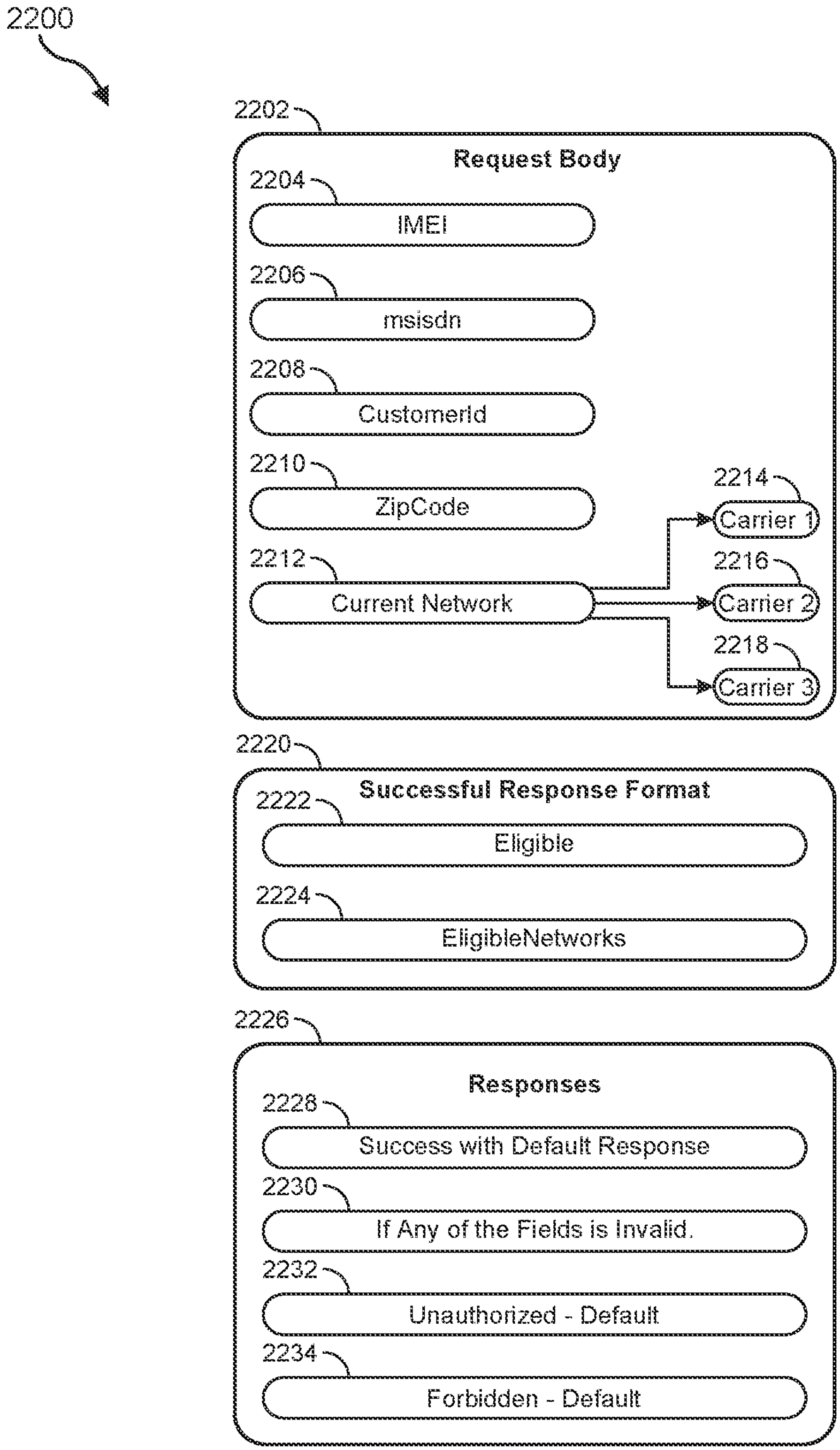
FIG. 22 shows a diagram indicating an application programming interface for ascertaining whether the network switch is available to a particular user.

FIG. 22 shows a diagram 2200 indicating an application programming interface for ascertaining whether the network switch is available to a particular user. Accordingly, diagram 2200 provides more details regarding an application programming interface for the network switch validation procedure of the graphical user interface discussed above in connection with FIGS. 6-16. As shown, a request body 2202 may include multiple items of information, including a device type 2204, a phone number 2206, a customer identifier 2208, a zip code 2210, and/or current network 2212, which can be specified as a carrier one 2214, a carrier two 2216, and/or a carrier three 2218. A successful response format 2220 may include a flag 2222, which can indicate whether the network switch is eligible under the conditions specified, and/or a list 2224 of mobile network operators for which the network switch is available, as discussed above. More generally, responses 2226 to such a request corresponding to request body 2202 can include a response 2228, which indicates success with the default response, a response 2230, which indicates that one or more of the fields within the request body are invalid, a response 2232, which indicates that the corresponding request was unauthorized, and/or a response 2234, which indicates that the corresponding request was forbidden.

Figure 23:
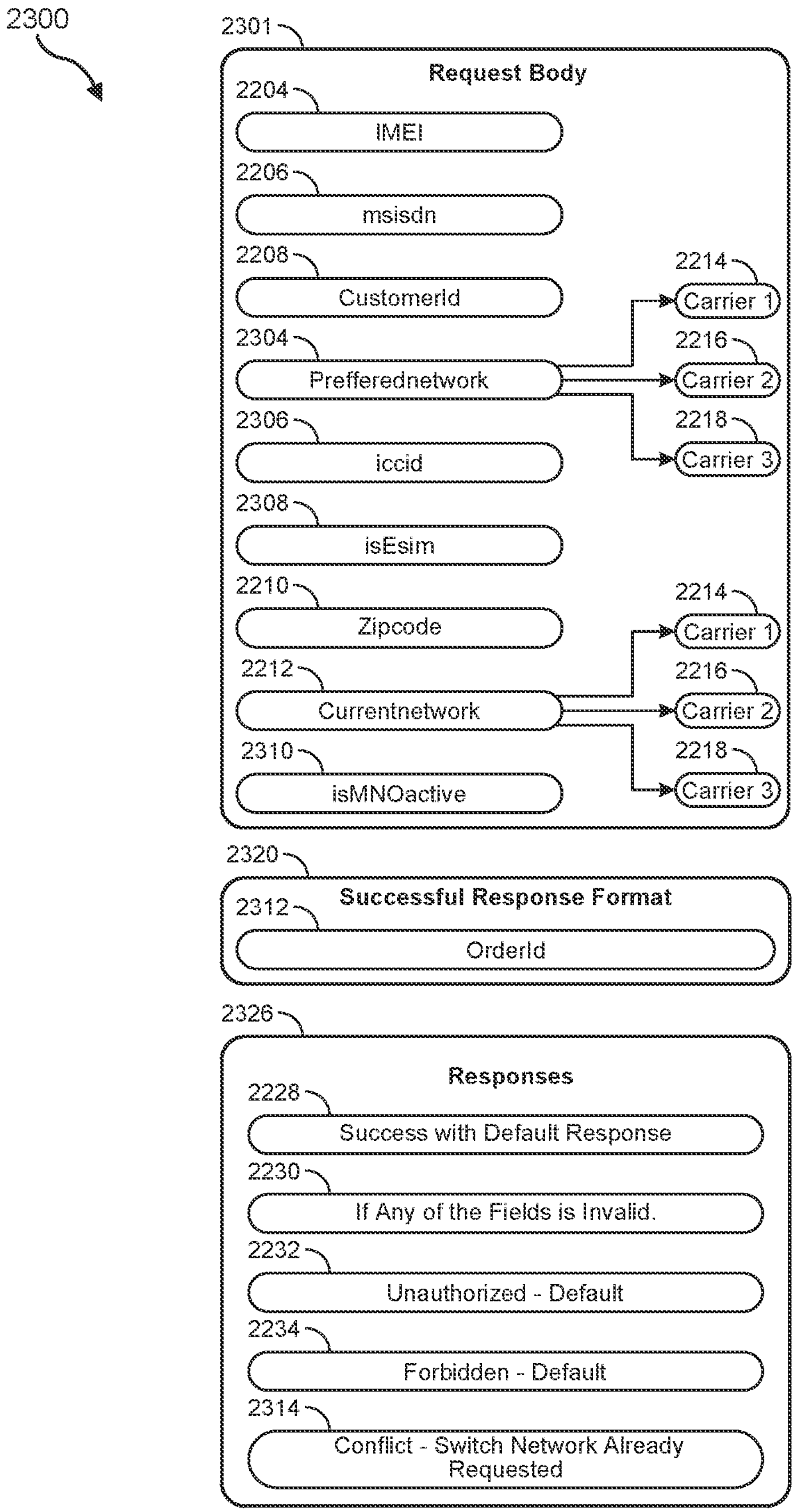
FIG. 23 shows a diagram indicating an application programming interface for ordering the network switch.

FIG. 23 shows a diagram 2300 indicating an application programming interface for ordering the network switch. As shown, a request body 2301 may further include a device type 2204, a phone number 2206, and/or a customer identifier 2208, as further discussed above in connection with FIG. 22. Additionally, diagram 2300 also further indicates that request body 2301 may further include a preferred network 2304, an integrated circuit card identification number 2306, a flag 2308 indicating whether the corresponding device type uses an electronic subscription identity module, is a zip code 2210, a current network 2212, and a flag 2310 indicating whether a corresponding mobile network operator is active for that particular subscriber. Successful response format 2320 may further include an order identifier 2312, as shown. More generally, responses 2326 in response to request body 2301 may include the same discussed above in connection with FIG. 22, as well as a conflict 2314, which can further indicate to the user that a switch network procedure has already been requested.

Figure 24A:
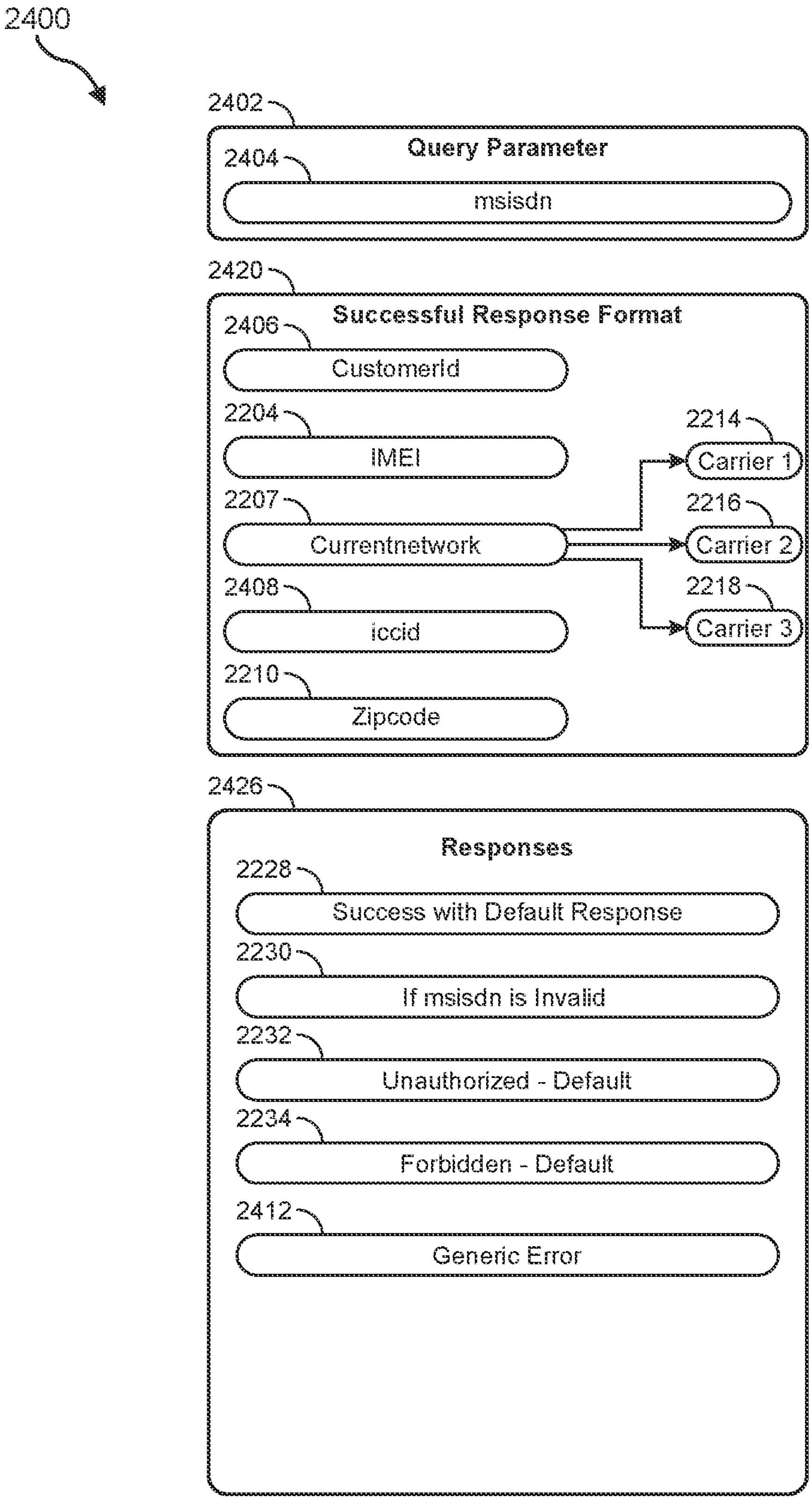
FIG. 24A shows a diagram indicating an application programming interface for providing a cluster of information associated with a phone number to facilitate an agent of the mobile virtual network operator when attempting to perform the network switch on behalf of a customer.

FIG. 24A shows a diagram 2400 indicating an application programming interface for providing a cluster of information associated with a phone number to facilitate an agent of the mobile virtual network operator when attempting to perform the network switch on behalf of a customer. As shown, a query parameter 2402 may include just the single field, which may correspond to a phone number 2404. In response, a successful response format 2420 may include a customer identifier 2406, a device type 2204, a current network 2207, an integrated circuit card identification number 2408, and/or a zip code 2210. More generally, potential responses 2426 to query parameter 2402 may include a response 2228, which can indicate success with the default response, a response 2230, which can indicate whether the phone number is invalid, a response 2232, which can indicate whether the query is unauthorized, response 2234, which can indicate whether the response is forbidden, and/or a response 2412, which can indicate a generic error.

Figure 24B:
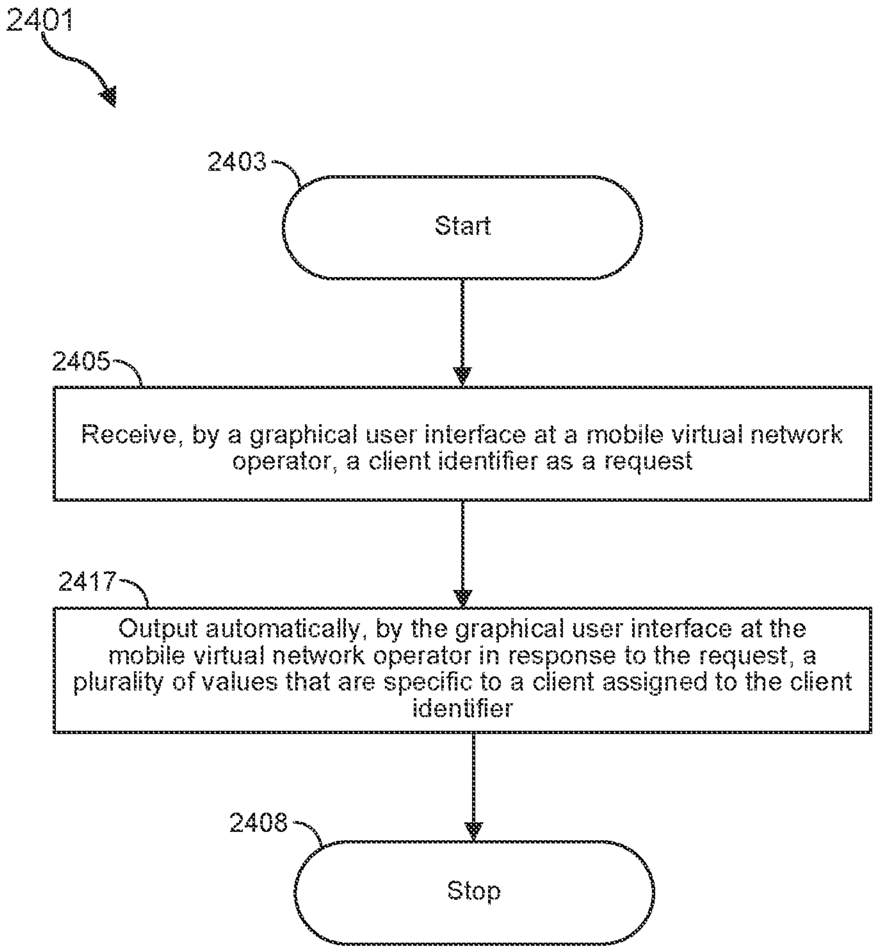
FIG. 24B shows a flow diagram for a method for outputting automatically the plurality of values that are specific to a client assigned to a mobile station international subscriber directory number.

FIG. 24B shows a flow diagram for a method 2401. At step 2403, method 2401 may start or begin. At step 2405, method 2401 may include receiving, by a graphical user interface at a mobile virtual network operator, a client identifier as a request. At step 2417, method 2401 may include outputting automatically, by the graphical user interface at the mobile virtual network operator in response to the request, a plurality of values that are specific to a client assigned to the client identifier. In various examples, the plurality of values that are specific to the client assigned to the client identifier includes a designation of which mobile network operator is currently serving the client for the mobile virtual network operator from among a plurality of mobile network operators that are serving clients for the mobile virtual network operator. At step 2408 method 2401 may stop or conclude. As used herein, the term "client identifier" can refer to any string or value that identifies a client for the purposes of performing the network switch. Such a client identifier may include a customer ID, as discussed above, and/or one or more identifiers mapped to such a customer ID, such as a mobile identification number, a mobile subscription identification number, a mobile station identifier, or a short international mobile subscriber identity (IMSI_S).

Figure 24C:
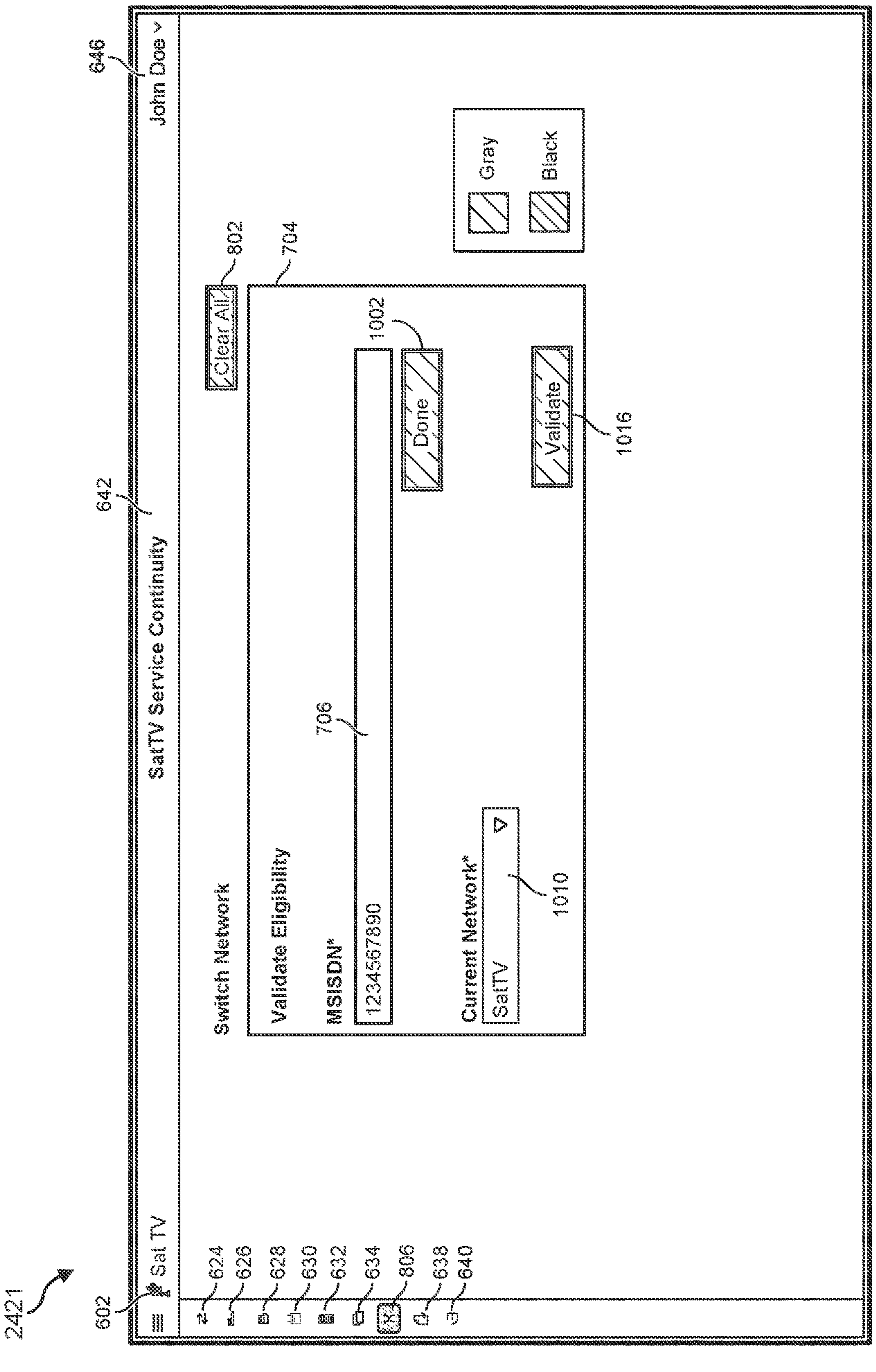
FIG. 24C shows a diagram of an example graphical user interface relating to the method for outputting automatically the plurality of values.

FIG. 24C shows a diagram 2421 of an example graphical user interface relating to the method for outputting automatically the plurality of values. Diagram 2421 may parallel diagram 1000, except that in diagram 2421 only the indication of the current network on which the client has already been receiving services through the source mobile network operator is provided in response to inputting the mobile station international subscriber directory number. In the example of diagram 2421, this graphical indication can be provided through current network indicator 1010. In other words, diagram 2421 highlights the unique contribution made by current network indicator 1010 in various embodiments whereas one or more additional items within the graphical user interface corresponding to diagram 1000 may be optionally omitted, as shown.

In the example of diagram 2421, the input query corresponds to the mobile station international subscriber directory number. Additionally, or alternatively, in other examples a generic phone number, name, and/or other set of identifying items of information may be used to uniquely identify the client's account and trigger the output of which mobile network operator is currently serving the client from among multiple mobile network operators that are serving clients for the mobile virtual network operator.

Figure 24D:
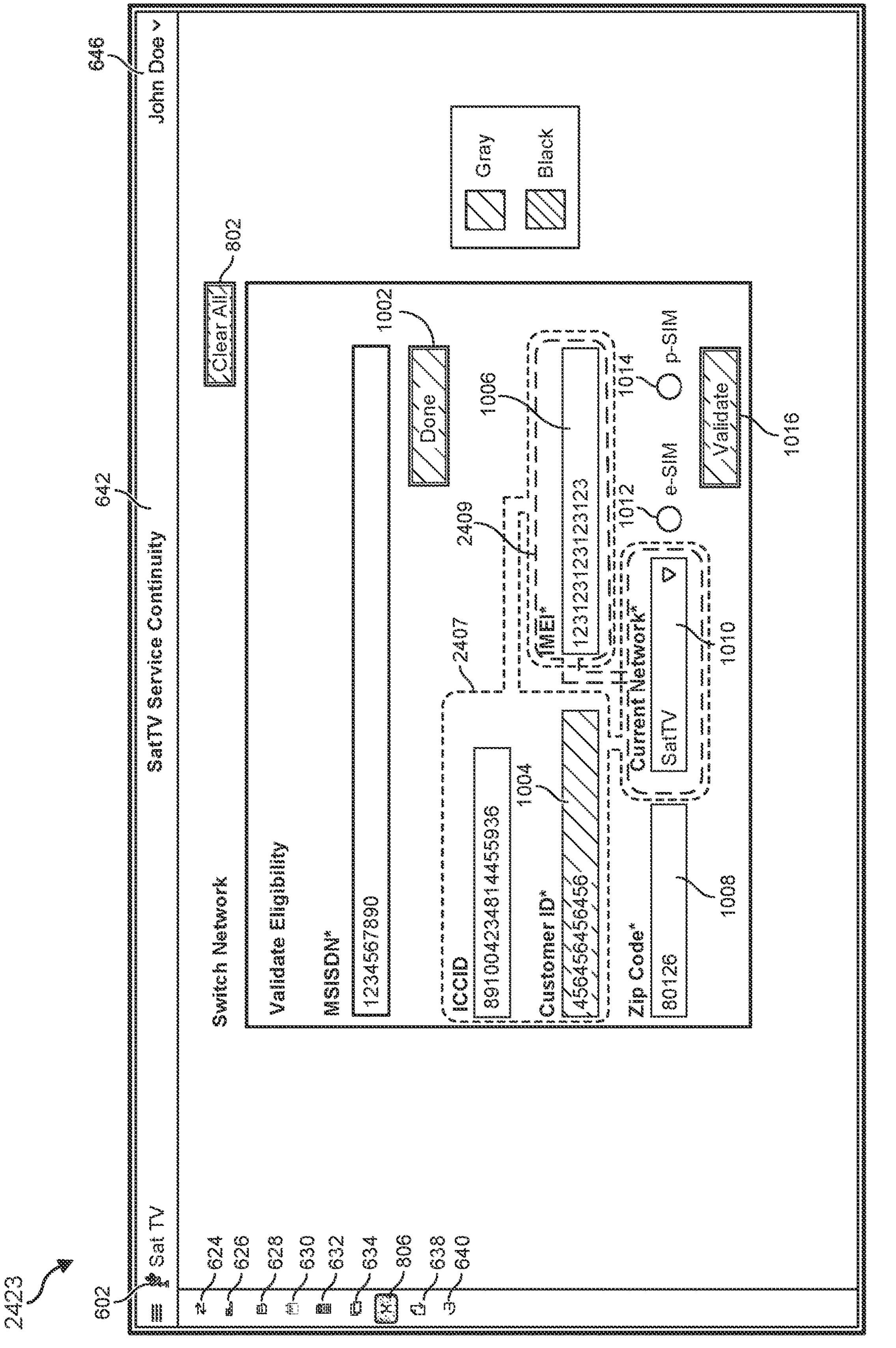
FIG. 24D shows another diagram of the example graphical user interface relating to the method for outputting automatically the plurality of values.

FIG. 24D shows another diagram 2423 of the example graphical user interface relating to the method for outputting automatically the plurality of values. In contrast to diagram 2421, diagram 2423 repeats additional items that were previously presented in diagram 1000, as discussed above. Furthermore, diagram 2423 also highlights a set 2407 and a set 2409 of different items of information within this graphical user interface. Notably, both set 2407 and set 2409 include current network indicator 1010, which is consistent with method 2401 including the output of the indication of which mobile network operator is currently serving the client as the source mobile network operator prior to performance of the network switch procedure. Nevertheless, in addition to producing, as output, current network indicator 1010 and the corresponding identification of the current network, diagram 2423 further illustrates how various different other items of information may be output to the agent of the mobile virtual network operator. These items of information may include the integrated circuit card identification number, the customer ID, the zip code, the international mobile equipment identity, and/or the indication of whether or not an electronic subscriber identity module or a physical subscriber identity module is being used as part of performing the network switch procedure, as further discussed above. Accordingly, the mobile virtual network operator may prefer to automatically display set 2407 and/or set 2409, as two illustrative examples, or any other suitable combination or permutation of items shown within the graphical user interface of diagram 2423, in response to the query or request that identifies the client or client account.

Figure 24E:
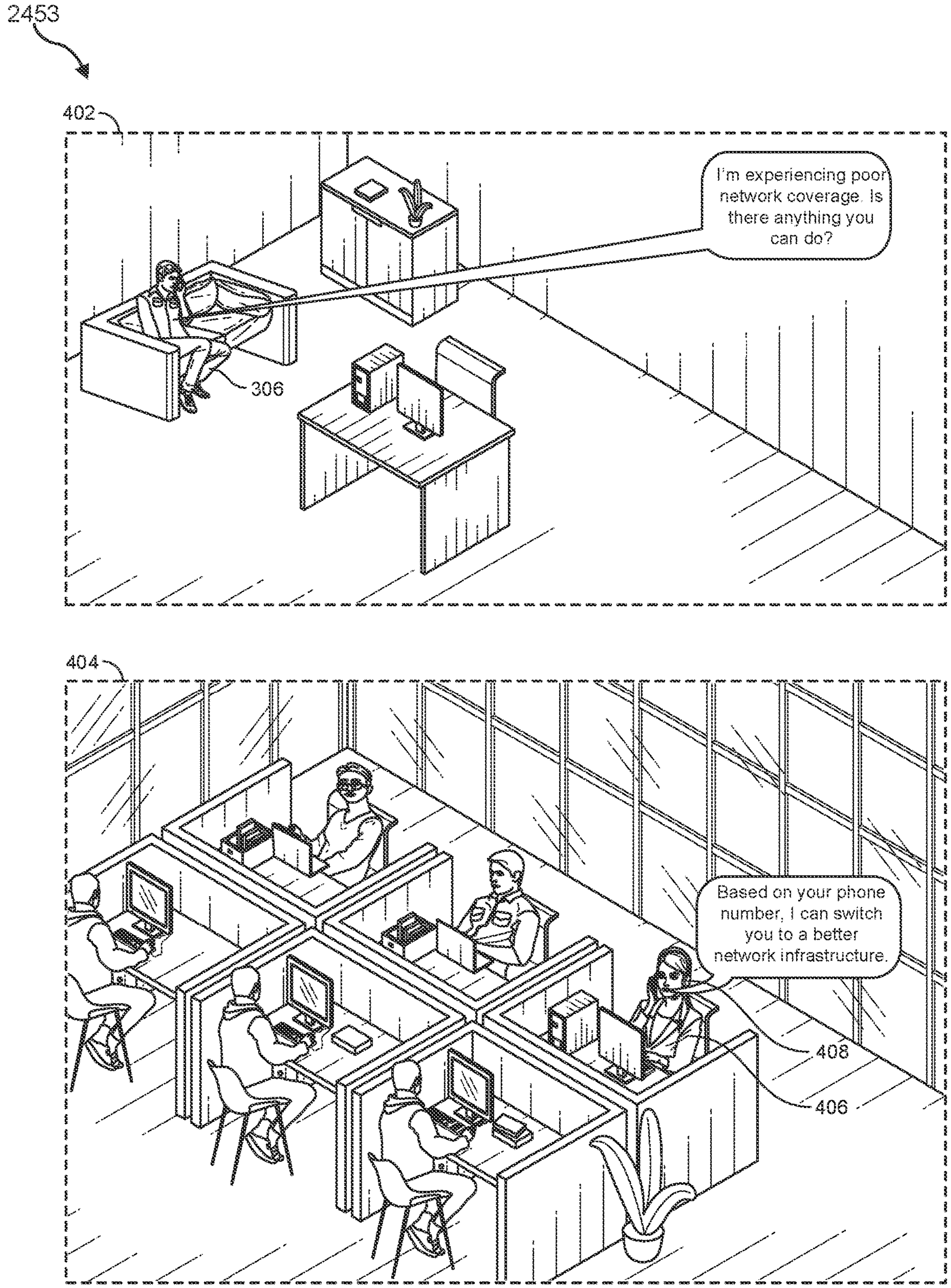
FIG. 24E shows a diagram of an example client of the mobile virtual network operator communicating with an agent of the mobile virtual network operator as part of ascertaining whether the network switch procedure should be performed.

FIG. 24E shows a series 2453 of a diagram 402 and a diagram 404 of an example client of the mobile virtual network operator communicating with an agent of the mobile virtual network operator as part of ascertaining whether the network switch procedure should be performed. Series 2453 substantially repeats diagram 402 and diagram 404 from FIG. 4, as further discussed above. In the example of this figure, client 306 may detect one or more deficiencies associated with the telecommunication service provided by the mobile virtual network operator. Accordingly, client 306 may dial into the mobile virtual network operator seeking customer service. In response, agent 406 may indicate that the network switch procedure is available. As part of providing this indication to the client, the agent may trigger the performance of method 2401 with respect to the graphical user interface of the front-end described above. Thus, prior to performing the complete network switch validation procedure, and prior to performing the network switch procedure itself, the agent of the mobile virtual network operator may simply seek information regarding which mobile network operator is currently serving the client. This item of information, by itself, may facilitate the agent when attempting to provide customer support to the client that is dialing in to seek help with the deficiency in telecommunication service. Accordingly, one inventive contribution of this disclosure is the automatic providing of the indication of which mobile network operator, from among multiple mobile network operators that are each serving clients of the mobile virtual network operator, is currently serving a specified client, as discussed above.

In some examples, the relative simplicity of method 2401 can potentially obscure the complexity of the technology that can be involved in the background in order to produce corresponding results of the graphical user interface. In order to retrieve and automatically reproduce the various items of information shown within diagram 2423, line level data may potentially be retrieved from the portfolio database, as further discussed above. In contrast, account level data may potentially be retrieved from a customer master or customer domain database. Both of these sets of information can be retrieved by referencing the customer ID as a key, which can be mapped from the phone number by a lookup call to a cross reference database, such as retail wireless database 2122. Any one or more of these lookups, including potentially all of these lookups, can be performed through calling retail wireless application programming interface endpoints, each of which can expose corresponding subsystems, as further discussed above.

Figure 25:
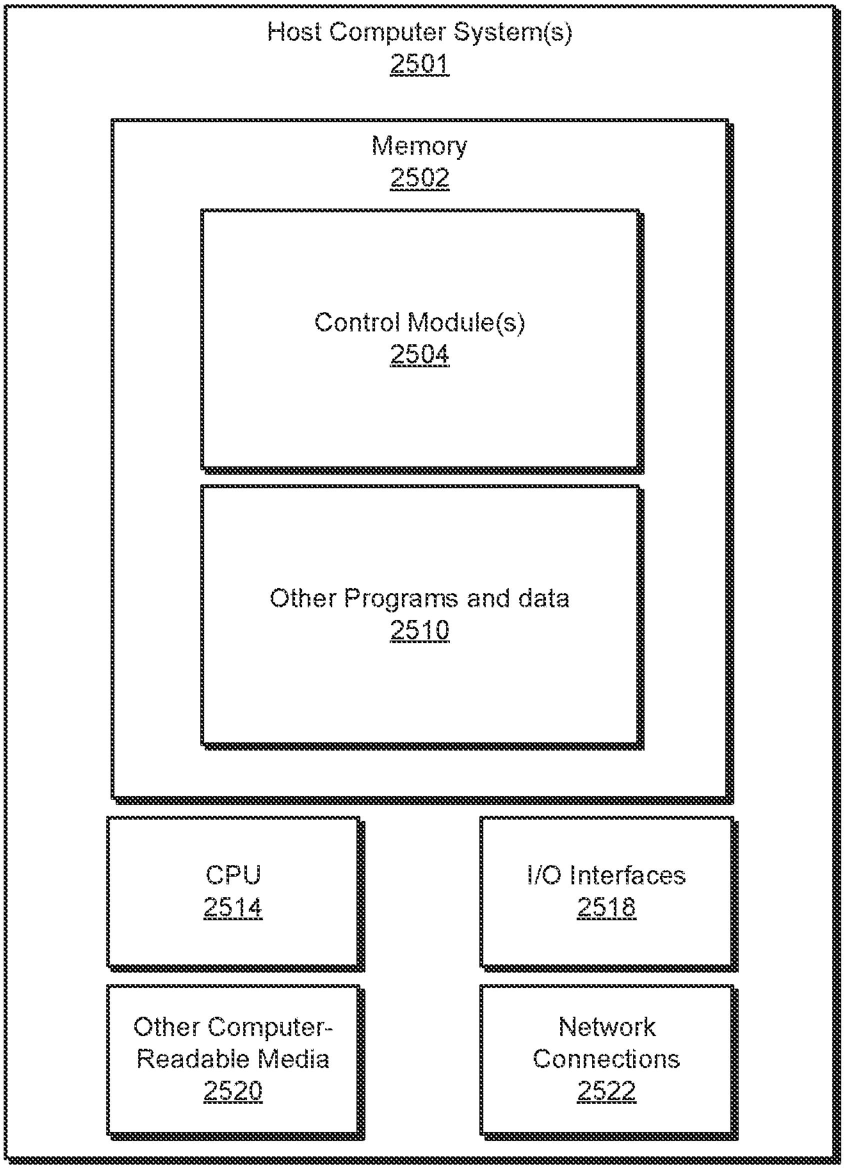
FIG. 25 shows an example computing system that may facilitate the performance of one or more of the methods described herein.

FIG. 25 shows a system diagram that describes an example implementation of a computing system(s) for implementing embodiments described herein. The functionality described herein can be implemented either on dedicated hardware, as a software instance running on dedicated hardware, or as a virtualized function instantiated on an appropriate platform, e.g., a cloud infrastructure. In some embodiments, such functionality may be completely software-based and designed as cloud-native, meaning that they are agnostic to the underlying cloud infrastructure, allowing higher deployment agility and flexibility. However, FIG. 25 illustrates an example of underlying hardware on which such software and functionality may be hosted and/or implemented.

In particular, shown is example host computer system(s) 2501. For example, such computer system(s) 2501 may execute a scripting application, or other software application, as further discussed above, and/or to perform one or more of the other methods described herein. In some embodiments, one or more special-purpose computing systems may be used to implement the functionality described herein. Accordingly, various embodiments described herein may be implemented in software, hardware, firmware, or in some combination thereof. Host computer system(s) 2501 may include memory 2502, one or more central processing units (CPUs) 2514, I/O interfaces 2518, other computer-readable media 2520, and network connections 2522.

Memory 2502 may include one or more various types of non-volatile and/or volatile storage technologies. Examples of memory 2502 may include, but are not limited to, flash memory, hard disk drives, optical drives, solid-state drives, various types of random access memory (RAM), various types of read-only memory (ROM), neural networks, other computer-readable storage media (also referred to as processor-readable storage media), or the like, or any combination thereof. Memory 2502 may be utilized to store information, including computer-readable instructions that are utilized by CPU 2514 to perform actions, including those of embodiments described herein.

Memory 2502 may have stored thereon control module(s) 2504. The control module(s) 2504 may be configured to implement and/or perform some or all of the functions of the systems or components described herein. Memory 2502 may also store other programs and data 2510, which may include rules, databases, application programming interfaces (APIs), software containers, nodes, pods, clusters, node groups, control planes, software defined data centers (SDDCs), microservices, virtualized environments, software platforms, cloud computing service software, network management software, network orchestrator software, network functions (NF), artificial intelligence (AI) or machine learning (ML) programs or models to perform the functionality described herein, user interfaces, operating systems, other network management functions, other NFs, etc.

Network connections 2522 are configured to communicate with other computing devices to facilitate the functionality described herein. In various embodiments, the network connections 2522 include transmitters and receivers (not illustrated), cellular telecommunication network equipment and interfaces, and/or other computer network equipment and interfaces to send and receive data as described herein, such as to send and receive instructions, commands and data to implement the processes described herein. I/O interfaces 2518 may include a video interface, other data input or output interfaces, or the like. Other computer-readable media 2520 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method comprising:

receiving, at a mobile virtual network operator, a request for the mobile virtual network operator to perform a network switch by porting a phone number of a client of the mobile virtual network operator from a source network infrastructure of a source mobile network operator that is serving the client for the mobile virtual network operator to a target network infrastructure of a target mobile network operator that is serving clients for the mobile virtual network operator;

generating, by the mobile virtual network operator in response to receiving the request to perform the network switch, a new account identifier for the client;

invoking, by the mobile virtual network operator, a port in application programming interface to port the phone number of the client onto the target network infrastructure of the target mobile network operator using the new account identifier;

updating, within a portfolio database of the mobile virtual network operator in response to the request to perform the network switch, a status of the new account identifier for the client as active;

updating, within the portfolio database of the mobile virtual network operator in response to the request to perform the network switch, a status of a previous account identifier for the client as terminated; and updating a cross-reference within an order orchestrator database of the mobile virtual network operator based on the network switch;

wherein the new account identifier identifies the client after the network switch.

2. The method of claim 1, wherein:

the port in application programming interface is provided by a mobile virtual network enabler; and the mobile virtual network enabler ports in the phone number of the client onto the target network infrastructure of the target mobile network operator using the new account identifier on behalf of the mobile virtual network operator.

3. The method of claim 1, further comprising the mobile virtual network operator porting out the phone number from the source network infrastructure of the source mobile network operator.

4. The method of claim 1, further comprising the mobile virtual network operator cloning at least one mobile value added service from the previous account identifier for the client to the new account identifier for the client.

5. The method of claim 4, further comprising the mobile virtual network operator cloning every mobile value added service from the previous account identifier for the client to the new account identifier for the client.

6. The method of claim 4, further comprising the mobile virtual network operator creating an offer that includes every mobile value added service from the previous account identifier for the client.

7. The method of claim 6, wherein a mobile virtual network enabler creates the offer that includes every mobile value added service from the previous account identifier for the client on behalf of the mobile virtual network operator.

8. The method of claim 1, wherein the mobile virtual network operator sets a status for the new account identifier within a portfolio database to pending after the new account identifier is generated and prior to porting in the phone number of the client onto the target network infrastructure of the target mobile network operator.

9. The method of claim 8, wherein the mobile virtual network operator switches the status for the new account identifier within the portfolio database from pending to active after the phone number of the client is ported into the target network infrastructure of the target mobile network operator.

10. The method of claim 1, further comprising indicating by a front end interface, that the network switch is completed.

11. A system comprising:

at least one physical computing processor of a computing device; and a non-transitory computer-readable medium that has instructions stored thereon that, when executed by the at least one physical computing processor, cause the computing device to perform operations comprising:

receiving, at a mobile virtual network operator, a request for the mobile virtual network operator to perform a network switch by porting a phone number of a client of the mobile virtual network operator from a source network infrastructure of a source mobile network operator that is serving the client for the mobile virtual network operator to a target network infrastructure of a target mobile network operator that is serving clients for the mobile virtual network operator;

generating, by the mobile virtual network operator in response to receiving the request to perform the network switch, a new account identifier for the client;

invoking, by the mobile virtual network operator, a port in application programming interface to port the phone number of the client onto the target network infrastructure of the target mobile network operator using the new account identifier;

updating, within a portfolio database of the mobile virtual network operator in response to the request to perform the network switch, a status of the new account identifier for the client as active;

updating, within the portfolio database of the mobile virtual network operator in response to the request to perform the network switch, a status of a previous account identifier for the client as terminated; and updating a cross-reference within an order orchestrator database of the mobile virtual network operator based on the network switch;

wherein the new account identifier identifies the client after the network switch.

12. The system of claim 11, wherein:

the port in application programming interface is provided by a mobile virtual network enabler; and the mobile virtual network enabler ports in the phone number of the client onto the target network infrastructure of the target mobile network operator using the new account identifier on behalf of the mobile virtual network operator.

13. The system of claim 11, wherein the operations comprise the mobile virtual network operator porting out the phone number from the source network infrastructure of the source mobile network operator.

14. The system of claim 11, wherein the operations comprise the mobile virtual network operator cloning at least one mobile value added service from the previous account identifier for the client to the new account identifier for the client.

15. The system of claim 14, wherein the operations comprise the mobile virtual network operator cloning every mobile value added service from the previous account identifier for the client to the new account identifier for the client.

16. The system of claim 14, wherein the operations comprise the mobile virtual network operator creating an offer that includes every mobile value added service from the previous account identifier for the client.

17. The system of claim 16, wherein the system is configured such that a mobile virtual network enabler creates the offer that includes every mobile value added service from the previous account identifier for the client on behalf of the mobile virtual network operator.

18. The system of claim 11, wherein the operations comprise the mobile virtual network operator setting a status for the new account identifier within a portfolio database to pending after the new account identifier is generated and prior to porting in the phone number of the client onto the target network infrastructure of the target mobile network operator.

19. The system of claim 18, wherein the operations comprise the mobile virtual network operator switching the status for the new account identifier within the portfolio database from pending to active after the phone number of the client is ported into the target network infrastructure of the target mobile network operator.

20. A non-transitory computer-readable medium that has instructions stored thereon that, when executed by at least one physical computing processor, cause a computing device to perform operations comprising:

receiving, at a mobile virtual network operator, a request for the mobile virtual network operator to perform a network switch by porting a phone number of a client of the mobile virtual network operator from a source network infrastructure of a source mobile network operator that is serving the client for the mobile virtual network operator to a target network infrastructure of a target mobile network operator that is serving clients for the mobile virtual network operator;

generating, by the mobile virtual network operator in response to receiving the request to perform the network switch, a new account identifier for the client;

invoking, by the mobile virtual network operator, a port in application programming interface to port the phone number of the client onto the target network infrastructure of the target mobile network operator using the new account identifier;

updating, within a portfolio database of the mobile virtual network operator in response to the request to perform the network switch, a status of the new account identifier for the client as active;

updating, within the portfolio database of the mobile virtual network operator in response to the request to perform the network switch, a status of a previous account identifier for the client as terminated; and updating a cross-reference within an order orchestrator database of the mobile virtual network operator based on the network switch;

wherein the new account identifier identifies the client after the network switch.

* * * * *